(12) United States Patent
Baughman et al.

(10) Patent No.: US 8,096,119 B2
(45) Date of Patent: Jan. 17, 2012

(54) FUEL-POWERED ACTUATORS AND METHODS OF USING SAME

(75) Inventors: Ray H. Baughman, Dallas, TX (US); Von Howard Ebron, Republic, MO (US); Zhiwei Yang, Richardson, TX (US); Daniel J. Seyer, Ballwin, MO (US); Mikhail Kozlov, Dallas, TX (US); Jiyoung Oh, Dallas, TX (US); Hui Xie, Richardson, TX (US); Joselito Razal, Wollongong (AU); John P. Ferraris, Coppell, TX (US); Alan G. MacDiarmid, Drexel Hill, PA (US); Robin B. McConnell, legal representative, Drexel Hill, PA (US); Gayle P. Gentile, legal representative, Drexel Hill, PA (US); William Alexander Macaulay, McKinney, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 564 days.

(21) Appl. No.: 12/281,411

(22) PCT Filed: Mar. 2, 2007

(86) PCT No.: PCT/US2007/063241
§ 371 (c)(1),
(2), (4) Date: Sep. 2, 2008

(87) PCT Pub. No.: WO2007/103832
PCT Pub. Date: Sep. 13, 2007

(65) Prior Publication Data
US 2009/0021106 A1  Jan. 22, 2009

Related U.S. Application Data

(60) Provisional application No. 60/778,332, filed on Mar. 2, 2006.

(51) Int. Cl.
*F01B 29/10* (2006.01)
(52) U.S. Cl. .............................. 60/527; 60/529; 148/402
(58) Field of Classification Search ............ 60/527–529, 60/772; 429/30, 33, 480, 494, 516; 148/402
See application file for complete search history.

(56) References Cited

U.S. PATENT DOCUMENTS

| | | | |
|---|---|---|---|
| 4,922,641 A | 5/1990 | Johnson | |
| 6,255,009 B1 | 7/2001 | Rusek et al. | |
| 6,446,909 B1 | 9/2002 | Michelson | |
| 6,555,945 B1 | 4/2003 | Baughman et al. | |
| 6,716,629 B2 * | 4/2004 | Hess et al. | 435/420 |
| 6,890,674 B2 * | 5/2005 | Beckmann et al. | 429/442 |
| 7,159,841 B2 * | 1/2007 | Gemmen et al. | 251/129.06 |
| 2004/0137296 A1 | 7/2004 | Schunk et al. | |
| 2005/0006640 A1 | 1/2005 | Jackson et al. | |
| 2005/0028901 A1 | 2/2005 | Howard | |
| 2005/0181250 A1 * | 8/2005 | Beckmann et al. | 429/24 |
| 2007/0056634 A1 * | 3/2007 | Yokoi et al. | 137/505.29 |
| 2008/0038590 A1 * | 2/2008 | Nakakubo | 429/12 |
| 2008/0254331 A1 * | 10/2008 | Nakakubo | 429/24 |

* cited by examiner

*Primary Examiner* — Hoang Nguyen
(74) *Attorney, Agent, or Firm* — Ross Spencer Garsson

(57) ABSTRACT

Fuel-powered actuators are described wherein actuation is a consequence of electrochemical processes, chemical processes, or combinations thereof. These fuel-powered actuators include artificial muscles and actuators in which actuation is non-mechanical. The actuators range from large actuators to microscopic and nanoscale devices.

71 Claims, 33 Drawing Sheets

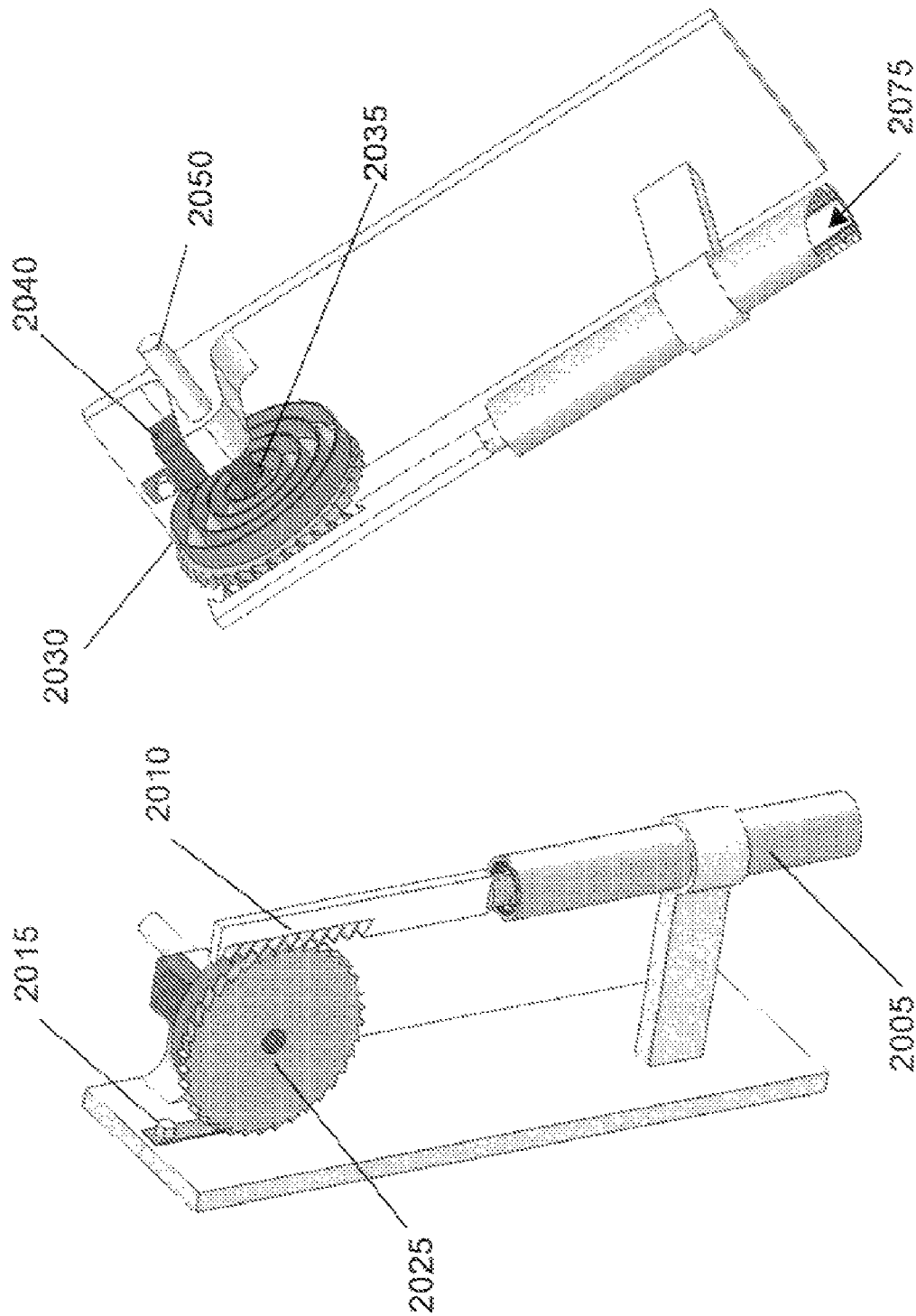

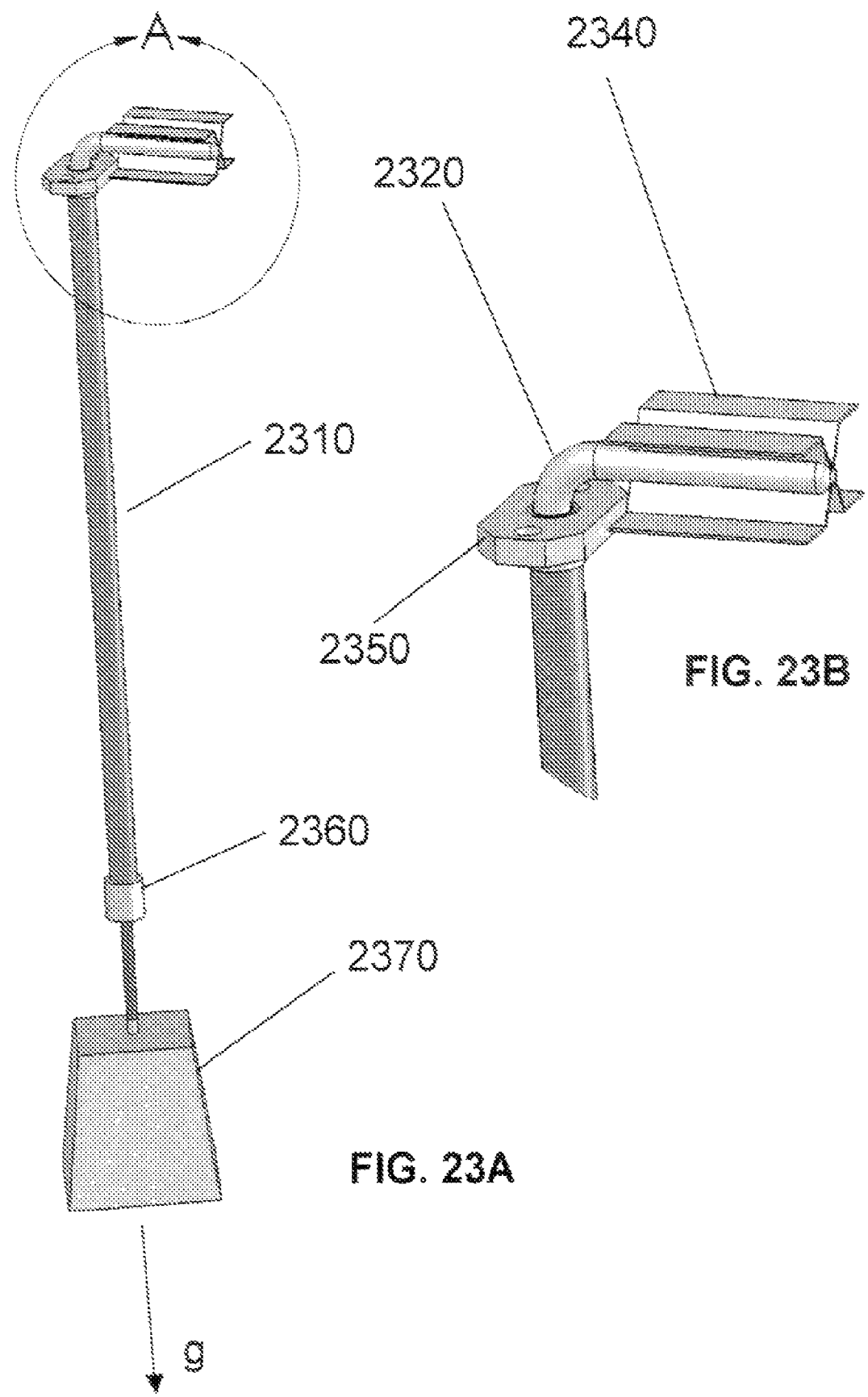

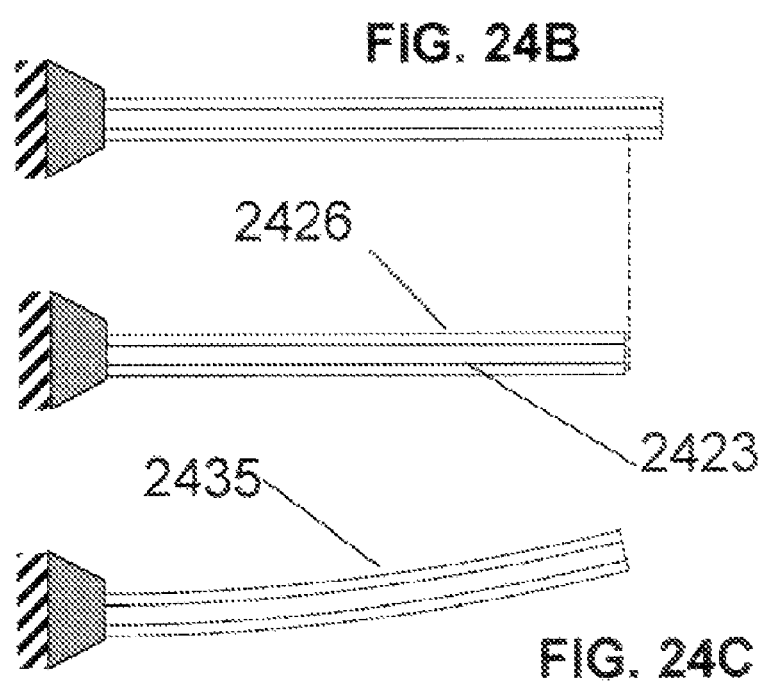

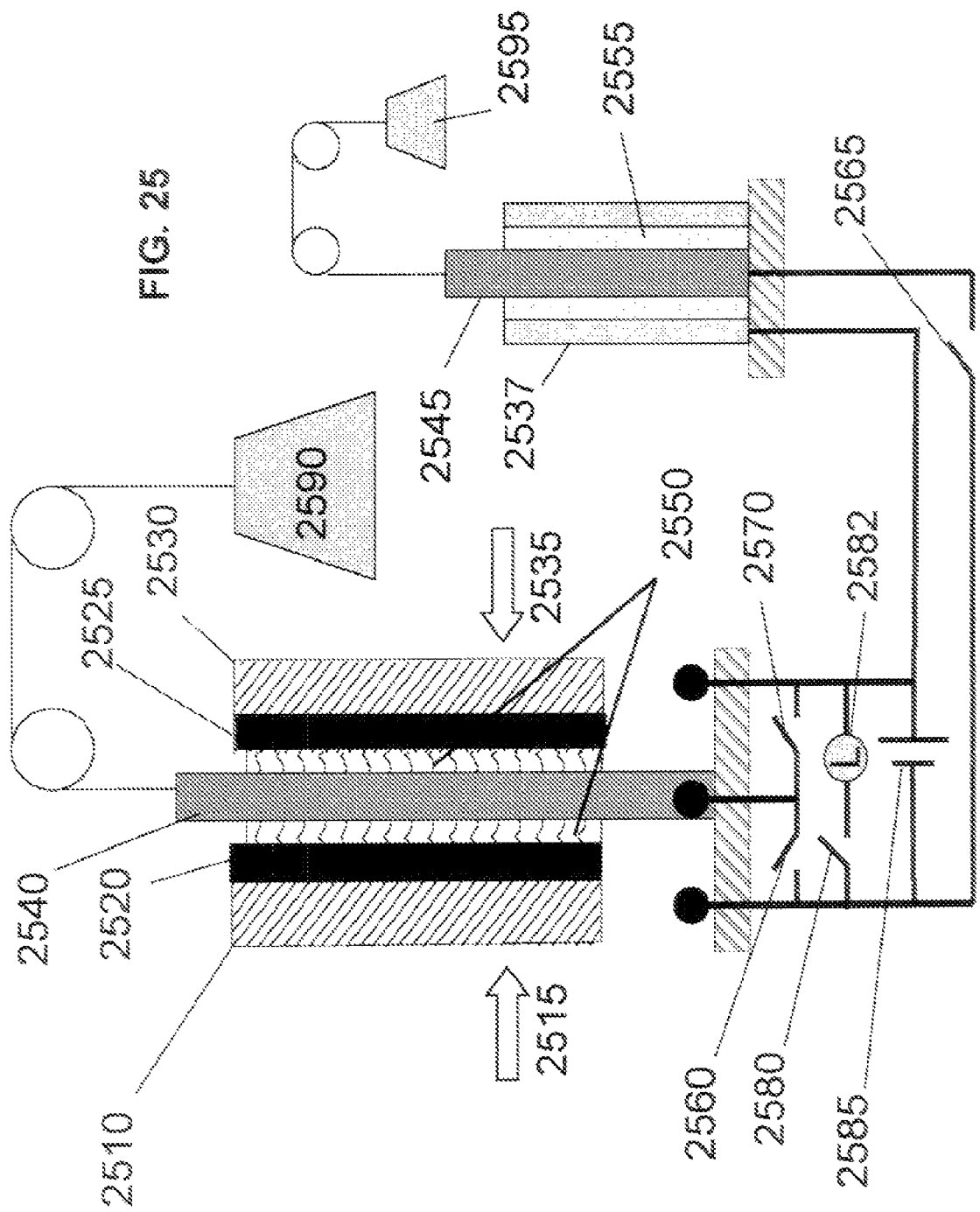

FUEL-POWERED ACTUATORS AND METHODS OF USING SAME

CROSS-REFERENCE TO RELATED APPLICATIONS

This Application for Patent claims the benefit of priority from PCT Application Serial No. PCT/US2007/063241, filed Mar. 2, 2007, which PCT Application claims the benefit of priority from U.S. Provisional Patent Application Ser. No. 60/778,332, filed Mar. 2, 2006, the disclosure of which is considered part of and is incorporated by reference in its entirety in the disclosure of this application.

GOVERNMENT INTEREST

The present invention was made with support from the Defense Advanced Research Projects Agency/U.S. Army Research Office grant W911NF-04-1-0174, the Texas Advanced Technology Program grant 009741-0130-2003, and the Robert A. Welch Foundation.

FIELD OF INVENTION

Fuel-powered actuators are described wherein actuation is a consequence of electrochemical processes, chemical processes, or combinations thereof. These fuel-powered actuators include artificial muscles and actuators in which actuation is non-mechanical. The actuators range from large actuators to microscopic and nanoscale devices.

BACKGROUND OF INVENTION

Since autonomous robots, micro-air vehicles, and prosthetic limbs operate ideally for long periods without refueling or recharging, increasing the gravimetric and volumetric effectiveness of the energy supply and energy conversion equipment is critical. While nature's choice is to chemically power the diverse muscles of her design with a high-energy-density fuel, human kind has largely taken another route. Electrical energy is typically converted to mechanical energy using motors, hydraulic systems, or piezoelectric, electrostrictive, or electrochemical actuators. Because of high electrical power needs, some of the most athletically capable robots are wired to a stationary power source and cannot move freely.

What is needed is an artificial muscle based on a material—an artificial muscle material—that can function as an integral part of a fuel cell, thereby allowing the conversion of chemical energy to mechanical energy in a more direct, compact manner. When speaking about mechanical devices, the terms "activator" and "artificial muscle" are herein defined as devices that can provide a mechanical displacement by using dimensional changes of a solid material or a solid material-liquid transformation.

Chemically powered artificial muscles based on polymer gels were demonstrated over fifty years ago and remain of practical interest for both chemically and electrically powered actuators (H. B. Schreyer et al. in Biomolecules 1, 642-647 (2000) and D. Kaneto, J. P. Gong, and Y. Osada in J. of Mater. Chem. 12, 2169-2177 (2002)). While actuator strain generation can be very large, application has been limited by low response rates, low stress generation capabilities, and the low energy densities of utilized chemical reactions.

Nanoscale and larger actuators have been described that are powered by oxygen gas released by the catalytic decomposition of hydrogen peroxide (W. P. Paxton et al. in J. Am. Chem. Soc. 126, 13424 (2004); S. Fournier-Bidoz, A. C. Arsenault, I. Manners, and G. A. Ozin in Chem. Commun. 2005, 441; T. R. Kline, W. F. Paxton, T. E. Mallouk, and A. Sen in Angew. Chem. Ind. Ed. 44, 744-746 (2005); J. M. Catchmark, S. Subramanian, and A. Sen in Small 1, 202-206 (2005); and R. F. Ismagilov, A. Schwartz, N. Bowden, and G. M. Whitesides in Angew. Chem. Ind. Ed. 41, 652-654 (2002)). Also, gas-powered engines that use the catalytic decomposition of hydrogen peroxide and like materials has been described by R. C. Michelson and S. Reece in U.S. Pat. No. 6,446,909, issued Sep. 10, 2002. Since the catalytic reaction of hydrogen peroxide to produce oxygen is not very energetic, the available energy to power an actuator is not large. None of these actuators has the benefit of using a chemical fuel and oxidant to power a muscle material—the hydrogen peroxide reaction instead involves the formation of water and oxygen. The latter reference (U.S. Pat. No. 6,446,909 uses released gases to power a turbine engine, and this use of a turbine engine increases system weight, volume and cost.

Chemically powered artificial muscles (where non-faradaic charging resulting from redox reactions is used to expand a high surface area material using Coulombic repulsion forces) has been proposed (R. H. Baughman, C. Cui, J. Su, Z. Iqbal and A. A. Zakhidov, U.S. Pat. No. 6,555,945, issued Apr. 29, 2003). However, inventive methods for solving practical problems are still needed and were not provided. Existing problems include:

(a) The described actuators are of the cantilever type and teachings are not provided that enable extension to tensile actuators. Cantilever-based actuators are well known not to be useful for generating mechanical power or large forces, and are therefore very limited in applicability. A problem is that no means were described for mechanically decoupling the actuating electrode from the counter electrode. Consequently, the described chemically powered artificial muscle is limited to a cantilever configuration. Furthermore, the use of a proton exchange membrane and no other auxiliary electrolyte (the proposed preferred implementation therein) inherently prohibits mechanical decoupling of opposite electrodes. Thus, without additional inventive means the membrane and counter electrode parasitically load the actuating electrode and force use as a cantilever device.

(b) The requirement of having an electrolyte that is "substantially gas impermeable" severely restricts the practically usable electrode geometries to those which still permit efficient proton transport. In fact, all substantially gas impermeable electrodes are solids that have much lower ionic conductivities than are obtainable for gas permeable liquid electrolytes. This decreased ionic conductivity for "substantially gas impermeable" ionic conductors means that actuator response rate is lower than would otherwise be possible. Since the ratio of counter electrode surface area to actuating electrode surface area must be large to optimize response rate, the response rate has been limited by the corresponding need for parallel opposite electrodes having the same physical area.

(c) This prior art teaches the need to have separate confinement at opposite electrodes of fuel and oxidizer, thereby requiring separate control of the delivery of fuel and oxidizer. This need for separate confinement of fuel and oxidizer is eliminated in some embodiments of the present invention.

A fuel-driven shape memory metal based actuator is proposed by R. J. Howard in U.S. Pat. No. 7,135,076, issued Nov. 14, 2006. A fuel/oxidizer (air or oxygen) mixture is applied to a shape memory metal alloy, so that heat released by a catalyzed fuel oxidation can be used to actuate this shape metal alloy (SMA). The dynamic response is limited by the amount of excess air or other dilutent required in the mixture to reduce the reaction temperature to prevent explosion or damage to the shape memory metal as a result of overheating. A large volume of excess air or other dilutent to the fuel concentration simultaneously reduces the heating efficiency by increasing convective heat loss.

The cooling portion of the actuator stroke is also impaired since the mixture flow must either be cut off, leaving the SMA in still air, or the fuel portion of the mixture must be removed, resulting in some latency between command and effect. The cooling rate (and, correspondingly, the actuation rate during cooling) is limited to that achievable by gaseous cooling and conduction from the ends of the SMA. No means enabling this a liquid fuel/oxidizer mixture are proposed, nor are any non-explosive candidate mixtures discussed. Furthermore, inherent to any such mixtures is the added oxidizer weight that severely reduces the specific impulse of the fuel. In an attempt to overcome the gaseous cooling and latency performance limitations during the heating part of the actuation cycle, U.S. Pat. No. 7,135,076 also proposed an additional means of reaction initiation—such as preheating the shape memory material by electrical resistance heating. Such systems and methods are not particularly suited for compact, high cycle, quick response implementation, and likely need an external power source, such as a battery.

Hydrogen-induced actuation of hydrogen absorbing metal alloys has been attempted for micromechanical devices using the known large volume changes induced by hydrogen absorption to make hydrides. However, no reversible actuation was observed (Y. Zhang et al., Proceedings of the SPIE 4601, 131 (2001)). Moreover, the attempted actuation process used hydrogen as a volume-expanding intercalant, rather than as a fuel. The benefits of hydrogen as a high energy density fuel could not have been obtained even if the experiments had been successful.

Thermally powered actuation induced by microwave absorption heating, heating by contact with a thermal reservoir, heating by absorption of light, or resistive electrical heating is well known. In some actuator devices, this heating is used to cause dimensional change of a shape memory composition, such as a shape memory polymer, shape memory polymer composite, a shape memory ceramic, or a shape memory metal alloy. In such devices, heating causes expansion or contraction, and this actuation is reversed on cooling. However, since these devices are not powered by the oxidation of fuel, the benefits or such power source were not obtained.

In addition, cantilever-based thermal actuators based on resistive heating are widely used in Micro-Electro-Mechanical Systems (MEMS). These devices operate somewhat like the cantilever devices in thermostats used for the home—a temperature rise of the cantilever device causes cantilever bending due to differing thermal expansion coefficients of two different materials in the cantilever. This temperature increase results in actuation (cantilever bending) that is electrically driven in the MEMS devices.

Metal alloy and polymer shape memory actuators are types of thermal actuators, and of these, the metal alloy shape memory alloys are widely used and believed to be the most commercially significant. Transition between a low temperature shape memory alloy phase having low elastic modulus (called martensite) and higher temperature phase having high modulus (called austenite) causes the dimensional changes that produce shape memory metal actuation. Widely used shape memory alloys include NiTi, CuZnAl, and CuAlNi alloys.

Shape memory alloys have been previously used with conventional fuel cells to control fuel flow valves, and such control has been achieved using either electrical resistive heating or the waste heat of the fuel cell. These developments are described in United States Patent Application Publication Nos. 20040229094A1 (Bae et al., published Nov. 18, 2004), 20030157385 (Beckmon et al., published Aug. 21, 2003) and 20030162070A1 (Hirsch et al., published Aug. 28, 2003, now U.S. Pat. No. 6,924,055) and Japan Patent JP63016562. However, the shape memory alloy does not provide artificial muscle capabilities for accomplishing mechanical work exterior to the fuel cell and fuel delivery system.

United States Patent Application Publication No. 20040170879A1 (Laurent et al., published Sep. 2, 2004) also uses a shape memory alloy in conjunction with a conventional fuel cell. The shape memory alloy is not used for actuation. Instead the shape memory alloy connects anode and cathode of the fuel cell. The resistance change caused by the phase transition between the lower conductivity martensite phase and the higher conductivity austenite phase is used to control heat-up to the optimal temperature for fuel cell operation.

Japan Patent Application No. JP2001229942 describes use of a shape memory alloy as safety shutoff to prevent the catastrophic destruction of a fuel cell. The SMA valve actuator is activated by fire in the fuel cell assembly, and functions to shut off flow of one of the fuel gases. Actuation is again not accessible for external application, and is not used during normal fuel cell operation.

United States Patent Application Publication Nos. 20050074647A1 (Arthur, published April, 2005) and 20040081866A1 (Bekkedahl et al., published Apr. 29, 2004) describe shape memory springs that are used to move external components into contact with the fuel cell. The purpose is to either short any excess charge on the electrodes prior to start up or after shut down or to provide connection to a heat sink that helps maintain fuel cell temperature. Both patent applications disclose that either excess fuel cell system heat can operate the actuator or an external power source can resistively heat the shape memory springs to provide improved process control. Neither provides actuation that is usable outside the fuel cell system.

The prior art lacks any means for practically converting the energy of a high energy density fuel in an efficient manner to both electrical and mechanical energy. The present invention provides these means for diverse applications. The benefit over electrical actuation is enormous for autonomous systems, since packaged high energy density fuels and delivery systems provide order-of-magnitude or higher advantages in energy storage density compared with the highest performance batteries. This translates to correspondingly increased mission lengths for actuator systems, whether for an autonomous robot or prosthetic limbs.

Additionally, while it is well known and widely utilized that electrical charge injection and electrical heating can change the magnetic, electrical, and optical properties of materials, there is a great need for means for obtaining these changes on command for mobile application where the limited energy storage capabilities of batteries limit mission length.

SUMMARY OF INVENTION

The present invention is directed to fuel-powered actuators, wherein actuation can be mechanical (as for an artificial muscle) or to provide a useful reversible or irreversible changes in mechanical, optical, electronic, or magnetic properties.

A method for actuating an actuator material is described. In general, in one aspect, the invention features a method for actuating an actuator material includes the steps of: (a) exposing the actuator material in a first chamber to a fuel capable of being oxidized thereby causing actuation of the actuator material; and (b) exposing the actuator material in the first chamber to an oxidizing agent thereby to at least partially reverse the actuation of the actuator material. Substantially all products formed by the exposing steps of (a) and (b) on the actuator material have a boiling point below 150° C.

In another aspect, the invention features a method for actuating an actuator material includes the steps of: (a) exposing the actuator material in said first chamber to an oxidizing agent thereby causing actuation of the actuator material; and (b) exposing the actuator material in a first chamber to a fuel capable of being oxidized thereby to at least partially reverse the actuation of the actuator material. Substantially all products formed by the exposing steps of (a) and (b) on the actuator material have a boiling point below 150° C.

In another aspect, the invention features a fuel-powered actuator may include: (a) a first chamber; (b) an actuator material in the first chamber; (c) a supply of fuel operatively connected to the first chamber for introducing the fuel into the chamber; and (d) a supply of oxidizing agent operatively connected to said chamber for introducing the oxidizing agent into the first chamber. The fuel may be capable of being oxidized, thereby causing actuation of the actuator material. The oxidizing agent is capable of at least partially reversing the actuation of the actuator material. The fuel and the oxidizing agent are reactable such that substantially all products formed have a boiling point below 150° C.

In another aspect, the invention features a fuel-powered actuator may include: (a) a first chamber; (b) an actuator material in the first chamber; (c) a supply of oxidizing agent operatively connected to the chamber for introducing the oxidizing agent into the first chamber, wherein the oxidizing agent is capable of causing actuation of the actuator material; and (d) a supply of fuel operatively connected to the first chamber for introducing the fuel into the chamber, wherein the fuel is capable of being oxidized thereby at least partially reversing said actuation of the actuator material, and wherein the fuel and the oxidizing agent are reactable such that substantially all products formed have a boiling point below 150° C. In some embodiments, only the first chamber is required for the actuating function to occur. Certain embodiments may include a second chamber and a second actuator material in the second chamber.

As described herein, actuator material may have various properties. The actuator material may be selected from a group consisting of: (i) high surface area materials, (ii) materials that can be intercalated during oxidation processes, (iii) materials that can be intercalated during reduction processes, and (iv) combinations thereof. In certain embodiments, the actuator material includes a high surface area fibrous material, a conducting organic polymer, or both. The actuator material may electronically insulating for at least some part of the method. In some embodiments, the actuator material is catalytic with respect to oxidation of the fuel and reduction of the oxidizing agent.

In certain embodiments, a catalyst is present with the actuator material, wherein the catalyst is catalytic with respect to oxidation of the fuel and reduction of the oxidizing agent. The actuation may be capable of providing a mechanical displacement or a change in mechanical, optical, electronic, or magnetic properties. In some embodiments, the actuation is capable of providing the mechanical displacement.

As described herein, the actuation may result from an event selected from the group consisting of: (i) non-faradaic charge injections, (ii) dopant intercalations, (iii) dopant de-intercalations, (iv) changes in the temperature of the actuating material, and (v) combinations of these events. In some embodiments, the invention includes a plurality of actuator materials. In certain embodiments, at least one of the plurality of the actuator materials actuates due to a temperature change, and at least one of the plurality of the actuator materials actuates not due to a temperature change. In some embodiments, the actuator material stiffens as the operating temperature increases.

As described herein, a mechanical catch may be used to maintain actuation stroke states whose maintenance would otherwise require the expenditure of energy. In some embodiments, there is substantially no electrolyte in the first chamber. In other embodiments, there are electrolytes in the first chamber.

The actuator material described herein may include a conducting polymer. In some embodiments, the actuator material includes an organic conducting polymer. In certain embodiments, the organic conducting polymer is capable of (i) oxidation by the oxidizing agent, (ii) reduction by the fuel, or (iii) both. The organic conducting polymer may be self-dopable. In some embodiments, the self dopable organic conducting polymer possesses substituents including at least one of the following functional groups —COOH, —$PO_3H_2$, phosphonic acid half esters, —$SO_3H$, —$B(OH)_2$, boranic half esters, —$NH_3^+$, and protonated secondary and tertiary amines.

In another aspect, the invention features a fuel-powered actuator may include: (a) a chamber containing a mixture of a fuel and an oxidizing agent; (b) a working electrode within the chamber; (c) a counter electrode within the chamber; (d) a first actuating electrode within the chamber, wherein the first actuating electrode is selected from the group consisting of (i) the working electrode, (ii) the counter electrode, (iii) an additional electrode ionically connected to the working electrode and the counter electrode, and (iv) combinations thereof; (e) an electrolyte or plurality of electrolytes ionically connecting the working electrode and the counter electrode; (f) a first catalyst for the working electrode; (g) a second catalyst for the counter electrode, wherein one of the first catalyst and the second catalyst preferentially catalyzes oxidation of the fuel and the other catalyst of the first catalyst and the second catalyst preferentially catalyzes reduction of the oxidizing agent.

In some embodiments, the first actuating electrode includes either a high surface area material, a material that can be intercalated during oxidation or reduction processes, or a combination thereof. In certain embodiments, the actuator electrode includes a high surface area electrically conducting material, an electrically conducting organic polymer, or both. As described herein, the actuation may be capable of providing a mechanical displacement or a change in mechanical, optical, electronic, or magnetic properties. In some embodiments, the actuator is configured to provide the mechanical displacement. In certain embodiments, actuation may result from an event selected from a group consisting of: (i) a non-faradaic charge injection; (ii) a dopant intercalation; (iii) a dopant de-intercalation; and (iv) a combination thereof.

In some embodiments, a mechanical catch is used to maintain actuation stroke states whose maintenance would otherwise require the expenditure of energy. In certain embodiments, the invention further includes a second actuating electrode. As described herein, the first actuating electrode may be the working electrode and the second actuating electrode may be the counter electrode. In some embodiments, the first actuating electrode includes a phase change material. In certain embodiments, the first actuating electrode includes a conducting shape memory material.

In another aspect, the invention features a fuel-powered actuator may include: (a) a non-metal phase change material; (b) a catalyst, wherein the catalyst is thermally coupled to the non-metal phase change material; and (c) a fuel and oxidizing agent mixture contacting the catalyst. The non-metal phase change material may undergo a substantial volume change when heated above a phase change temperature for the non-metal phase material. In some embodiments, the non-metal phase change material includes a shape memory material.

In some embodiments, the non-metal phase change material includes an organic material. In some embodiments, the non-metal phase change material includes a polymer. In some embodiments, the non-metal phase change material includes a polymer composite. In some embodiments, the non-metal phase change material includes paraffin. In certain embodiments, the polymer composite includes carbon nanotubes or carbon nanoparticles. In certain embodiments, the polymer composite includes conducting particles or fibers. The particles or fibers may be nanoparticles or nanofibers.

In another aspect, the invention features a fuel-powered actuator may include: (a) a phase change material; (b) a catalyst, wherein the catalyst is thermally coupled to the phase change material; (c) a fuel oxidizer mixture contacting the catalyst; and (d) a physical structure operatively coupled to the actuator. The physical structure may be selected from the group consisting of (i) a servo controller that controls movement of the actuator, (ii) a controller that controls the compliance characteristics of the actuator at least partially independently of actuator position, (iii) a controller that controls the force generation of the actuator acting on a load in a substantially analog fashion that is substantially independent of the path used to contact the load, (iv) a controlling structure or device which enables passive operation as an oscillator, a tracker, or a constant force generator, (v) a patterned catalyst, (vi) a region selected fuel delivery system, (vii) a thermo-siphon, (viii) a heat pipe, (ix) an actuator resistance sensing circuit, (x) a displacement sensitive sensor, (xi) a reverse bias spring, and (xii) combinations thereof.

In some embodiments, the physical structure is selected from a group consisting of: (A) a servo controller that controls movement of the actuator, (B) a controller that controls the compliance characteristics of the actuator at least partially independently of actuator position, (C) a controller that controls the force generation of the actuator acting on a load in a substantially analog fashion that is substantially independent of the path used to contact the load, and (D) a controlling structure or device which enables passive operation as an oscillator, a tracker, or a constant force generator.

In some embodiments, the physical structure includes a patterned catalyst. In some embodiments, the physical structure includes a region selected fuel delivery system. In certain embodiments, the physical structure includes a thermo-siphon. In other embodiments, the physical structure includes a heat pipe. In other embodiments, the physical structure includes an actuator resistance sensing circuit. As described herein, the physical structure may include a displacement sensitive sensor. In some embodiments, the physical structure includes a reverse bias spring. In certain embodiments, the physical structure includes the servo controller that includes a thermal control loop within an inner servo control loop and an outer servo control loop.

As described herein, the response time constant or discrete update rate of an inner thermal control loop may be at least a factor of two greater than the update rate or response time constant of the outer servo control loop. Some embodiments include a temperature sensor that can be utilized to prevent damage to the actuator. In some embodiments, a fuel-powered actuator is configured to utilize a feed forward model. In certain embodiments, an electrical resistance of the phase change material can be utilized as a feedback signal.

In some embodiments, an additional feedback signal can be utilized. The additional feedback signal may be selected from a group consisting of position, velocity, temperature, resistance change rate, and a combination thereof. In certain embodiments, the physical structure includes a servo controller that is configured to determine a hysteresis state utilizing at least one of the following: velocity direction, velocity magnitude, resistance change direction, and resistance change magnitude. In some embodiments, an actuating element electrical resistance is used as a proxy for position.

In some embodiments, the physical structure includes a non-linear controller. The non-linear controller may be operable to utilize at least one of the following (A) an adaptive control technique, (B) Kalman filtering, or (C) a neural network. In certain embodiments, temperature can be utilized as in input to a position feedback system. In certain embodiments, the temperature can be used to resolve a hysteresis state of a non-linear actuator system.

In another aspect, the invention features a fuel-powered thermally operated actuator may include: (a) an actuator material, wherein the actuator material includes a non-phase change material; (b) a catalyst, wherein the catalyst is thermally coupled to the non-phase change material; and (c) a fuel oxidizer mixture contacting the catalyst. In some embodiments, the actuator includes a cantilever. In certain embodiments, a mechanical displacement or a property change during actuation controls the actuation process. As described herein, the mechanical displacement may regulate the actuation process by regulating delivery of fuel, delivery of oxidant, or a combination thereof to the fuel-powered mechanical actuator.

In another aspect, the invention features a fuel-powered actuator includes: (a) a working electrode; (b) a counter electrode that is mechanically un-coupled with respect to the working electrode; (c) an electrolyte or electrolytes that provide an ion path between the working electrode and the counter electrode; and (d) an actuator material operable for responding to charge injection processes resulting from the operation of the working electrode and the counter electrode, wherein one electrode of the working electrode and the counter electrode is in contact with a fuel and the other electrode of the working electrode and the counter electrode is in contact with an oxidizing agent.

In another aspect, the invention features a fuel-powered actuator includes: (a) a working electrode; (b) a counter electrode; (c) an electrolyte or electrolytes that provide an ion path between the working electrode and the counter electrode; and (d) an actuator material operable for responding to thermal energy produced by joint operation of the working electrode and the counter electrode, wherein the working electrode or the counter electrode includes the actuator material.

In another aspect, the invention features an inch-worm type motor includes: (a) a first end clamp assembly; (b) a second end clamp assembly; and (c) a catalyst-coated extension spring mounted between two end clamp assemblies. In certain embodiments, the end clamp configuration can enable selection of linear or rotary operation.

Advantages of the present invention will become more apparent from the detailed description given hereinafter. However, it should be understood that the detailed description and specific examples, while indicating certain embodiments of the invention, are given by way of illustration only, since various changes and modifications within the spirit and scope of the invention will become apparent to those skilled in the art from this detailed description.

BRIEF DESCRIPTION OF THE DRAWINGS

For a more complete understanding of the present invention, and the advantages thereof, reference is now made to the following descriptions taken in conjunction with the accompanying drawings, in which:

FIGS. 20A and 20B schematically illustrate an embodiment of a fuel-powered shape memory actuator that is operated as an oscillator. The oscillations store energy in a coil spring. This stored energy can be released by enabling the rotation of an output shaft.

FIGS. 23A and 23B depict an embodiment of a fuel-powered shape memory metal actuator that incorporates a floating heat pipe which can provide cooling for both servo and passive (oscillator) motion.

FIGS. 24A, 24B, 24C and 24D depict an embodiment of a fuel-powered actuator that is capable of variable compliance actuation. An I-beam like cantilever actuator is used, where the pictured top and bottom flanges are hollow. Actuation and compliance changes can be achieved by introduction of fuel and oxidizer into one or both flange hollows, which have catalyst-coated surfaces.

FIG. 25 is a diagram of an embodiment of a three-electrode, fuel-powered artificial muscle in which the third electrode operates as an actuator by using double layer charge injection.

FIGS. 26A and 26B, respectively, are before and after exposure of the Pt-coated bimetallic strip to a methanol/air mixture.

DETAILED DESCRIPTION

Figures 1A, 1B:
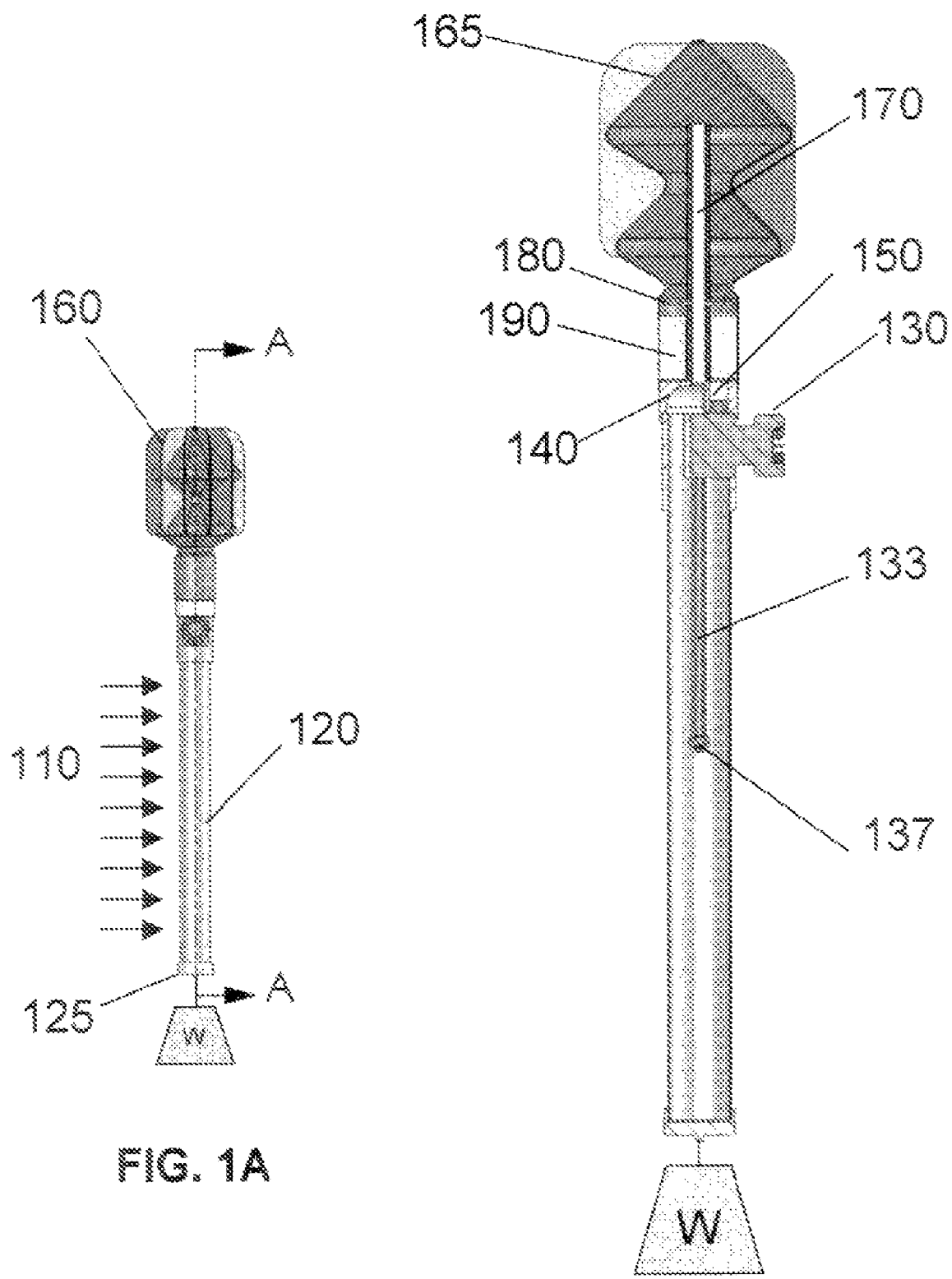
FIGS. 1A and 1B schematically illustrate an embodiment of a fuel-powered, thermally driven artificial muscle cooled by a closed-cycle modified thermo-siphon that utilizes a positive displacement pump to modulate cooling.

The present invention is directed to fuel-powered actuators, wherein actuation can be mechanical (as for an artificial muscle) or to provide useful reversible or irreversible changes in mechanical, optical, electronic, or magnetic properties. Embodiments of the present invention allow the direct use of high-energy-density fuel as a power source for mobile application, applications in which electrical connectability is problematic (such as nanoscale devices), and other uses.

The described fuel-powered actuators of embodiments of the present invention can be powered by high-energy-density fuels, such as hydrogen, methanol, formic acid, or hydrazine. The embodiments provide (a) fuel-powered actuators in which a functional electrode is capable of storing electronic charge, and using changes in stored charge to provide actuation and (b) fuel-powered thermal actuators in which fuel-generated temperature changes provide actuation.

The present invention, illustrated by the embodiments described herein, provides novel operational processes and configurations, fabrication methods, control mechanisms, energy utilization mechanisms, and applications thereof.

Charge-Storage Fuel Cell Muscle

The "charge-storage fuel cell muscle," or "fuel cell muscle" is electrochemical and can optionally use a high-surface-area electrode as an artificial muscle. The term "charge-storage fuel cell muscle" generally refers to an actuating electrode capable of storing electric charge, and that changes in stored charge provides operation as an artificial muscle. Either one or both electrodes may actuate to provide mechanical displacements (i.e., they can function as an artificial muscle). Reversible actuator strokes may result from changes in capacitive electronic charge injection into a high-surface-area material (such as a carbon nanotube sheet or yarn). Alternatively, one or more electrodes in the actuation system may store charge as a result of intercalation of electron donor or electron acceptor dopants, and changes in the volume of intercalated dopants may provide the actuator stroke via either changes in electrode length or volume.

When a high-surface-area electrically conducting material, such as an array of carbon nanotubes, is imbibed with electrolyte and has a voltage applied with respect to a high storage capacity counter electrode, the simultaneous movement of oppositely charged electrolyte ions into close proximity to the injected electric charge forms an electrochemical double layer. This double layer enables giant charge injection by maintaining overall charge neutrality. The mutual repulsion of electronic charges having the same sign in the electrochemical double layer can cause the electrode to expand. Significant expansion occurs to provide useful actuator stroke when the electrode is made from very high-surface-area electrically conducting material (such as nanotubes) and these fibers are surrounded by electrolyte.

Alternatively, the charge-storage fuel cell muscle may use one or more electrodes that predominately store charge as a result of ion intercalation inside the mass of the electrode material (called Faradaic charge injection), as opposed to predominately storing charge as a result of double layer charge injection (called capacitive charge injection). Embodiments may use combinations of electrodes that store charge by double layer charge injection, dopant ion intercalation, or combinations thereof.

Instead of actuating in response to an externally applied inter-electrode voltage, these chemically powered actuator electrode types generate an inter-electrode potential by acting as fuel cell electrodes. Hence, each of the electrodes in the fuel-powered muscles can act as (1) fuel cell electrodes, (2) supercapacitor or battery electrodes to store fuel-cell-generated charge, and (3) artificial muscle electrodes to convert changes in electrode charge to actuator stroke.

Figure 3:
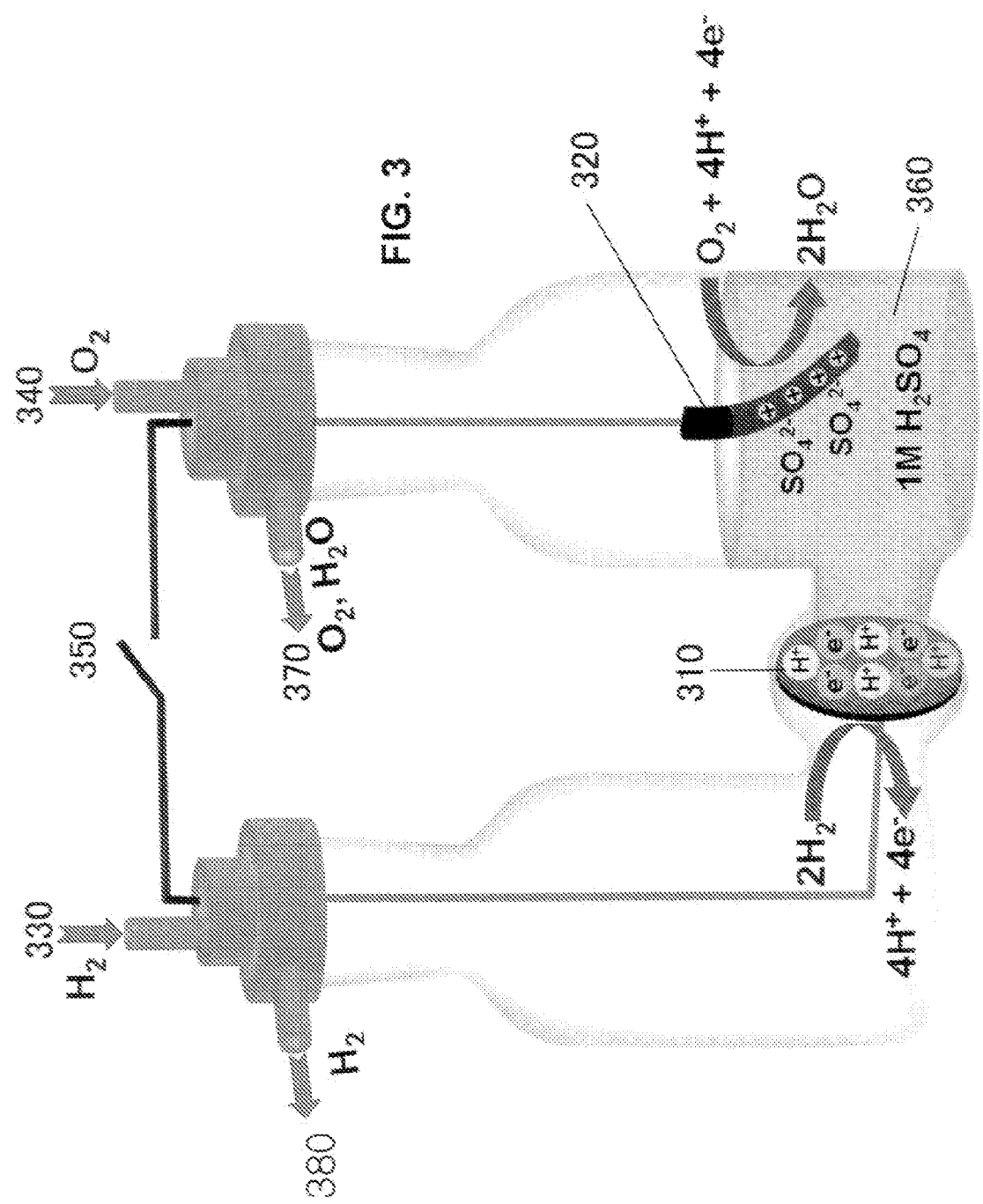
FIG. 3 schematically illustrates an embodiment of a fuel-powered, electrochemical mechanical actuator that is cantilever based.

FIG. 3 depicts the operation of an embodiment of charge-storage fuel cell muscle. When the switch 320 is open, oxygen gas (introduced from inlet 340 and exiting with water from outlet 370) dissolves in a 1 M H2SO4 electrolyte 360 at nanotube electrode 320, where it is reduced in the presence of Pt. Four protons from H2SO4 combine with O2 and four electrons extracted from the carbon nanotube electrode to produce two water molecules. The resulting hole injection in the nanotube sheet 320 causes actuation, with the SO42− ions serving as counter charges in the electrochemical double layer. At the opposite electrode 310 (laminated to a NAFION® (Dupont U.S.A.) proton exchange membrane), also under open circuit conditions, hydrogen (introduced at entrance 330 and leaving at exit 380) is oxidized to produce protons and electrons, thereby generating a half-cell potential of about 0.0 V versus NHE. These electrons enter the electrode; the protons (cations) reside in the solid state electrolyte. Discharge of the fuel cell muscle occurs as a result of closing switch 350, which reverses actuation, thereby producing recombination of electrons on the hydrogen electrode with the holes on the oxygen electrode (the actuating nanotube sheet). Simultaneously, the H2-derived protons diffuse through the NAFION® and liquid electrolytes to the carbon nanotube electrode to replace H+ ions in the electrolyte that were used to make water during the hole-injection part of the actuator cycle (when switch 350 was open). This process differs from the continuous power production process of an ordinary hydrogen fuel cell, in which the protons and electrons needed to produce water come directly from the hydrogen electrode and negligible water is produced when the electric circuit is open. The fabrication of such a device and its operation (wherein the nanotube electrode 320 functions as a cantilever-based actuator) is described in Examples 1 through 4.

Figure 4:
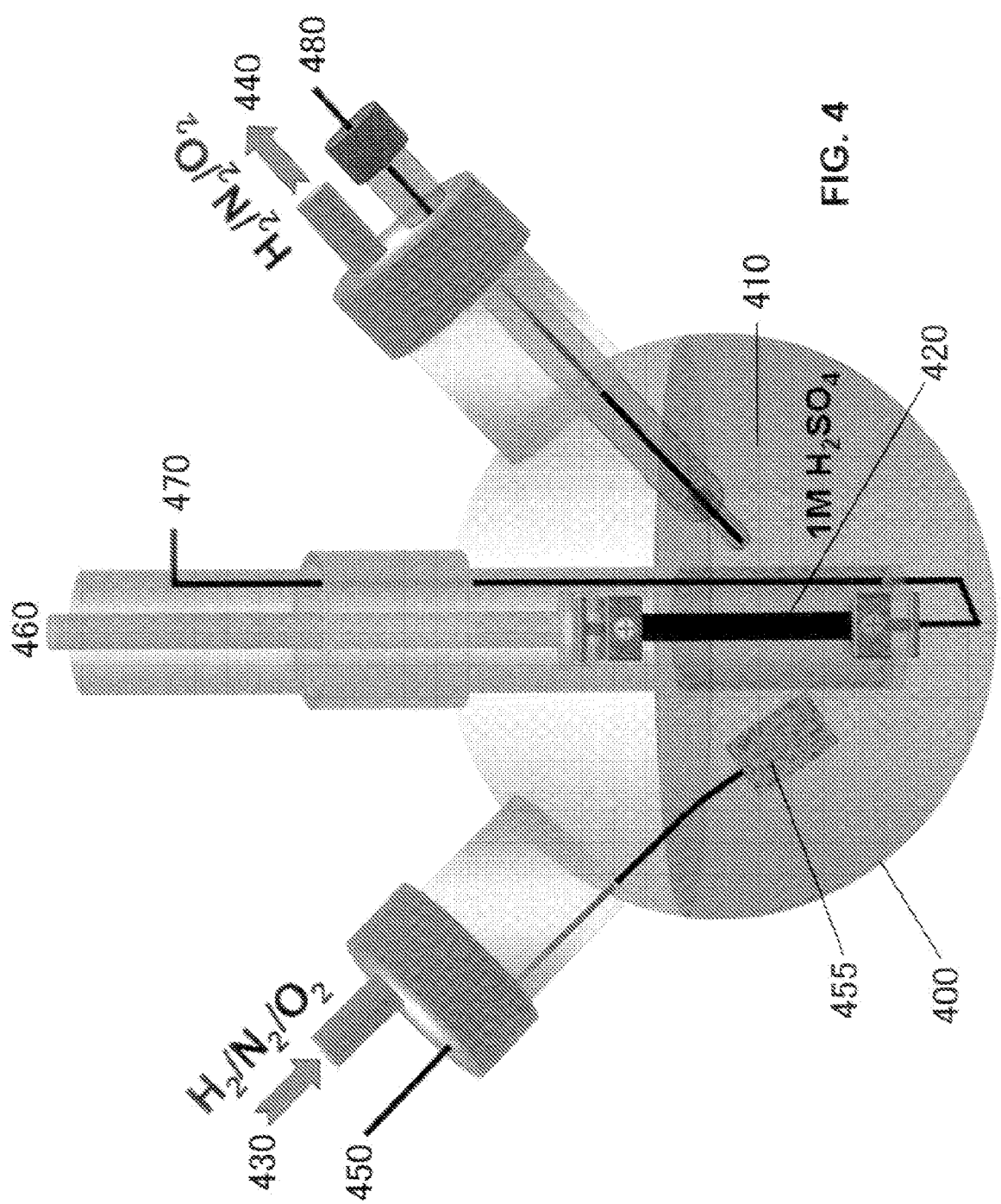
FIG. 4 schematically illustrates an embodiment of an apparatus used in which a single gas chamber, alternatively switched between fuel and oxidant, is used to realize double-layer-based artificial muscle behavior in a cell that does not require a counter electrode.

FIG. 4 depicts an embodiment in which the oxidation and reduction half-cell reactions can generate actuation without benefit of the two electrodes needed for a fuel cell. Using hydrogen as the fuel, oxygen as the oxidant, and 1M H2SO4 as electrolyte 410, forward and reverse actuation of a Pt-containing nanotube sheet 420 was obtained using a cell containing one compartment 400 (for instance, a glass round-bottom flask). Instead of using a cantilever actuator as the electrode, a nanotube sheet 420 uniformly filled with catalyst was used to obtain actuation in tension. In the forward actuation step, the nanotube sheet 420 was double-layer charged to about 0 V (vs. NHE) by filling the cell with hydrogen through port 430. After purging the cell with N2 to avoid direct contact of a H2 and O2 mixture with the catalyst, using ports 430 and 440, the cell was filled with O2, The charging and actuation direction were reversed as the nanotube electrode went to a potential of about 0.9 V (vs. NHE). Element 455 is a counter electrode that was used in comparative experiments (in which actuation was electrically driven by application of a voltage between electrode leads 450 and 470. Element 480 is an electrical connection to an attached reference electrode. Element 460 is the probe that enables measurement of actuator displacement.

Figure 5:
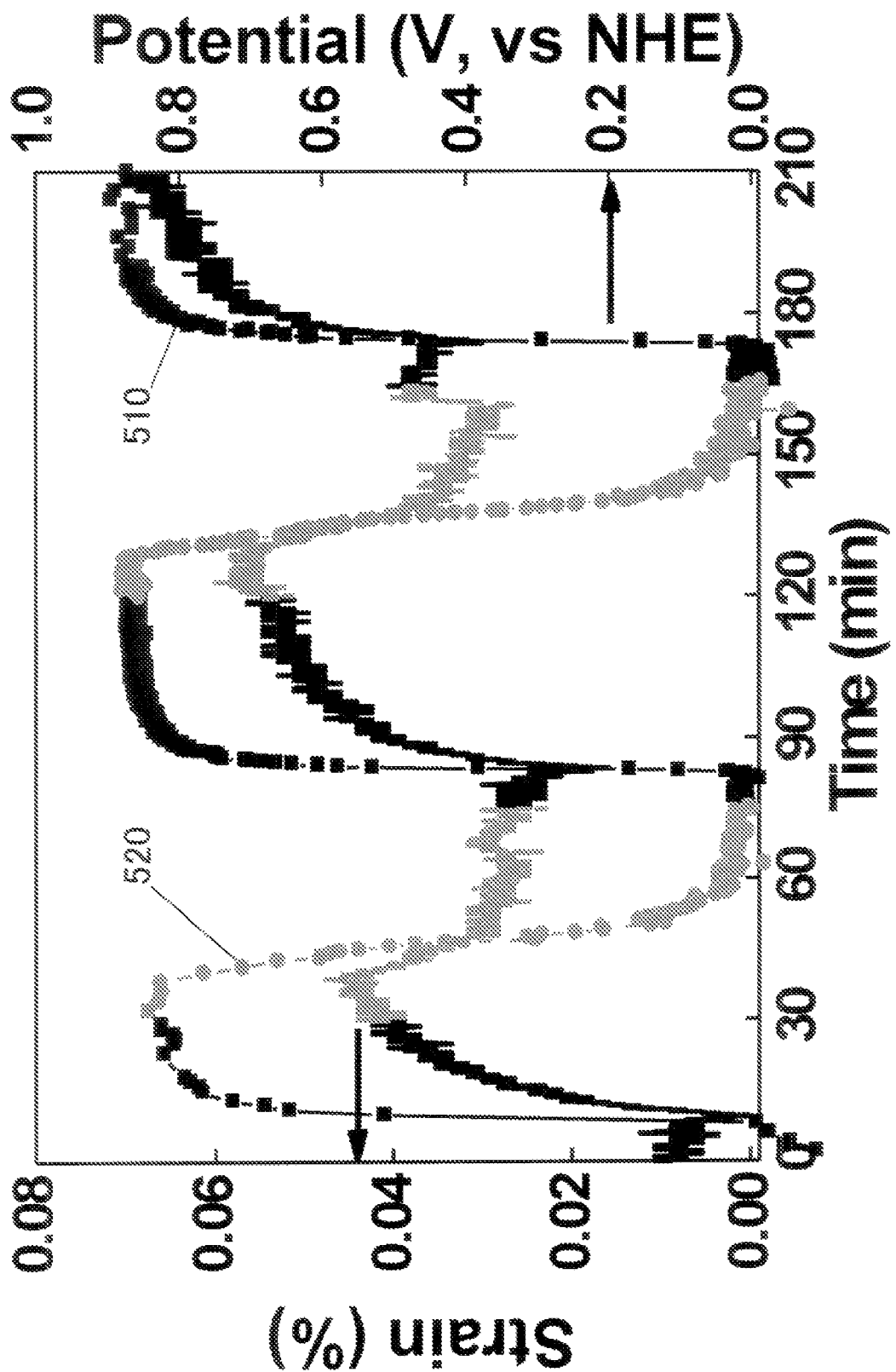
FIG. 5 shows, for the embodiment of FIG. 4, the experimentally measured strain of actuation and potential for a carbon nanotube electrode as a function of time when switching the gas in the single gas chamber between the fuel (H2) and the oxidant (O2).

This enabled reliable comparison between chemically driven and electrically driven actuation in one electrolyte for the same type of Pt-infiltrated nanotube sheet. FIG. 5 plots fuel power generated strain and the fuel generated potential of nanotube electrode 420 (versus the reference electrode) as a function of time as oxidant flow (black date points 510) alternates with hydrogen flow (grey data points 520). These results show that the potential changes from about 0.0 V to about 0.9 V (vs. NHE) as the hydrogen gas in the cell is switched to oxygen, and that the length increase of the nanotube sheet was ~0.035%. This actuator-generated strain is comparable to the typical maximum strain of about 0.1% for commercial high modulus ferroelectrics that usually require about a hundred volt externally applied potential for operation (J. D. W. Madden, IEEE Journal of Oceanic Engineering 29, 706 (2004)).

Figure 13A:
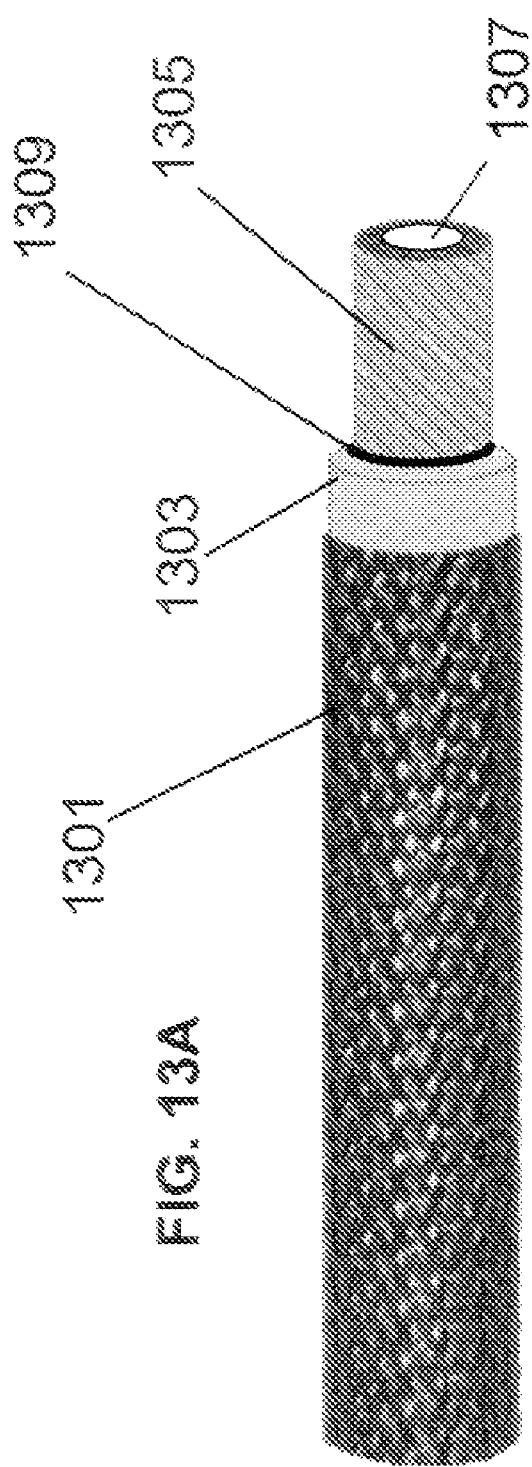
FIGS. 13A and 13B show lateral (13A) and cross-sectional (13B) views of an embodiment of a fuel-powered electrochemical muscle including a braided outer carbon nanotube electrode (which serves as an oxygen electrode), an inner nanotube electrode (which serves as a hydrogen electrode), and separating electrolytes.
Figure 13B:
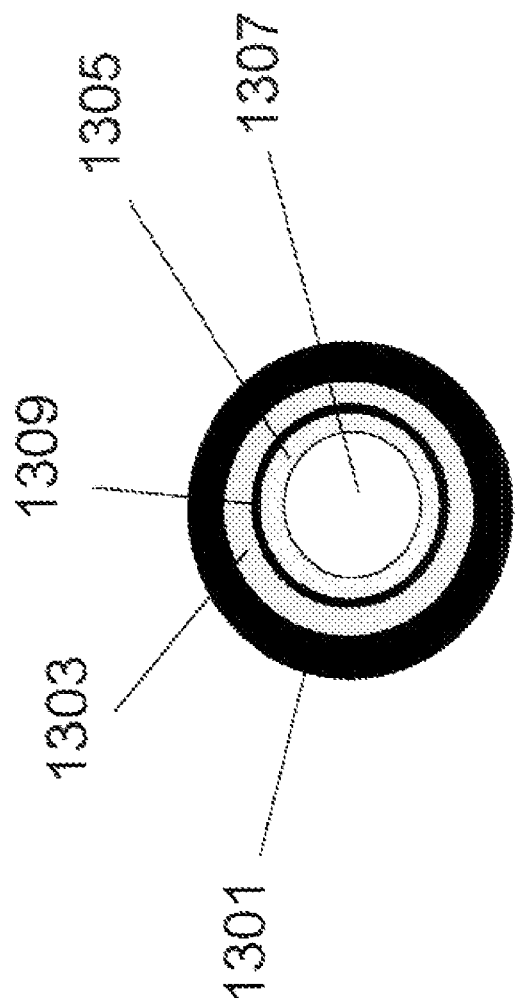

FIGS. 13A (perspective view) and 13B (cross-section) illustrate an embodiment of a fuel cell muscle device in which both the hydrogen electrode 1305 and the oxygen electrode 1301 may actuate if a liquid or gel electrolyte separates each of these electrodes from a gas diffusion barrier 1303. Atmospheric oxygen may be supplied directly to the braided nanotube yarn based oxygen electrode 1301. Hydrogen is supplied through an interior channel 1307. A solid-state electrolyte 1303 is used for ion transport and to provide a diffusion barrier for the fuel and oxidant. If actuation of both electrodes is not desired or if differential motion is preferred, this solid-state electrolyte can be separated from the actuating electrode 1305 by an ionically conducting gel or liquid 1309 that does not mechanically constrain actuation. Replacing the carbon nanotube electrodes in this embodiment with lower modulus nanofibers will increase work capabilities, but decrease actuator force generation capabilities.

Since gas diffusion in the electrolyte limits rate performance, dramatic increases in actuation rate may result from maximizing the contact area between catalyst, liquid electrolyte and gas and/or from replacing a gaseous fuel with a liquid fuel. Since actuator strain is inversely proportional to material stiffness (R. H. Baughman, Science 308, 63 (2005)), replacing the nanotube sheets with a much less rigid nanoporous material may dramatically increase both actuator stroke and the corresponding work capability per cycle. System level considerations may enable improvements such as, for instance, by increasing the fuel-generated potential changes. In some embodiments, all muscles may not be used at the same time in an autonomous robot, and inactive muscles may be used as fuel cells to help drive active muscles.

Conducting polymers may be used (and are especially useful) for embodiments of the fuel-powered charge-storage artificial muscles. An organic conducting polymer is an organic polymer that is substantially electronically conducting or can be made substantially electronically conducting by a doping process. These conducting polymers ("CPs") exhibit reversible dimensional changes upon electrically driven insertion/deinsertion (i.e., intercalation/deintercalation) of ions and associated solvent. This effect has been used to produce electrically powered conducting polymer artificial muscles (T. F. Otero, Handbook of Conducting Polymers, 3rd Ed., T. A. Skotheim and J. R. Reynolds, eds., CRC Press (2007) New York, 16-1 to 16-33; Conducting Polymer Artificial Muscles, R. H. Baughman, Synthetic Metals 78, 339 (1996)).

Such dopant intercalation and deintercalation may be utilized to provide fuel-powered artificial muscles. In some embodiments, materials and methods that have been employed for CP-based gas sensors to provide an electrical output, most significantly as a result of H2 exposure, have been used. (L. Torsi, M. Pezzuto, P. Siciliano, R. Rella, L. Sabbatini, L. Valli and P. G. Zambonin, Sensors and Actuators B: Chemical 48, 362-367 (1998); S. Sestak, C. Conn, M. Lake, A. T. Baker, J. Unsworth, Proc. SPIE 3241, 118-129 (1997); F. T. A. Vork, L. J. J. Janssen and E. Barendrecht, Electrochimica Acta 31, 1569-1575 (1986)). CPs, such as polypyrrole (Torsi (1998), Vork (1986)), poly(3-methylthiophene) (Torsi (1998)) or polyaniline (Sestak (1997)), may be coated and/or impregnated with Pt or platinum oxide (Sestak (1997)), Pt (Vork (1986)), or Cu or Pd (Torsi (1998)) nanoparticles that catalyze the oxidation of H2 to protons and may cause substantially simultaneous conductivity changes in the CP.

By replacing traditional CPs with so called "self-doped" CPs that bear acidic functionalities, including —COOH (either as part of the backbone or directly bonded to and/or tethered from the CP backbone, or as additives), approaches used for catalyst coated/impregnated CP-based H2 sensors may be modified to enable fuel-powered artificial muscles. For references on self-doped CPs, see J. W. Lee, F. Serna, J. Nickels, C. E. Schmidt, Biomacromolecules 7, 1692-1695 (2006); L. Zhang, L. Zhang, M. Wan, Y. Wei, Synthetic Metals 156, 454-458 (2006); P. C. Ewbank, R. S. Loewe, L. Zhai, J. Reddinger, G. Sauve, R. D. McCullough, Tetrahedron 60, 11269-11275 (2004); T.-Y. Lee, Y.-B Shim, S. C. Shin, Synthetic Metals 126, 105-110 (2002); D. Delabouglise, F. Garnier, New J. Chem, 15, 233-34 (1991); for —PO3H2, see K. Stokes, K. Heuze, R. D. McCullough, Macromolecules 36, 7114-7118 (2003); K. Heuze, R. D. McCullough, Polymer Preprints (American Chemical Society, Division of Polymer Chemistry) 40, 854 (1999); for —SO3H, see Y. Ikenoue, Y., Saida, M. Ikira, H. Tomozawa, H. Yashima, M. J. Kobayashi, Chem. Soc., Chem. Commum., 1694 (1990); J. Yue, A. J. Epstein, J. Am. Chem. Soc. 112, 2800-2801 (1990); M. T. Nguyen, A. F. Diaz, Macromolecules 27, 7003-5 (1994); S. Shimizu, T. Saitoh, M. Uzawa, M. Yuassa, K. Yano, K., T. Maruyama, K. Wantanabe, Synthetic Met. 85, 1337-1338 (1997); X.-L Wei, Y. Z. Wang, S. M. Long, C. Bobeczko, A. J. Epstein, J. Am. Chem. Soc. 118, 2545-2555 (1996); G. A.

Diaz-Quijada, B. M. Pinto, S. Holdcroft, Macromolecules 29, 5416-5421 (1996); for —B(OH)$_2$, see 1. Yu, B. A. Deore, C. L. Recksiedler, T. C. Corkery, A. S. Abd-EI-Aziz, M. S. Freund, Macromolecules 38, 10022-10026 (2005); B. A. Deore, I. Yu, P. M. Aguiar, C. Recksiedler, S. Kroeker, M. S. Freund, Chemistry of Materials 17, 3803-3805 (2005)], —NH3+, —NRH2+, —NR2H+, [F. Masdarolomoor, P. C. Innis, S. Ashraf, R. B. Kaner, G. G. Wallace, Macromol. Rapid Commun., 27, 1995-2000 (2006), M. Angelopoulos, L. Yun-hsin, R. F. Saraf, R (International Business Machines Corp., USA), Eur. Pat. Appl. No. 797218 (1997), 797218; Japan Patent No. JP09087515, S. Owaki, T. Kuroda, Jpn. Kokai Tokyo Koho (1997). Upon polymer oxidation (p-doping) the positive charges are compensated either by ejection of an equivalent number of protons from the acidic functionality, insertion of anions from an electrolyte, or a combination thereof. Ejection of protons may be made dominant by utilizing very large, and hence relatively immobile, anion.

As shown in FIG. 34, CP 3402 may be coated with a catalyst, such as Pt 3401 and laminated onto and/or composited with a proton conducting material, such as NAFION® 3403. CP 3402 may serve as the anode in a fuel-powered muscle, wherein the fuel (for instance, hydrogen) is oxidized to form protons and electrons that are injected into the actuator. Similarly, a catalyst-coated 3404 conducting polymer 3405 either laminated onto or composited with a proton conducting material such as NAFION® 3403, or suspended in a proton-conducting medium, may serve as the cathode in a fuel-powered actuator wherein an oxidant (for instance, oxygen) may be catalytically reduced, thereby injecting holes into the actuator. These actuator electrodes may be used together or in combination with the appropriate complementary actuator electrode depicted in FIGS. 2-4 to form the fuel-powered artificial muscle.

Figure 32:
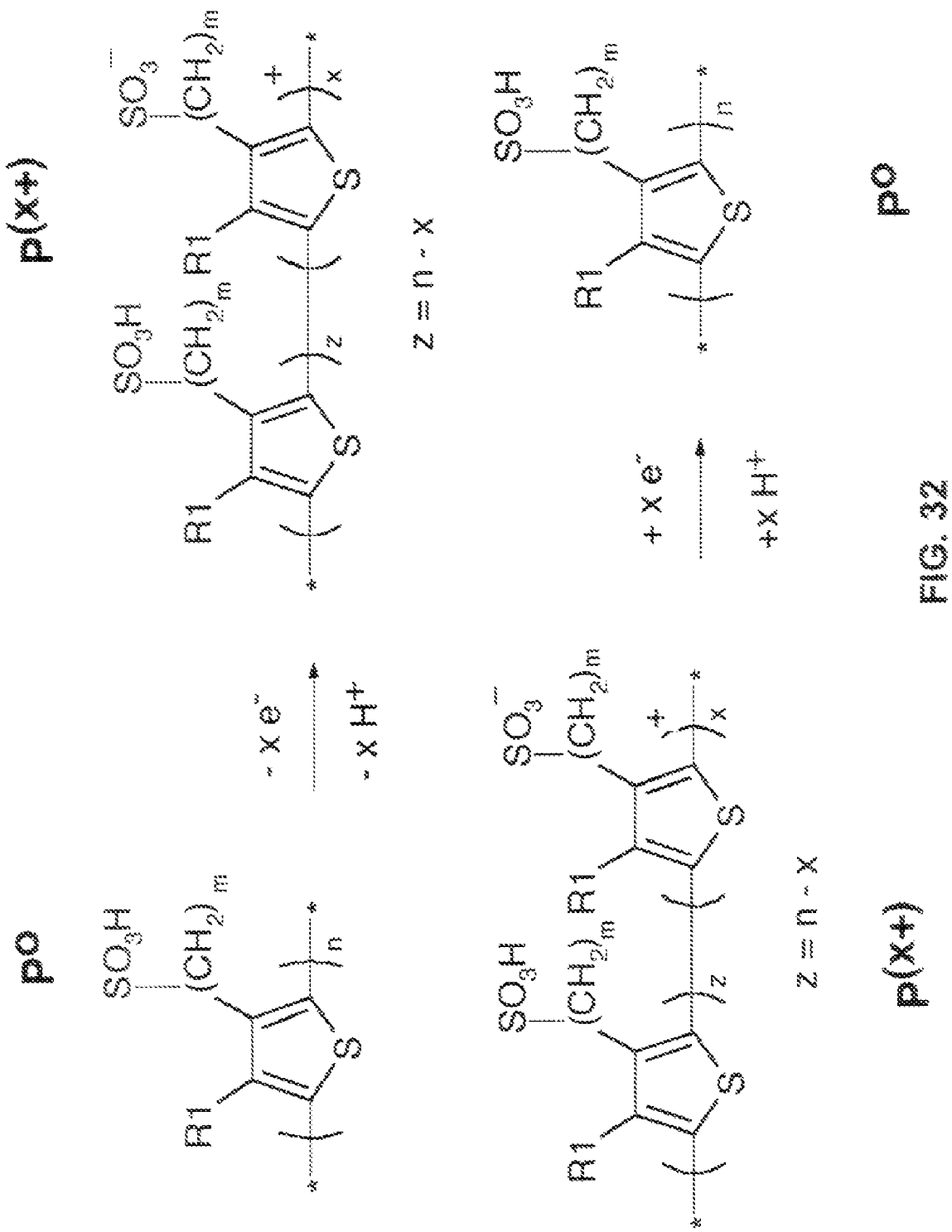
FIG. 32 depicts an embodiment of oxidation and reduction processes that can be employed to provide fuel-powered actuation by dopant ion intercalation and deintercalation for catalyst-containing conducting polymer artificial muscle electrodes.

FIG. 32 depicts an embodiment of a cathode including a (Pt- or other-) catalyst-coated poly(3-alkylthiophene) whose alkyl chain (m=0 to arbitrary length) is terminated in a sulfonic acid (—SO3H) group. In the neutral state (Po), the sulfonic acid is protonated. Catalytic reduction of oxygen (0.5x O2+2 xe-→xO=) is accompanied by oxidation (removal of x electrons) from the polymer, which becomes positively charged to the extent of electron removal (x). Charge neutrality is maintained by expulsion of the equivalent number of protons, leaving behind the self-doped polymer P (x+) (top equation in FIG. 32). On the anode side, where protons and electrons are produced by oxidation of the fuel (e.g., H2→2H++2e-), these species may be injected into, and thus reduce, an already self-doped polymer, P(x+) (bottom equation in FIG. 32). Starting with an undoped polymer Po at the cathode and a fully doped polymer P(x+) (i.e., up to its normal maximum doping capacity) at the anode and electrically shorting the electrodes through an external circuit while providing a means to transport protons between the electrodes (for instance, an acidic solution or proton-conducting membrane), the polymers will come into equilibrium, wherein both electrodes are now charged to P(x/2)+. Subsequent open-circuit charging upon exposure of the catalyst-coated anode to fuel and the catalyst-coated cathode to oxidant (e.g., oxygen or air) may drive the anode from a P(x/2)+ to a Po charge state, and the cathode from a P(x/2)+ to a P(x+) state with substantially simultaneous actuation of both electrodes.

Figure 33:
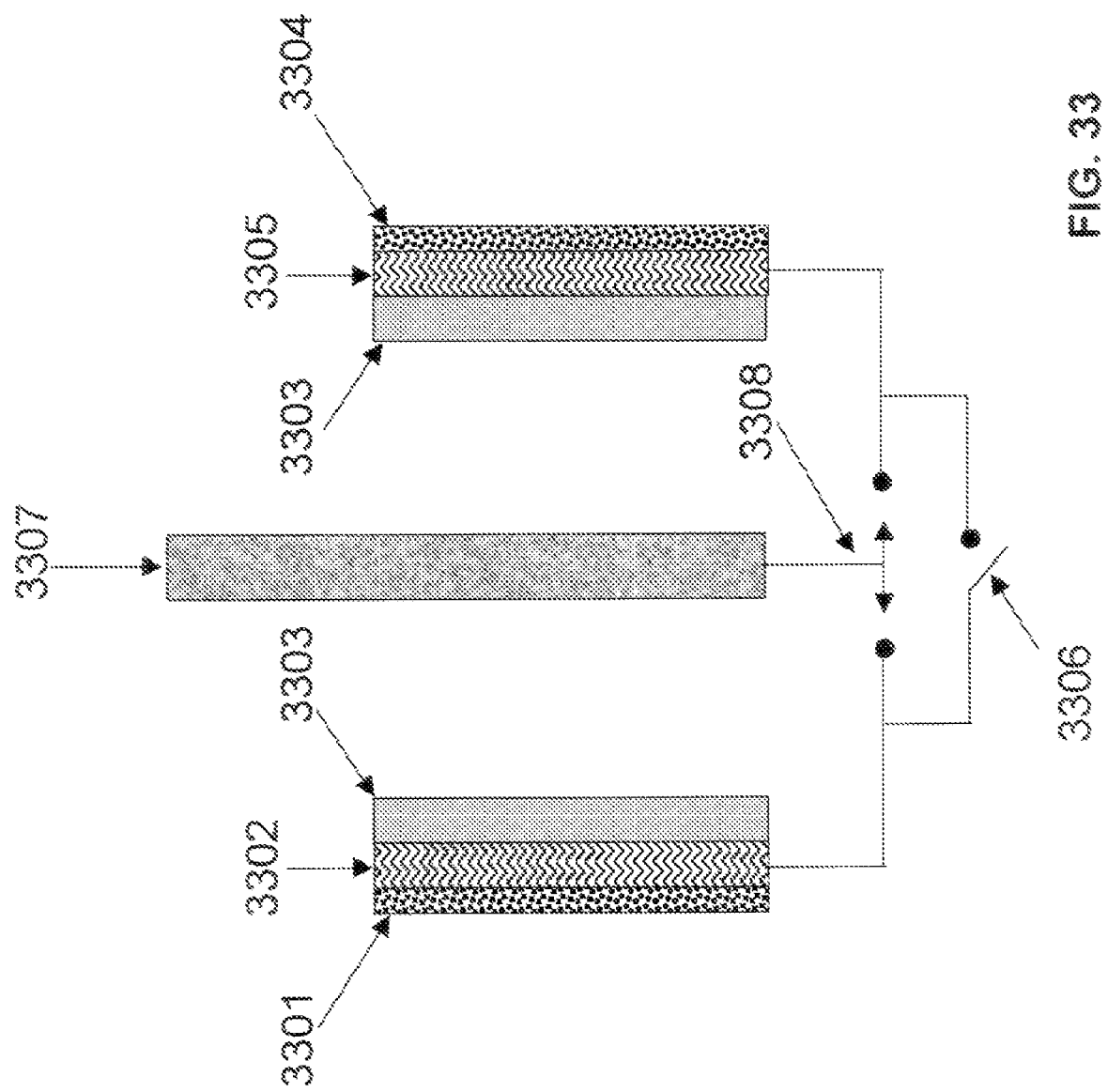
FIG. 33 schematically illustrates an embodiment of a three-electrode, fuel-powered artificial muscle, in which the third electrode operates as an actuator using predominately dopant ion intercalation and deintercalation.

As shown in FIG. 33, closing the circuit 3306 electrically shorts the electrodes, causing electrons to flow from the anode to the cathode, the equivalent number of protons to transport across the proton-conducting membrane 3303, and the return of the respective electrodes to prior dimensions and/or orientations. Thus a fuel-powered artificial muscle may be activated by alternately opening and closing the electrical circuit between the ionically shorted anode and cathode.

The anode and cathode may be the same or different. In some embodiments, the above-described anode materials may be used with a cathode including a poly(terthiophene carboxylic acid) appended by a 1,5-diaminonaphthalene copper complex, that has been shown to effect the electrocatalytic reduction of molecular oxygen. (M. Boopathi, M.-S Won, Y. H. Kim, S. C. Shin, Y.-B Shim, Journal of the Electrochemical Society 149, E265-E271 (2002).)

Another embodiment immerses an actuating electrode 3307 in a proton conducting medium such as the ionic liquid imidazolium bis(trifluoromethyl)sulfonimide (Md. A. B. H. Susan et al, Chem. Commun 8, 938 (2003)) that lies between the anode and cathode of a fuel cell. In this configuration, the actuating electrode may serve as the counter electrode to either the anode assembly 3301/3302/3303 or cathode assembly 3303/3304/3305 by using switch 3308. This allows the use of anode and cathode materials and catalysts like Au, Pt—Ni, Pt/C, PtRu/C, Pt/Ir, Pr/Mo that have bee reported for direct methanol fuel cells (DMFC) (K. Miyazaki, Y. Nishida, K. Matsuoka, Y. Iriyama, T. Abe, M. Matsuoka, K. Kikuchi, Z. Ogumi, Electrochemistry (Tokyo, Japan) 75, 217-220 (2007); Y. Seo, Y. Kim, U. Chung, W. Chung, Diffusion and Defect Data—Solid State Data, Pt. B: Solid State Phenomena 119 (Nanocomposites and Nanoporous Materials), 247-250 (2007); Y. Zhu, E. Brosha, P. Zelenay, Proceedings—Electrochemical Society 2002-31 (Proton Conducting Membrane Fuel Cells III), 490-505 (2005); S. Fukunaga, K. Sone, Jpn. Kokai Tokkyo Koho 10 pp. CODEN: JP 2005116416 (2005); A. Missiroli, F. Soavi, M. Mastragostino, Electrochemical and Solid-State Letters 8, A110-A114 (2005); H. Tsaprailis, V. I. Birss, Electrochemical and Solid-State Letters 7, A348-A352 (2004); Y. Takasu, H. Itaya, T. Kawaguchi, W. Sugimoto, Y. Murakami, Studies in Surface Science and Catalysis 145 (Science and Technology in Catalysis 2002), 279-282 (2003).

A further modification would retain the ionic liquid or other proton conducting medium (e.g., an inorganic or organic acid) in the anode and cathode compartments but separate these compartments with a proton conducting membrane like NAFION® or other perfluorosulfonic acid polymeric membranes. Likewise, other membrane separators including ceramic foils (S. Augustin, V. Hennige, G. Horpel and C. Hying, Desalination 146, 23-28 (2002)), sulfinated, sulfonated or aminated homopolymers of polysulfone, PSU or poly(ether ether ketones, PEEK (W. Cui, Fortschritt-Berichte 596, 1-172 (1999)), graft copolymers (M. Patri, V. R. Hande, S. Phadnis, B. Somaiah, S. Roychoudhury, and P. C. Deb, Polymers or Advanced Technologies, 15 (5), 270-274 (2004)), sulfonated random or block copolymers (J. E. McGrath, ACS Preprints (Fuel Chemistry) 51(2), 371-372 (2006)), blends (H. Pei, L. Hong and J. Y. Lee, J. Membrane Sci. 270, 169-178 (2006)) and phosphonic acid functionalized oligosiloxanes [H. Steininger, M. Schuster, K. D. Kreuer and J. Maier, Solid State Ionics 177, 2457-2462 (2006)] can be utilized as a proton conducting separator.

Many fuels can be used to drive the fuel-powered actuators including H2, C1-C6 alcohols (U.S. Patent Application Publication No. 20040093791 (Finkelshtain et al., published May 20, 2004); polyols (I. Gillet and R. Linard, Belg. IEE Conference Publication 192, 85-6 (1981)); dimethyl ether (J. H. Yoo, H.-G. Choi, C.-H Chung, and M. Cho, Journal of Power Sources 163(1), 103-106 (2006)), and formic acid (U.S. Patent Application Publication No. 20060059769 (Masel et al., published Mar. 23, 2006)).

Other typical examples of useful actuating polymers include a 3-substituted, or 3,4-disubstituted polythiophene in which R1 is a combination of linear or branched alkyl groups and R2=—H, or R1,2=a combination of the same or different linear or branched alkyl groups. R1 and R2 may likewise be a combination of linear or branched alkyl groups with aromatic or heteroaromatic group, each unsubstituted or substituted with alkyl, aryl, halo, amino, ether, or a combination of —H and aromatic or heteroaromatic groups.

Conducting polymers that may be used (and are particularly useful) include polypyrroles, polyanilines, polyphenylenes, polyphenylene vinylenes with functionalities described above, since their redox activity typically lies within the potential window provided by the fuel/oxidant couple (1.23 V vs. NHE for H2/O2; ca 0.8 V for direct methanol fuel cells).

In another embodiment, a charge-storage fuel cell muscle does not require separate fuel and oxidant containment systems. In this embodiment, which can be applicable for other embodiments of the charge-storage fuel cell muscles of the present application, a mixture of fuel and oxidant is provided in a single chamber containing the muscle material (which may operate either capacitively, by intercalation, or a combination of these processes), actuating and counter electrodes, and electrolyte. This embodiment is enabled by the existence of catalysts that promote largely oxidation or reduction. The application of one of these catalysts on the working electrode and the opposite type of these catalysts on the counter electrode enables this type of device. Catalysts that may be used for this purpose are described in more detail below when discussing "Fabricating Catalytic Electrodes."

In other embodiments, a fuel-powered artificial muscle may have only one chamber and one active element: an actuator material that . . . store charge either as a result of dopant intercalation (called an intercalatable material) or because of high surface area and electrical conductivity (and the correspondingly enabled storage of dopant ions in close vicinity to injected charge). In this embodiment, fuel and oxidizing agent may be alternately provided in the compartment in which the muscle is located. Fuel and oxidizer that can combine to provide volatilizable products may be used for this embodiment (and there are advantages in doing so). In certain embodiments, for insuring cyclability for this type of fuel-powered artificial muscle, it can be desired that substantially all products resulting from the reaction of fuel and oxidizer have a boiling point below 150° C. The mentioned high-surface-area actuating material may be electrically conducting, and may either contain a catalyst for at least fuel oxidation or be itself catalytic for fuel oxidation. The intercalatable material need not be electrically conducting but may either contain a catalyst for at least fuel oxidation or be itself catalytic for fuel oxidation. H2 and an oxidant. Such as oxygen or H2O2, may be used for fuel and oxidant. The above self-doped conducting polymers may be used as the intercalatable actuating material.

Substantial heat is generated during the above actuation cycle for this type of fuel-driven artificial muscle. This released heat can be used to drive a shape memory actuator or a thermal bimorph actuator of generic types described below when discussing "Fuel Powered Thermal Muscles." In the embodiments, a shape memory actuator or biomorph actuator may be proximate the optionally single-active-element fuel-powered muscle in the above described one-compartment device. In some embodiments, the actuation cycle results for alternating exposure to H2 and O2. A H2 dopable catalyst-containing intercalatable conducting polymer layer may be applied as a surface coating to a shape memory wire. During the de-intercalation process for H+ and associated solvating species (such as water) upon exposure to O2, associated heat release and temperature rise resulting from exposure of the electron doped conducting polymer to the oxidant (typically O2), the conducting polymer may shrink. As a result of corresponding heating of a shape memory alloy like NiTi, this shrinkage would be enhanced by the shrinkage of the shape memory material as a result of temperature increase. Alternatively, the dimensional changes of the conducting polymer and the shape memory composition may be mechanically uncoupled to provide separately usable actuator strokes, such as by loosely including a shape memory fiber or shape memory fiber array within a hollow conducting polymer fiber.

Alternatively, as one of other possible embodiments of this combined mechanism approach, a H2 dopable conducting polymer may be included as one layer of a two-layer cantilever actuator. The other bimorph layer can, for example, be an ordinary metal. In some embodiments, the dimensional effects of conducting polymer intercalation and subsequent deintercalation may be combined with dimensional effects associated with temperature changes to provide bending actuation during heating and cooling portions of the actuator cycle.

FIG. 25 schematically illustrates an embodiment of a three-electrode hydrogen powered artificial muscle cell in which the third electrode is actuated by double layer charge injection. Here electrodes 2510 and 2530 are conventional fuel cell electrodes, typically including catalyst bearing gas diffusion layers. Fuel 2515 is oxidized at electrode 2510, while oxygen 2535 is reduced at electrode 2530. At least one of these electrodes (for instance only the hydrogen electrode) is laminated to a gas separation membrane 2520 and 2525. The actuating electrode 2540, which is actuated by double layer charge injection, may be located within a liquid or gel electrolyte 2550 which can be conductive for both anions and cations or just the relevant cation (in this case H+).

This may be fixed to the base of the cell assembly and coupled to an external load 2590. At least one actuating electrode is required; however, multiple electrodes may also be employed. In this embodiment, the fuel cell is optionally coupled to external load 2582 using switch 2580 to supply auxiliary electrical power to one or more external devices. Each of a possible multiplicity of actuating electrodes 2540 is connected to both fuel electrode 2510 and oxygen electrode 2530 by switchable connections. The circuits for closed switch 2560 (with switch 2570 open) and closed switch 2570 (with switch 2560 open) can optionally contain external elements that receive power during closed circuit condition. Charge can be provided to the actuating electrode by the transfer of electrons from the fuel electrode 2510 via the switch 2560 (while switch 2570 is open). Charge may also be provided by the transfer of holes from oxygen electrode 2530 to the actuating electrode via switch 2570 (while switch 2560 is open). After the double layer charged electrode is charged (by either closing switch 2560 while switch 2570 is open or closing switch 2570 while switch 2560 is open) the actuation process is reversed by substantially simultaneously opening the closed switch and closing the open switch. The time period that these switches are open and closed during the charge and discharge cycles may be selected to maximize actuator stroke.

There are many advantages to this form of fuel cell based actuator. For instance, many substantially simultaneous motions may be provided by utilizing a plurality of actuating electrodes (each with associated switches), while reducing (and minimizing) the complexity of fuel and oxidizer delivery systems. This would have application to portable Braille displays, artificial hands, anthropomorphic robotic faces, aircraft smart skins or any other application in which a large number of relatively small scale actuators are required to operate independently in a relatively small area. The fuel cell electrodes may be operated at an efficient steady state condition. The addition of a storage battery 2585 would aid this ability (whose charging can be controlled by a switch in the battery circuit that is not pictured). Steady operation of the fuel cell would also allow electrical power to be delivered for external energy needs.

Among these other external energy needs could be for one or more remote electrically powered muscles. FIG. 25 schematically depicts an embodiment of such a device. Here an actuating electrode 2545 acting on external mechanical load 2595 actuates when it is charged with respect to counter electrode 2535, which is operated within an electrolyte which decouples the two electrodes mechanically 2555. The charging and discharging of these electrodes is controlled by switch 2565. The described combination of fuel-powered actuation, with fuel-powered electrical energy generation, allows remote operation of small actuators without the need to:

utilize primary battery power;

extend the fuel cell electrolyte to encircle the remote actuator;

require lengthy mechanical linkages to reach a remote location; and require the routing of fuel to the remote location.

These characteristics may be useful for applications which require remote actuation functionalities in locations where the routing of electrical lines would be difficult. This problem is encountered for certain aircraft, spacecraft and biomimetic applications.

Fuel-Powered Thermal Muscles

Other embodiments of fuel-powered muscle utilize heat generated by fuel cell redox reactions to provide actuation. One embodiment of this actuation is accomplished by using the martensite to austenite phase transformation in an alloy that can provide a two-way, one-way, or mixed mode shape memory effect. Many suitable shape memory alloy compositions are described by K. Shimizu and T. Tadaki in "Shape Memory Alloys (H. Funakubo, Ed., Gordon and Breach Science Publishers, 1987) and by Z. G. Wei, R. Sandstrom and S. Miyazaki in "Review, Shape memory materials and hybrid composites for smart systems: Part 1 Shape-Memory Materials," Journal of Materials Science 33, 3743-3762 (1998).

Some examples of commercially available useful compositions are (a) NiTi alloys containing about approximately equal atomic ratios of Ni and Ti (and transition temperatures that strongly depend upon precise composition); (b) NiTiCu alloys (with typical atomic percents of Ti (50%), Ni (40-42%), and Cu (10-7.5%); the advantage of as low as 10° C. hysteresis, which simplifies actuator stroke control; and relatively weak dependence of transition temperatures on composition); and (c) NiTiNb alloys (with up to 150° C. hysteresis, which is advantageous for clamping applications, and a commercially available atomic composition of Ti (43%), Ni (47%), and Nb (9%)). High temperature shape memory alloys that are commercially significant are obtained by substituting palladium, platinum and/or gold for the nickel in NiTi and by substituting the titanium in NiTi with hafnium and zirconium by up to 20 atomic percent (thereby obtaining shape memory alloys with transition temperature up to 600° C.). For reasons of cost, a significant commercial alloy may be of the type NiTiHf. Copper-based shape memory alloys provide a lower cost alternative to NiTi, and CuZnAl, CuAlMn, and CuAlBe alloys are in commercial use. Also available are CuAlMn and CuAlBe shape memory alloys, and a CuSn shape memory alloy is known. These copper containing alloys can be sensitive to aging effects, but a fourth element can be added to improve stability. Iron containing shape memory alloys are also useful for certain embodiments, such as FeMnSi, FeCrNiMnSiCo, and FeNiC compositions that are typically only one-way materials. FeNiCoTi is also interesting for certain embodiments, since it is thermo-elastic, has high recovery stress up to 1 GPa, thermal hysteresis between 20° C. and 40° C. and transformation temperatures as low as room temperature. These and the many other shape memory alloy compositions known in the art can be used for embodiments of the present invention. Fe—Pt and Fe—Pd alloys are able to change phases when exposed to a magnetic field, and this feature can be combined with the fuel-powered actuation of certain embodiments.

In general, the two-way shape memory effect is a phenomenon in which a shape memory alloy recovers its original configuration upon heating and deforms into another "trained" configuration upon cooling. Several training methods are known and available (W. Huang, W. Toh; Training Two-Way Shape Memory Alloy by Reheat Treatment, Journal of Materials Science Letters 19, 1549-1550 (2000)). The shape memory alloy reversibly changes shape while undergoing a heating and cooling cycle in the absence of an externally applied biasing force.

In other embodiments, actuation is accomplished by using a shape memory alloy (SMA) that displays a partial two-way shape memory effect, such as that shown by FLEXINOL® wires made by Dynalloy, Inc. (Costa Mesa, Calif.). In this case, maximum life and strain may be achieved by providing a reverse biasing force (typically 10-20% of the actuating force) that aides the return of the wire to its original shape. While reverse bias is not always required (such as for the FLEXINOL® product), long-term performance may be greatly enhanced when a reverse bias force is used. In some embodiments, a two-way effect requiring training may be used, since under certain circumstances the austenite to martensite phase transformation does result in dimensional changes for untrained material. This is demonstrated by Y. Zhang, Y. T. Cheng and D. S. Grummon (Shape Memory Surfaces, Applied Physics Letters 89, 041912 (2006)) in which reversible surface deformations were demonstrated following a single cycle deformation event (a dent created by a spherical indenter).

In some embodiments of this type of fuel-powered muscle, both fuel oxidation and oxygen reduction reactions occur on the same actuating element. Pt-coated NiTi shape memory wire may be used as a fuel-powered muscle. Fuel may include hydrogen, methanol, or formic acid as fuel, and O2 may be used as the oxidizer. In certain embodiments, an applied force facilitates shape memory recovery to the low temperature state. This applied force (whether applied using weights, springs, or other means) may allow high cycle life.

Figure 8:
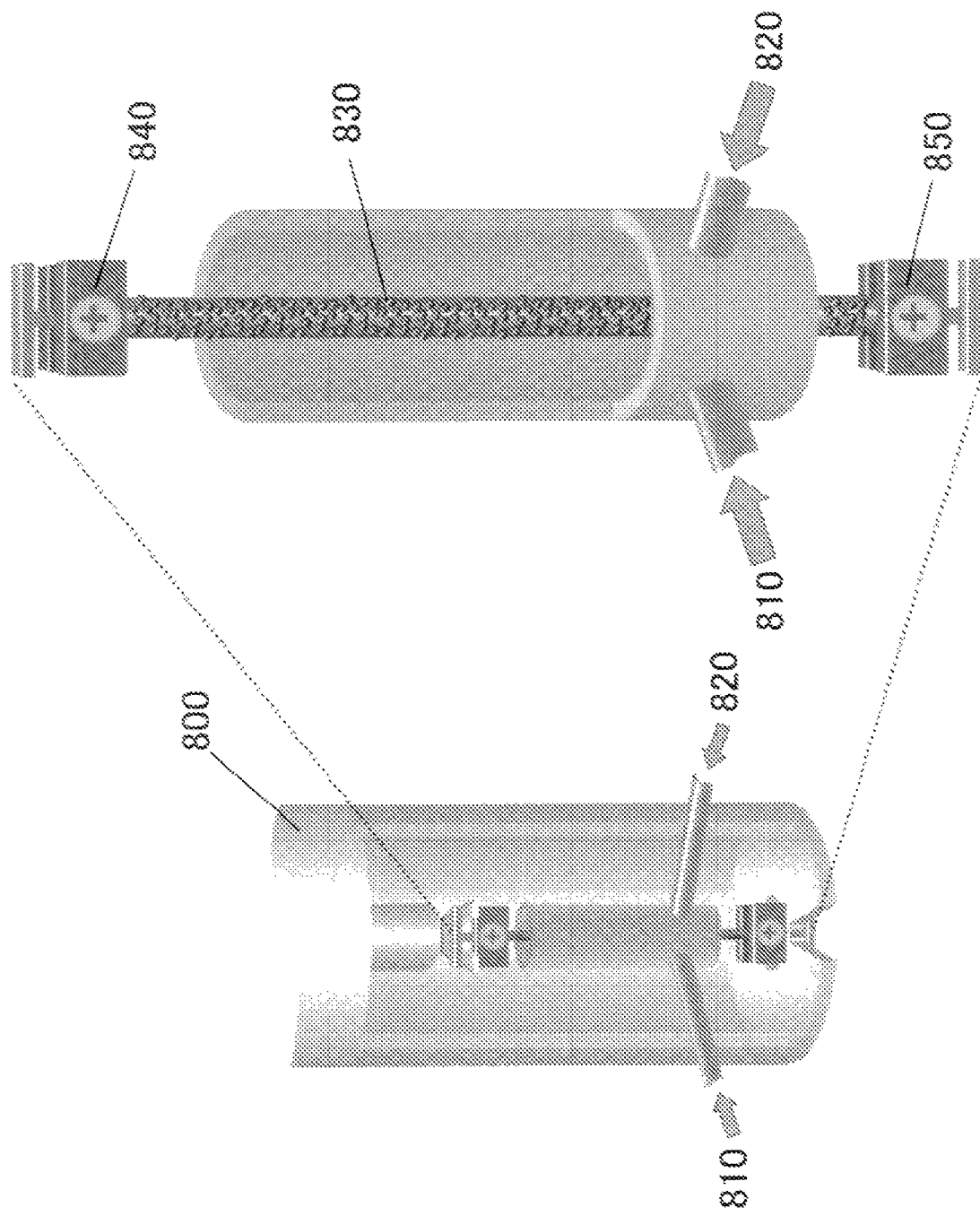
FIG. 8 schematically illustrates an embodiment of measurement equipment and gas supply configuration used for characterizing fuel-powered actuation of a Pt-coated shape memory alloy wire.

In FIG. 8, an embodiment of a fuel-powered actuating element is shown packaged in a container within a strain measurement device. The dynamic mechanical analyzer provides clamps 840 and 850 to the platinum-coated shape memory wire 830. Contact of the fuel and an oxidant, provided through entrance ports 820 and 810, may cause the mechanically loaded shape memory wire to heat to above the austenitic phase transition temperature and do mechanical work during the resulting contraction. Upon interruption of the fuel, the shape memory wire cools to below its martensitic phase transition temperature and returns to its original length.

Figure 9:
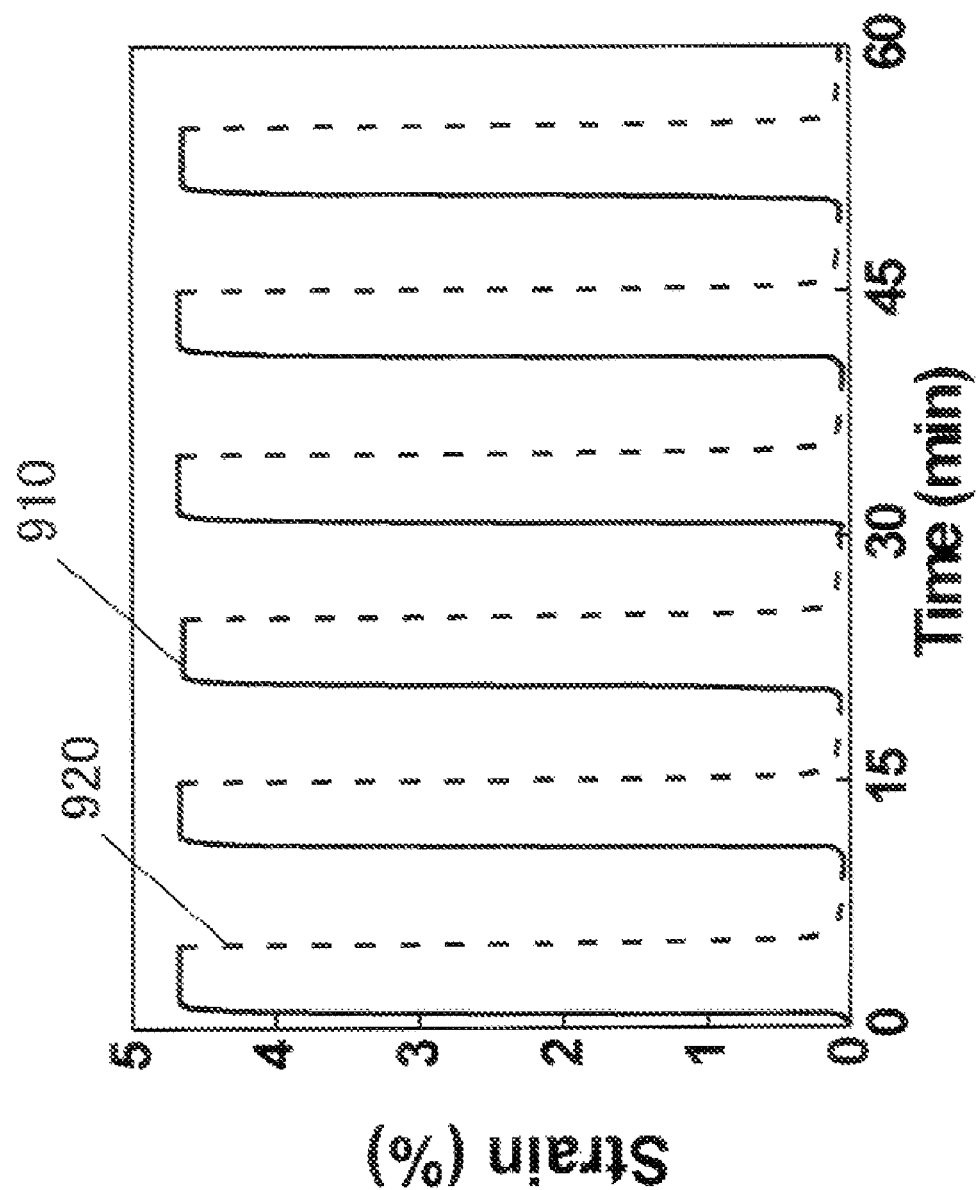
FIG. 9 shows actuator strain as a function of time during cycling a Pt-coated shape memory wire in the embodiment of FIG. 8. The cycling was accomplished by alternately turning "on" and "off" the flow of the fuel (H2) and oxidant (O2) mixture.

Actuator strain as a function of time and fuel delivery (solid lines 910) and fuel cut-off (dashed lines 920) is shown in FIG. 9 for a 150 MPa applied load, and a non-combustible fuel mixture (a mixture of N2, 2.5% by volume hydrogen, and 50% by volume oxygen). For safety reasons this use of a fuel mixture that is non-combustible is often desired. This fuel-powered muscle generated ~150 MPa or higher stress while undergoing ~5% stroke when powered by a mixture of oxygen (or air) and either methanol vapor, formic acid vapor, or a non-combustible mixture of hydrogen in inert gas. This stress generation is ~500× the typical stress for human skeletal muscle (0.3 MPa), while the percent stroke is ~25% that of natural muscle. Hence, the work capability of the fuel-powered shape memory muscle on lifting a weight (5300 kJ/m3 for methanol and 6800 kJ/m3 for hydrogen or formic acid) is over a hundred times that of skeletal muscle (~40 kJ/m3). The percent contraction (5%, 7%, and 8% observed for 150, 122, and 98 MPa loads, respectively, using 2.5 volume % hydrogen in inert gas as fuel) can be increased above the ~20% typical of skeletal muscle by simply coiling the shape memory wire. This may be accomplished with a proportional decrease in stress generation. The presently achieved power density (68 W/kg during the work part of the cycle for hydrogen fuel) is similar to natural skeletal muscle, which may be 50 W/kg (J. D. W. Madden, IEEE Journal of Oceanic Engineering 29, 706 (2004)).

The achieved power density may be increased by increasing the loading of catalyst of the shape memory wire, increasing the fuel and oxidant delivery rate and/or using a fuel composition that optimizes reaction rate without requiring the use of explosive mixtures for which the control of reaction rate may be costly for many actuator applications.

This initially obtained performance indicates that fuel-powered shape memory muscles are suitable for applications such as powering an autonomous robot or a prosthetic limb. In certain embodiments, fuel-powered, thermally driven shape memory actuators may usefully be employed for opening or closing fasteners and even for breaking bolts.

These muscles provide advantages over alternatively possible fuel-cell-driven electrical actuators, since they harvest a portion of the ~60% energy loss due to fuel cell heating and eliminate the need for electrical conditioning equipment and a separate fuel cell. The high gravimetric energy densities of fuels like methanol (~30× that of advanced lithium batteries) and the high speed of fuel container replacement, compared with battery recharge, provide major advantages over battery powered muscles.

In some fuel-powered thermal actuator embodiments, different shape memory materials (having different transition temperatures) or different dimension shape memory materials may be located in the actuator as either parallel arrays (like parallel wires), serial arrays (like wires attached end-to-end), or in combinations of parallel and serial arrays. In these actuator array elements, differing weights of catalyst (relative to the actuator weight of catalyst) or catalysts having different catalytic activities may be placed on the same or different shape memory compositions and those having different accessibility to the fuel/oxidizer mixture and/or cooling. Some of these shape memory elements may contain no catalyst and may be electrically driven. It is usually most useful for the actuation of in-parallel sub-units to be matched in stroke, so the greatest design flexibility enabled by this invention embodiment is in the choice of serially placed actuator subunits (like parts of a wire). However, when the goal is not to maximize actuator volumetric work capacity, it is sometimes useful to use in-parallel elements that are not always matched in stroke.

These combinations provide a variety of benefits, which include (a) making actuation a tunable function of fuel delivery time and cooling periods (or having a desired time dependence of actuator response as a function of fuel delivery time and cooling periods), which is useful for actuator control, and (b) a compliance that is independently tunable from actuator stroke (which is advantageous for mimicking natural muscle for prosthetic devices and humanoid robots).

Figures 22A, 22B:
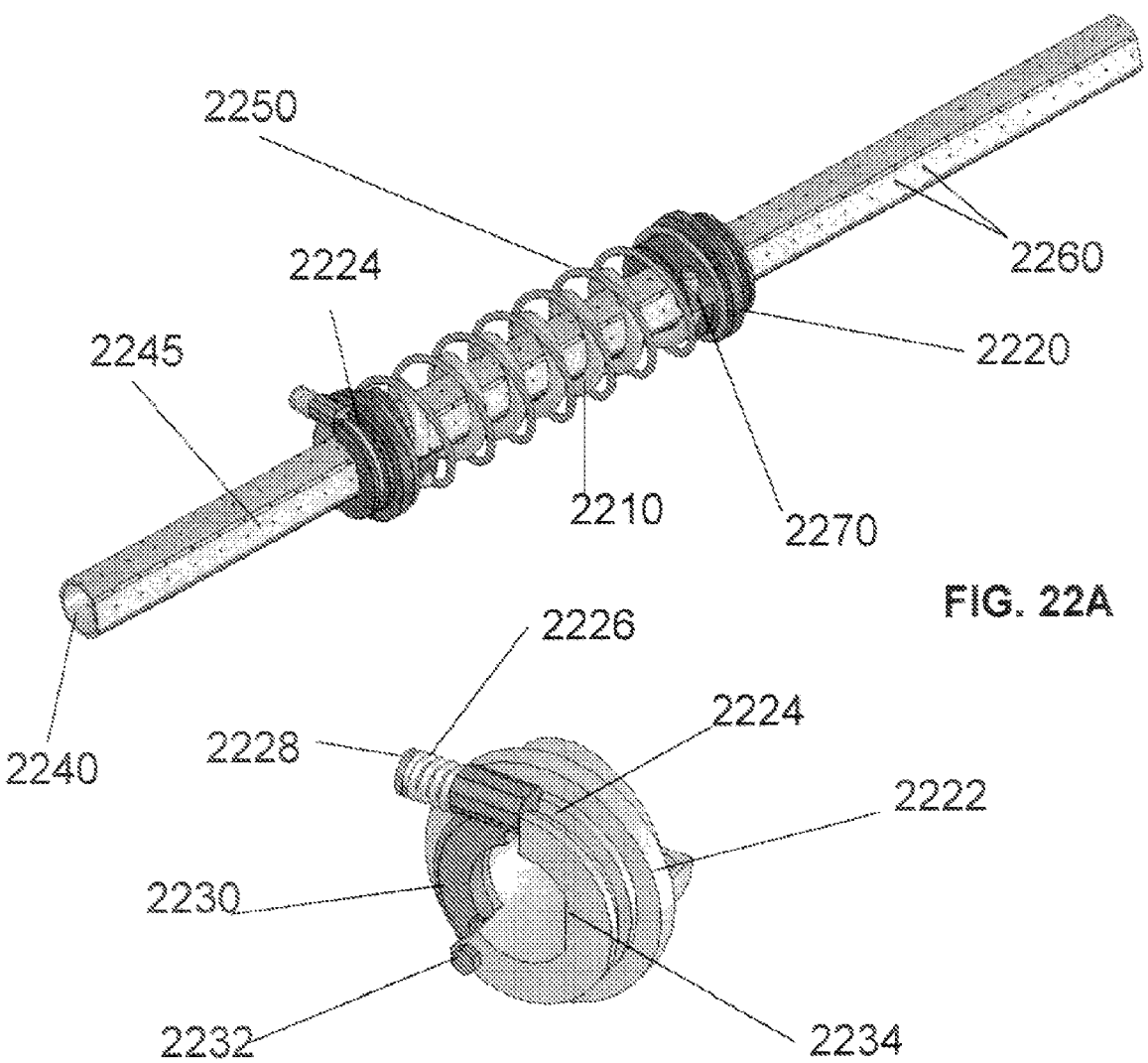
FIGS. 22A and 22B schematically illustrate an embodiment of an inch-worm type drive, wherein both the main actuation (22A) and latching (22B) are provided by fuel-powered shape memory actuators.

FIG. 22A illustrates an embodiment of an inch-worm type motor based on a fuel-powered shape memory actuator. At the core of this motor is a catalyst-coated extension spring 2210 mounted between two end clamp assemblies 2220 and 2224. The end clamp assemblies clamp the device to the rail 2240. Movement of the motor along the rail is accomplished as follows:

a. With the right hand latching device 2220 (such as a clamp) engaged on the rail and the left hand clamp released, the spring 2210 contracts upon fuel/oxidizer delivery, resulting in the movement of the left hand clamp to the right.

b. At this point, the left hand latching device 2224 (such as a clamp) engages onto the rail.

c. The right hand clamp 2220 is then released. Upon cut-off of fuel delivery, cooling of the spring 2210, combined with the bias force supplied by compression spring 2250 act to shift the right hand clamp further to the right.

d. When the cooling cycle is complete, the right hand clamp re-engages the rail 2240 and the left hand clamp is released. The system is now ready for the next cycle.

The latching devices may be an integral part of the operation of such devices. In many of the embodiments of the present invention many benefit from a latch depending upon the circumstance. In addition to the function shown here, latching devices may provide the ability for an actuator to hold a position without expending much energy. If devised as a normally closed device, no energy may be required to hold the position providing the latch load capacity is not exceeded.

The latches are depicted in greater detail on FIG. 22B. In this actuator embodiment, SMA wires 2224 draw a clamp lever 2230 rotating on pin 2232 against the rail 2240. The SMA wire may be contained within a channel in the clamp housing 2222, which also incorporates a retaining hole 2270 (FIG. 22A) to retain the main extension spring 2210. The bias force needed to fully cycle the SMA is provided by a very stiff spring 2226 acting against a disk terminating the SMA wire 2228. In some embodiments, a Belleville spring may be particularly useful choice for 2226. The SMA in this embodiment may be either electrically actuated or fuel-powered. The clamp housing 2222 serves another function. It incorporates a feature 2234 which mates with a similar feature on the rail 2245 (FIG. 22A). This feature inhibits rotation on the shaft. However, if unconstrained, the natural elongation and contraction of the drive spring 2210 (FIG. 22A) on the shaft may result in rotation. Therefore, by fixing one portion (e.g., end) of an inch-worm motor to the shaft and allowing free rotation of the other end, a rotary actuator may be created. Thus the same basic structure may be used to form both linear and rotary devices, thereby allowing economic implementation.

Fuel delivery to the main spring may be provided through small holes in the rail 2260 (FIG. 22A). Since it may be uneconomical to spray from all holes, a fuel distribution component or sub-assembly (not shown) which runs internal to the tube may be coupled (e.g., magnetically) to the end latch assemblies. This would allow fuel to be ejected only through the holes 2260 between the two end clamps.

Figure 7:
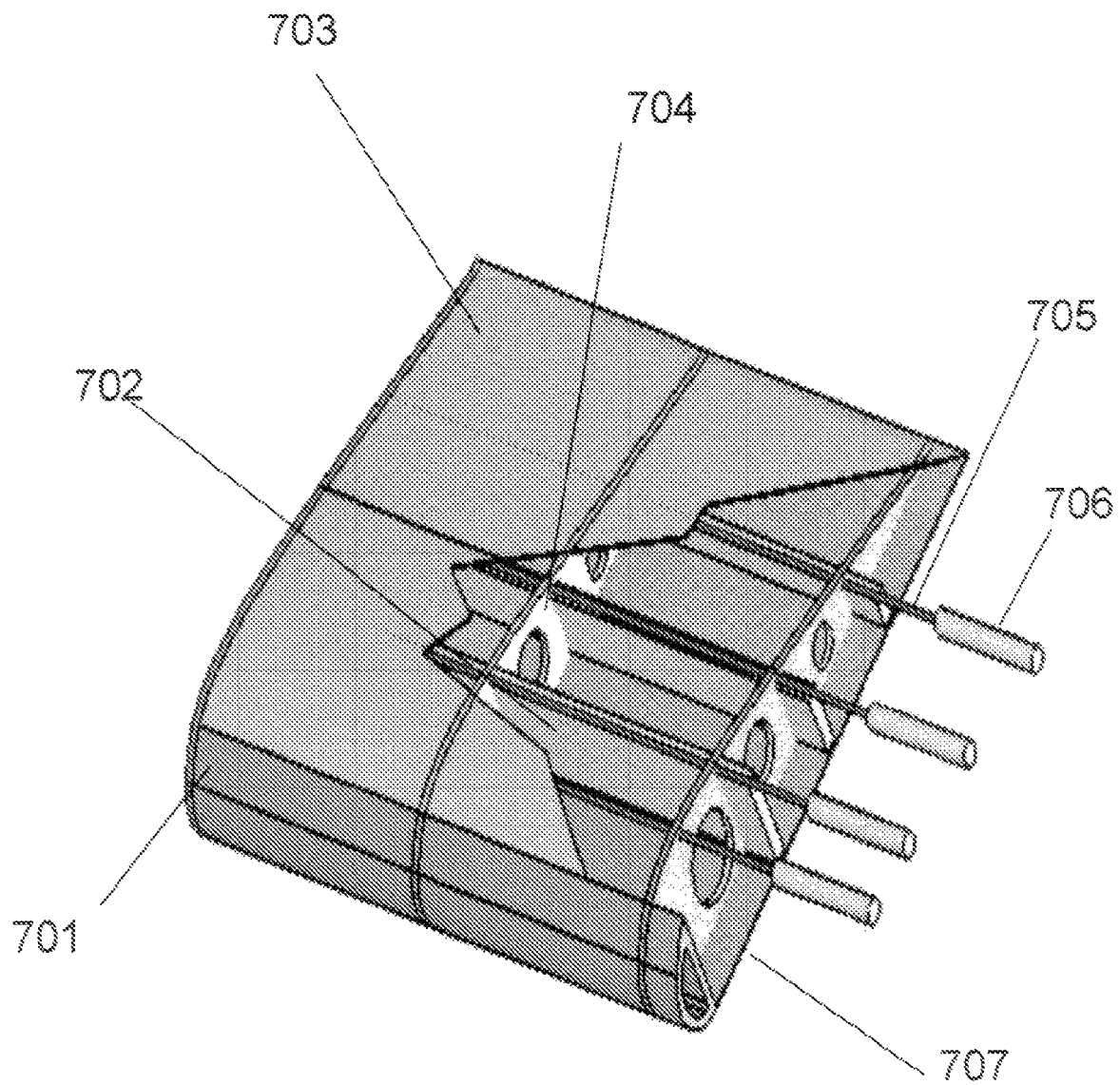
FIG. 7 schematically illustrates the use of fuel-powered shape memory wires for morphing the wings and changing wing stiffness of a microair vehicle.

FIG. 7 depicts an embodiment of a wing section of a microair vehicle that has embedded fuel-powered artificial muscles that are thermally driven. These muscles may be used either to morph the wing or to provide tunable dampening and stiffness characteristics. The sub-structure of the wing includes spars 702 and ribs 704. To these are applied the airfoil surfaces including the leading edge structure 701, the upper skin 703, and the lower skin 707. In this figure, several fuel-powered artificial muscles 706 are employed to actuate tendons 705. The entire length of the tendon may include a fuel-powered shape memory actuator or a parallel array of such actuators.

FIGS. 20A and 20B depict two views of an embodiment of a fuel-powered shape memory actuator which is operated as an oscillator. This actuator may be controlled by controlling the delivery of the fuel/oxidant mixture 2075 (FIG. 20B), so that alternating vertical motions in opposite directions are provided. This causes a comb drive 2010 (FIG. 20A) to engage a ratcheting gear 2025, which engages shaft 2035 (FIG. 20B) via a roller clutch (not shown), allowing one-way rotary motion. This motion causes energy to be stored in the spring 2030. In some embodiments, spring 2030 is a continuous force spring. Discharge of the spring may be accomplished by the utilization of a variable brake or clutch 2040, which inhibits or limits rotation of the output shaft 2050.

FIG. 24B depicts an embodiment of an I-beam shaped actuator 2410, which may be made from a NiTi SMA. The beam 2460, as shown in FIG. 24D, includes two hollow flanges 2466 and a mechanical interconnect 2463 between these flanges. This is depicted in FIG. 24B, in which a fuel/air mixture is supplied inside the hollows 2423 of flanges 2466. Hollows 2423 may include catalyst-coated surfaces. As the entire beam becomes shorter, work is performed in the presence of an external load (not shown). This load may also supply a restoring bias force if desired.

FIG. 24C depicts an I-beam 2430 for which an upward bending displacement has occurred. This bending may be accomplished by supplying a mix of fuel and oxidizer inside only the hollow of the upper flange 2435.

FIG. 24D illustrates the opposite effect, in which the fuel and oxidizer are only supplied to flange 2445 of I-beam 2440. While this embodiment describes a fuel-powered shape memory actuator, other fuel-powered actuators known in the art may be used.

The fuel-powered embodiments of FIGS. 24A, 24B, 24C, and 24D advantageously allow independently controllable, but coupled, tunability of compliance and actuation—by effecting different degrees of phase transformation to the top and bottom flanges. For instance, the upward actuation motion may be stiffened if the martensite fraction of the lower flange were reduced by fuel-powered heating.

The ability to use fuel-powered shape memory heating to provide independent compliance is especially desirable. For instance, the muscles in the arm of a humanoid robot may provide needed actuator strains as well as tunable stiffness (rather than compliance) for the arm to successfully catch a ball. One approach for shape memory muscles used in tension is to vary the muscle cross section along the muscle length. If fuel-powered uniform heating is provided along the muscle length, the strain of actuation would be unchanged by variation in muscle diameter. However, the compliance of the muscle may be changed, so as to become adjustable independently of the actuator stroke, by employing selective fuel-powered heating of different diameter sections of the muscle, such as by controlling fuel/oxidant delivery to these different diameter segments.

For instance, consider a muscle fiber in which one half of the fiber has a different diameter than the other half. Fuel-powered heating of either half would provide the same actuator stroke. However, the effective stiffness and compliance of the fiber will depend upon whether the thin or thick segment of the fiber is actuated.

Figure 10:
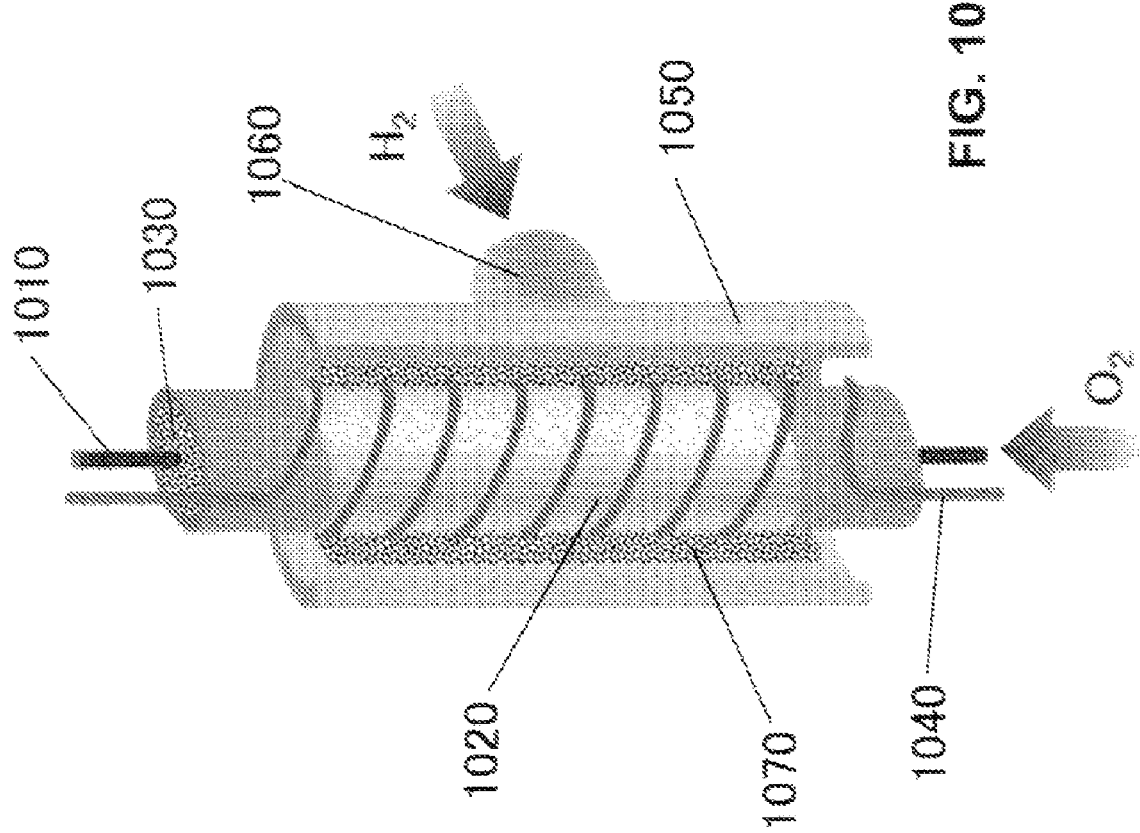
FIG. 10 schematically illustrates an embodiment of a hybrid fuel-powered shape memory wire mechanical actuator that functions both as a fuel cell and as a muscle that is powered by a mixture of fuel and oxidant.

In some embodiments of fuel-powered artificial muscles, electrically conducting shape memory materials are used as actuating materials in electrochemical cells. Such an embodiment is shown in FIG. 10. In these types of devices, an electrically conducting shape memory material is part of the working electrode, the counter electrode, or both. In these embodiments, actuation of the thermal shape memory may be driven by using electrical heating from fuel cell operation, heating from mixing both oxidant and reductant (like air and hydrogen) in the electrode compartment, or by a combination thereof.

In FIG. 10, an SMA (NiTi) wire 1010 is contained within a NAFION® ionomer tube 1020. This SMA element is the actuating electrode. NAFION® tube 1020 was loaded with Pt-containing catalyst 1030. A second electrode 1040 was wrapped around the NAFION® tube 1020. A housing 1050 was then placed around the assembly. The void space between the housing 1050 and the second electrode 1040 was filled with additional catalyst 1070. Fuel, 5% hydrogen in inert gas, was then provided through entrance port 1060 while oxygen was provided through the NAFION® tube 1020. The heat provided by the exothermic half-cell reactions produced a contraction of the NiTi shape memory metal.

Figure 11:
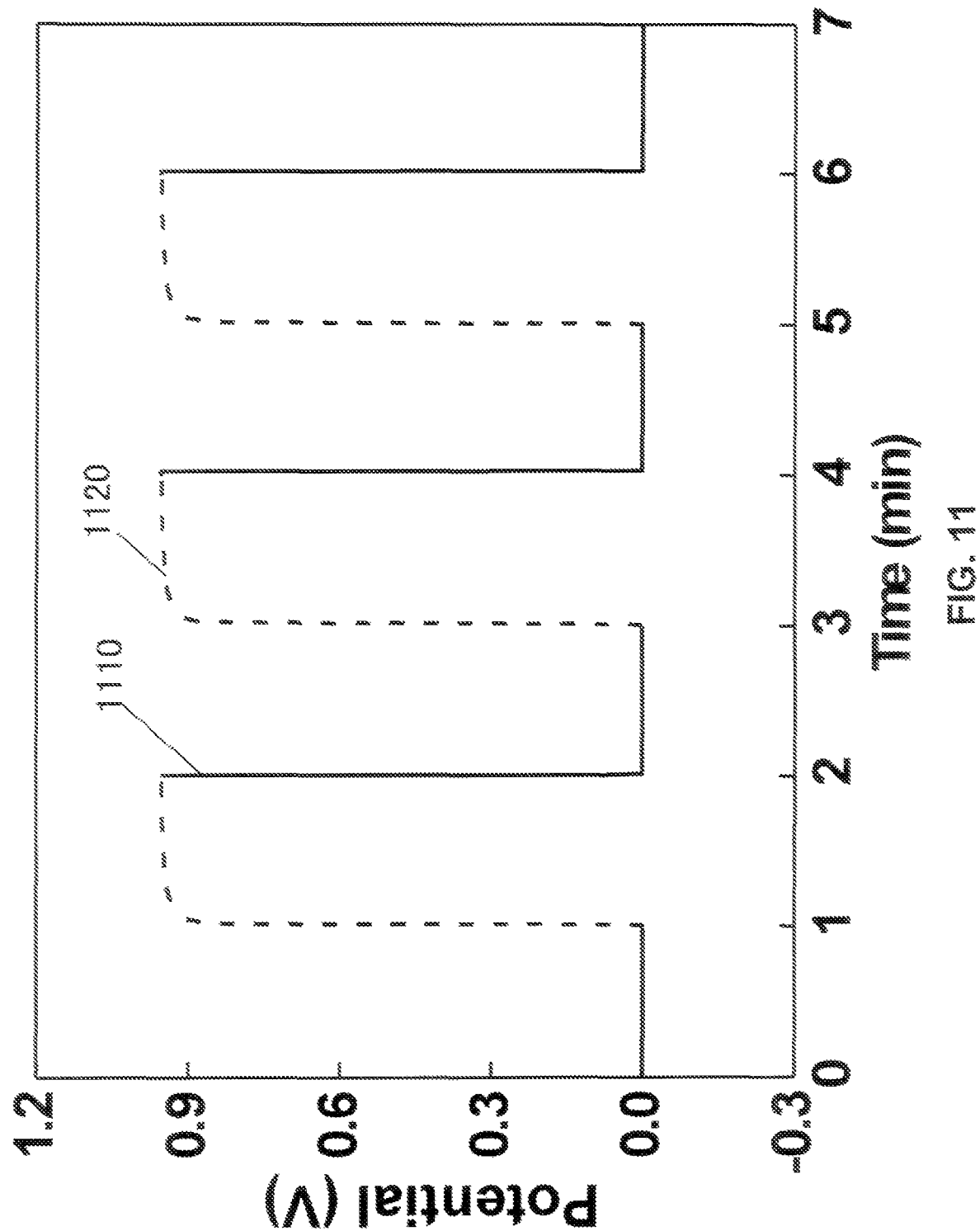
FIG. 11 presents data showing the ability of the fuel-powered shape memory wire mechanical actuator embodiment of FIG. 10 to act as a fuel cell. Cell voltage is plotted as a function of time in the presence and absence of oxygen and hydrogen in their respective electrode chambers.
Figure 12:
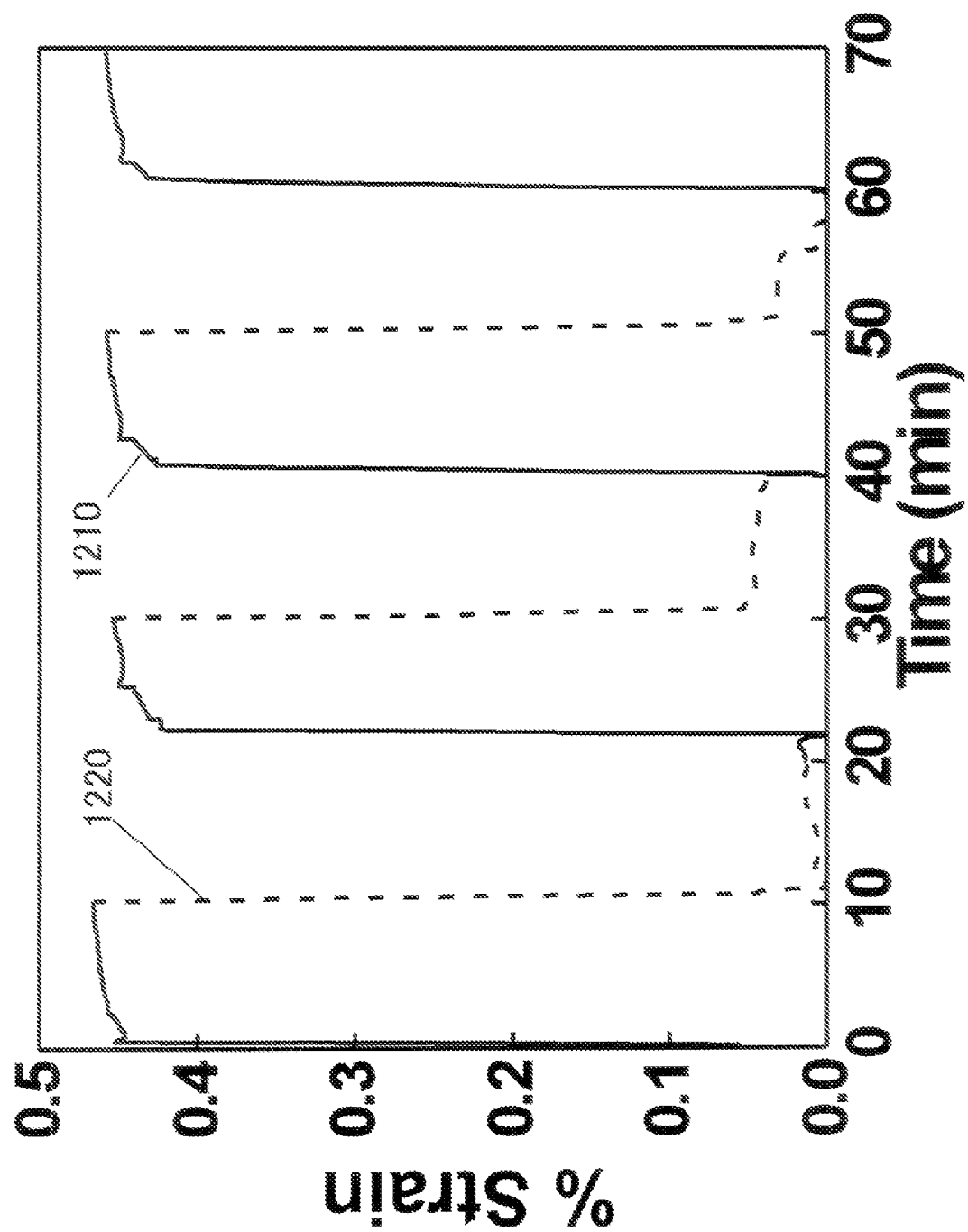
FIG. 12 shows actuator strain as a function of time when a H2/O2 mixture is present in the shape memory wire compartment of the hybrid fuel-powered shape memory wire mechanical actuator embodiment of FIG. 10.

A fuel cell generated voltage was observed between electrodes 1010 and 1040 (which requires the existence of at least trace electrolyte within catalyst layers 1070 and 1030). This inter-electrode voltage as a function of time during switching the hydrogen "on" (dashed lines 1120) and off (solid lines 1110) is shown in FIG. 11. The actuator strain as a function of time during fuel-powered heating of the SMA wire using a hydrogen/oxygen mixture is shown in FIG. 12.

Other embodiments have been found for employing actuating materials other than shape memory metals for fuel-driven artificial muscles that operate by the reaction of a fuel and oxidant to produce heat. In some embodiments, a change in volume of the actuating material is used instead of or in addition to a change in length of the actuating material. In one embodiment, the actuator material in the fuel-powered actuator changes volume during melting or other transformation between phase states, or generates pressure during confined volatilization. Suitable phase change materials are those that undergo volume changes when heated above a critical temperature, like the paraffins used extensively in space craft for cost effective electrical actuators. Although capable of being cycled many times, these devices are often only used once (or a very small number of times) over the life of a mission. Such applications include releasing solar panels and rupturing gas bottles. Conventional actuators of the prior art using phase change materials typically use electrical heating, and sometimes solar heating, to provide needed mechanical actuation. When needed for applications in which the only power source is a battery, these prior art actuators provide low energy storage density of batteries rather than a highly energetic fuel.

In some embodiments, a fuel/oxidant mixture catalyzed reaction may be used to provide the energy release and associated temperature increase needed for actuation. This reaction may occur in close proximity to the actuating material, such as on the exterior surface of a hollow wire that is filled with the actuating material. A spatial gradient in deposited catalyst may be used to first heat the region of the actuator device that is at one extreme of the actuator device, so that pressure is first generated in preferred device regions (for instance, close to a piston). Since the temperature arising from a chemically fueled reaction may depend on the fuel/oxidant ratio and optionally on the flow rate of this mixture, fuel-powered actuator devices of this type may be used as actuating sensors to regulate fuel delivery to other devices (for instance, ordinary combustion engines).

Such a fuel-powered actuator device may be integrated into a fuel cell and actuated by modulating the operating temperature of the fuel cell. Alternatively, a fuel cell may be incorporated inside a hydraulic paraffin actuator, so that both heating due to fuel cell operation and electrically generated heat may be utilized to produce the solid-to-liquid phase transformations (and associated volume changes) in the paraffin (or other like materials) that are used for hydraulic actuation. In the latter embodiment, the paraffin actuator/fuel cell device may also supply electricity to other equipment or electrical energy to be stored for future use. Additionally, electrical output from the fuel cell inside the actuator may be used to additionally heat the paraffin during the expansion part of actuation.

Such an embodiment is shown in FIGS. 16A and 16B. FIG. 16A shows the exterior of the device. The cross section, shown in FIG. 16B depicts the internal details. Here an output rod 1600 is driven from the housing assembly 1610 by expansion of paraffin 1670. The hydrostatic forces generated may compress a boot 1620 (optionally made from a solid piece of rubber), which drives the rod. Upon cooling, the paraffin shrinks, allowing a return spring (not shown) to return the rod to its original position. In this embodiment, a fuel cell stack provides the heat. This stack includes a fuel saturated wick structure 1640 and a gas diffusion layer 1650, which are separated by an ionomer membrane (not labeled). The wick structure 1640 may include a supply of fuel sufficient for the life of the mission. An oxidizer (for instance, oxygen) may be supplied to the gas diffusion layer 1650 via a gas port 1660. Heat from the cell may then be transferred to the paraffin through, for instance, a perforated, cup-shaped heat sink. 1630. Heat sink 1630 may be made from copper. The perforations may allow free expansion of the paraffin 1670. Heat sink 1630 may include an element abutting the fuel cell (shown to the left of the heat sink in the figure). As will be understood by one skilled in the art, this device may have gas exit paths for one or both fuel cell electrodes.

In some embodiments, the fuel cell may be eliminated from this device, and replaced by a heating element including catalyst supported on a structure to which a fuel/oxidizer mixture is delivered to provide the heating. In certain embodiments, this structure is a porous substructure coupled to or within the heat sink. The porous substructure may be closed (except at ends where fuel/oxidizer mixture enters and reaction products optionally exit), so as to inhibit contact of the paraffin and the fuel/oxidizer mixture.

Figure 16:
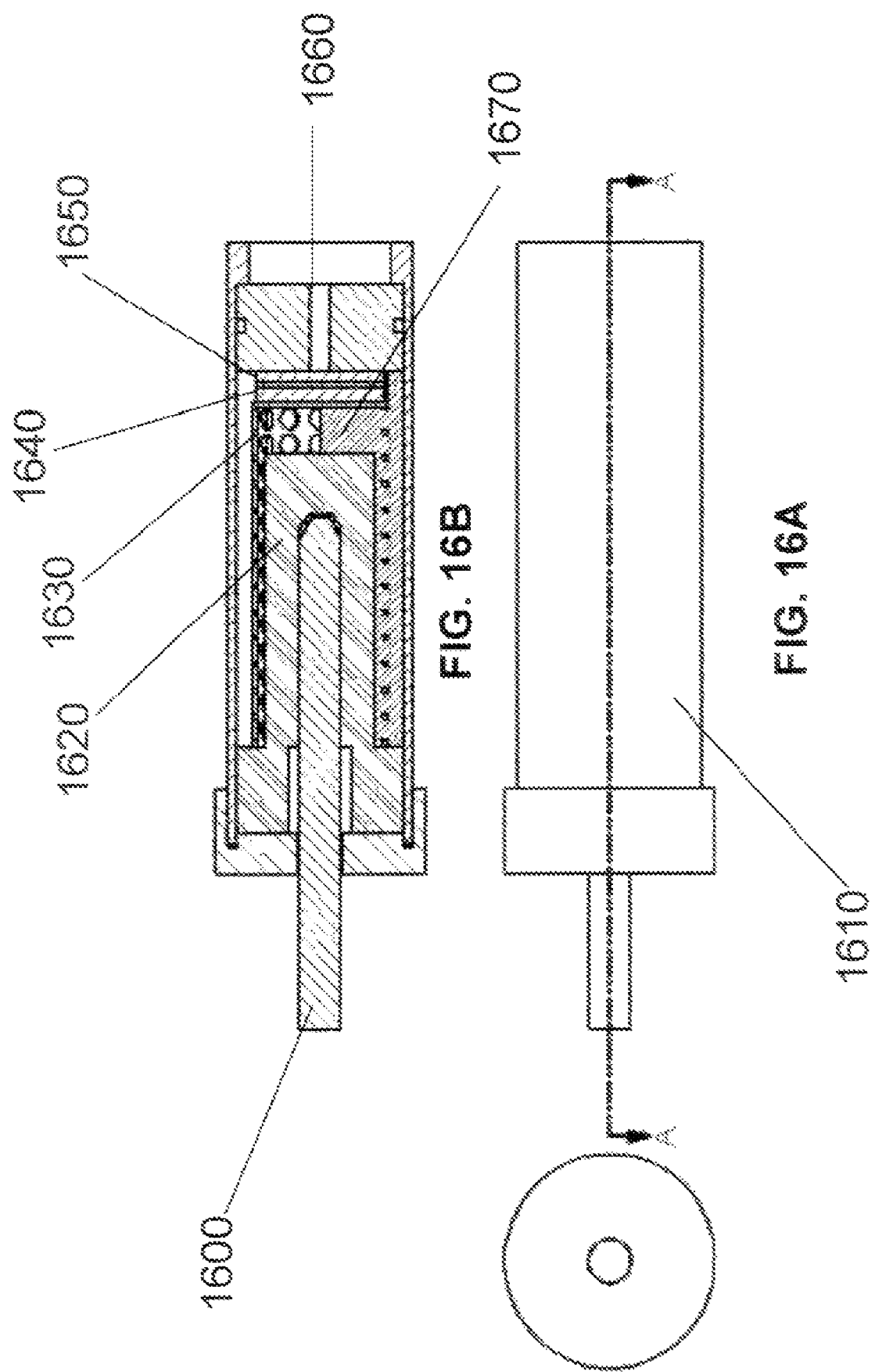
FIGS. 16A and 16B illustrate an embodiment of a fuel-powered hydraulic paraffin actuator that incorporates a fuel cell as a heat source and a source of electrical power that can both assist in the driving of the paraffin actuator by resistive heating and provide for external electrical energy needs.

Some embodiments of a fuel-powered actuator may include the piston system of FIG. 16, along with a hollow wire coil (or other wire configuration) that is imbedded in paraffin and may occupy a major part of the actuator volume rather than replace the fuel cell system, the heat spreader, and the boot depicted in FIG. 16. The inside of the hollow wire coil may include catalyst that catalyzes reaction of a fuel/oxidizer mixture that is supplied at one end of the hollow wire coil. The other end of the hollow wire coil may provide a gas exit. For a device that provides one actuator stroke, solid fuel may be originally located within the hollow wire coil. Supplying an oxidizer (like oxygen or hydrogen peroxide) to a channel within the hollow wire coil may provide the required heating via reaction of fuel and oxidizing agent.

Figures 21A, 21B:
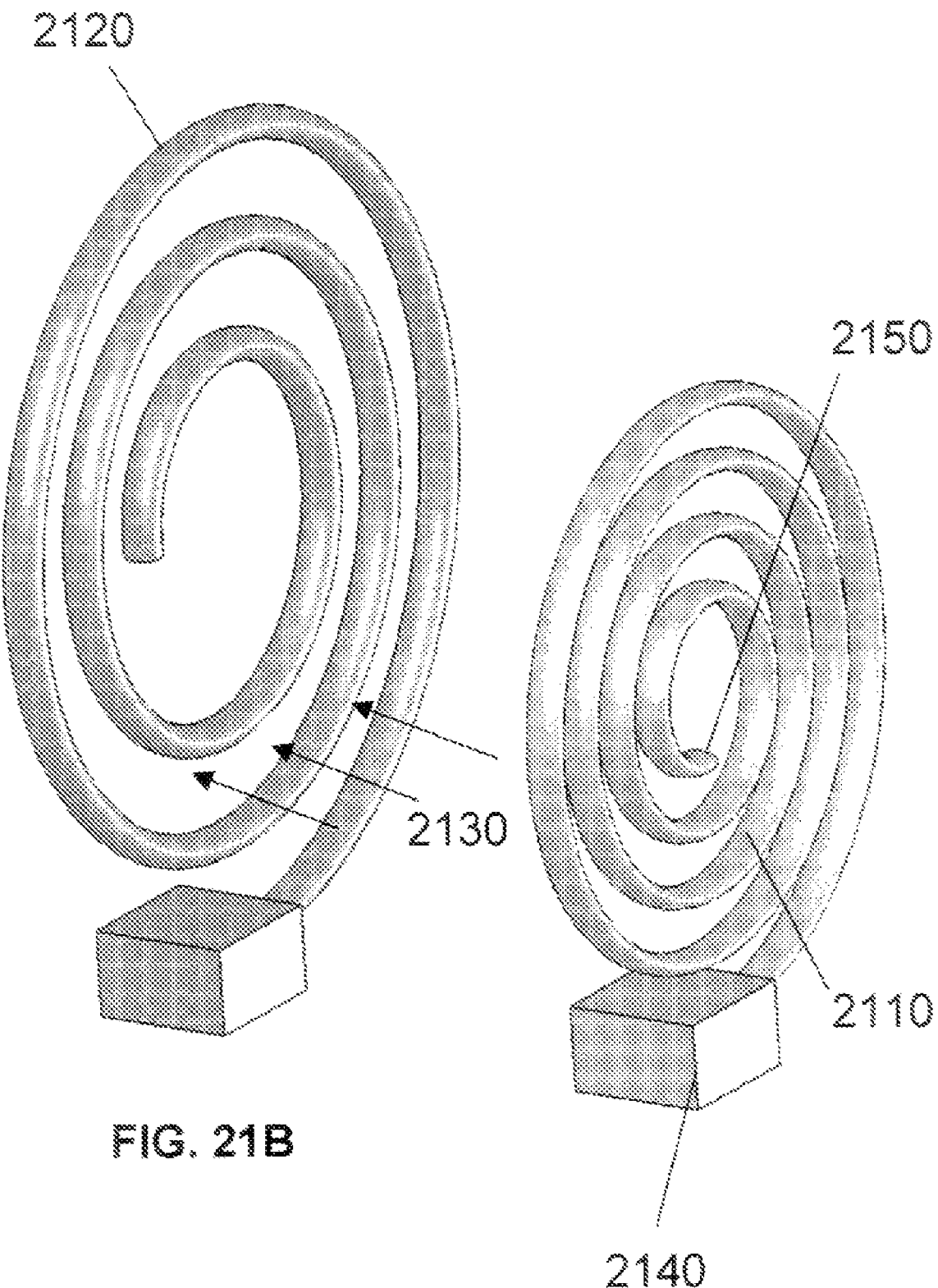
FIGS. 21A and 21B schematically illustrate an embodiment of a paraffin-filled Bourdon tube used as a fuel-powered hydraulic actuator. Catalyst on the external surface of the tube can cause the reaction of an externally supplied fuel/oxidant mixture, thereby generating the heat and associated temperature increase that causes actuation.

An actuating device based on fuel-driven actuation of paraffin or like material is shown in FIGS. 21A and 21B. A catalyst-coated, thin wall Bourdon tube filled with paraffin is shown, 2110 (FIG. 21A-cool state) and 2120 (FIG. 21B—hot state). To enhance response rate this Bourdon tube is optionally made of a high thermal conductivity metal. These tubes are attached to rigid mounts 2140. When an external flow of fuel and oxidizer 2130 (FIG. 21B) is applied to the catalyst-coated tube 2110, internal pressure causes the elliptical cross section (seen at 2150—FIG. 24A) to become more circular (see FIG. 21B). This in turn causes the spiral to uncoil, as shown by tube 2120. Thus, by increasing the catalyzed surface area to paraffin ratio, the speed of actuation as well as the magnitude of actuation may be increased. This embodiment may be used as a reconfigurable spiral antenna.

Fuel-driven actuation (either one-way or reversible) may be obtained in other embodiments by coating polymer-based shape memory materials with catalyst and using temperature increases caused by catalyzed reaction of fuel and oxidant to drive actuation.

A variety of materials may be advantageously used for thermally operated, fuel-driven muscles. In some embodiments, polymers that undergo large reversible dimensional changes when heated to sufficiently high temperatures may be used. For instance, liquid crystal elastomers, such those based on liquid-crystal-forming substituents bonded to a flexible backbone, like that of a polysiloxane, may be used. While the stress generation capabilities of these liquid crystal elastomers is much lower (typically ~0.45 MPa or less) than for shape memory metal alloys, the achievable actuator strains may be large (around 19-45%). Suitable compositions may be found in J. Madden et al., IEEE Journal of Oceanic Engineering 29, 706 (2004) and in associated references. J. Naciri et al. describe compositions of this type in Macromolecules 36, 8499 (2003). Useful shape memory polymers are also described by A. Lendlein and R. Langer in Science 296, 1673 (2002) and by A. Lendlein, A. M. Schmidt, and R. Langer in The Proceedings of the National Academy of Sciences 98, 842 (2001). Another type of useful shape memory material includes inherently non-spherical particles that reversibly change shape when heated and then cooled. Additional useful shape memory materials are liquid crystalline polymers that may be made by emulsion polymerization, described by Z. Yang et al. in Nature Materials 4, 486 (2005).

Composites of conducting materials and insulating polymers may also be useful as shape memory materials for invention embodiments. Such composites involving carbon nanotubes as the conducting component may be particularly useful, for instance, when the nanotubes are percolated to form an electrically conducting composite. One example is provided by carbon nanotube composites with thermoplastic polymers (for instance, MORTHANE® (Morton International, Inc.; Chicago, Ill.)), which are described by H. Koerner, G. Price, N. A. Pearce, M. Alexander, & R. A. Vaia, in Nature Materials 3, 115-120 (2004). These conducting composites undergo reversible dimensional changes when heated and can thus be used for actuation when heated.

Increasing the surface area of the fuel-driven thermally actuated material may provide a useful strategy for increasing actuation rate. For instance, a parallel array of 500 μm or smaller diameter shape memory wires coated with catalyst (substantially accessible to the fuel/oxidant mixture) may provide a faster response rate during both the heating and cooling parts of the actuation cycle than a single fiber of the same mass and length that contains the same amount and type of catalyst. Similarly, the actuation rate during the heating part of the cycle for a large block of actuator material may be enhanced by delivering the fuel/oxidizer mixture through catalyst-containing channels in the block.

As an alternative to using phase change materials for fuel-powered actuation, in some embodiments, thermal expansion differences of layered materials in cantilevers may be used to provide fuel-powered actuation. For instance, bi-metal layer strips found in conventional thermostats may be coated with a catalyst including, but not limited to Pt. The catalyzed reaction of fuel and oxidant may be used to provide a temperature increase needed for actuation.

Since these devices may exploit differences in thermal expansion, a variety of materials may be used for opposite sides of a cantilever. Here the term "bilayer" or "bimorph" is used generically to mean any layer combinations that function like the two metal layers that are used in traditional actuators, where differences in thermally produced expansion or contraction provide bending actuation. Hence the bilayers in the cantilever may be combinations of layers of metals, ceramics, and organics (like organic polymers). Because of the large obtainable difference in thermal expansion coefficients, the combination of a metal layer with a polymer layer in a bimorph cantilever may be desirable. In some embodiments, a catalyst coating may be on the metal surface for metal-organic bilayer cantilevers, since metals have high thermal stability and high thermal conductivities. In other embodiments, catalyst coatings on both sides of a cantilever may also be employed. In further embodiments, a catalyst coating on the polymer side of the cantilever may be used. Patterned depositions of catalyst may be employed to provide differences in actuation for different regions of the fuel-powered actuator device.

Figure 31A:
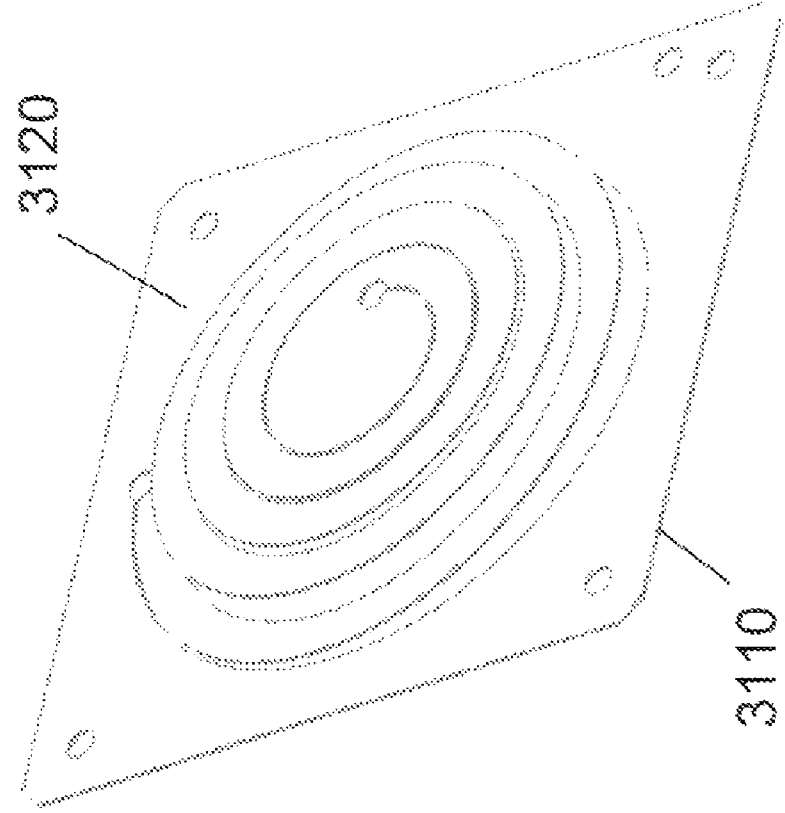
FIGS. 31A and 31B depict the effect of fuel-powered thermal actuation of a bimetallic artificial muscle in the form of a flat spiral cut from a bimetallic sheet.
Figure 31B:
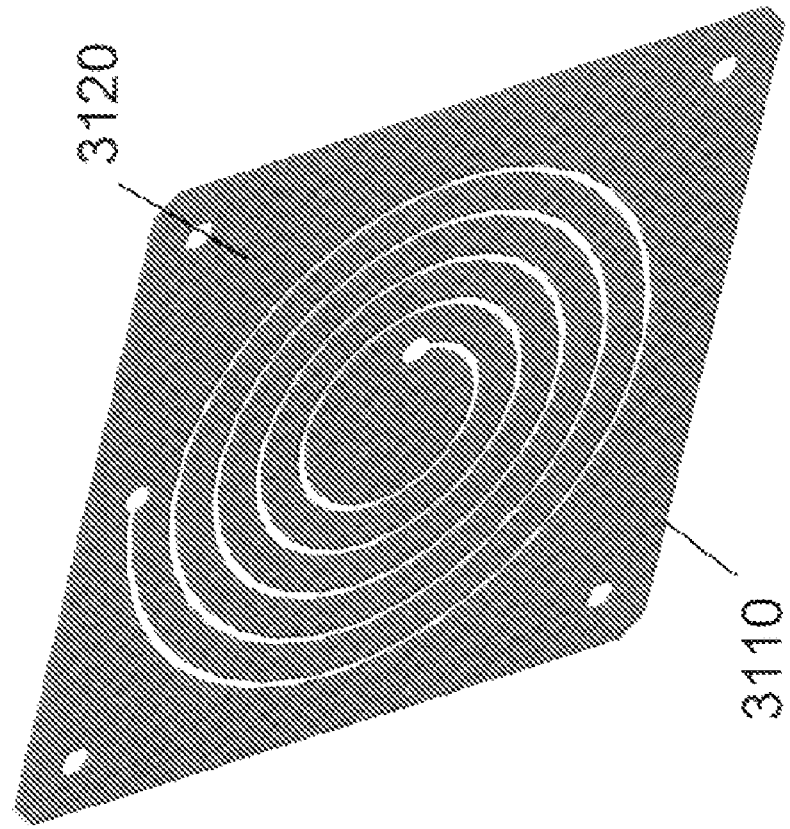

FIGS. 31A and 31B show the effect of thermal actuation on an artificial muscle in the form of a flat spiral cut from a bimetallic sheet that is rigidly constrained by fasteners located at the four corner holes. FIG. 31A shows the material prior to actuation. The bimetallic sheet is composed of two metals with different thermal expansion coefficients clad together. In the embodiment shown, the bottom surface 3110 (FIG. 31B) is a high expansion metal, and the top surface 3120 is a low expansion metal. In certain embodiments, a continuously shorted fuel cell muscle may be formed on the high expansion metal surface 3110. The heating which results from exposure to fuel and oxidizer produces differential expansion, resulting in local curvature toward the low thermal expansion side. This results in a deformation shown in FIG. 31B.

Alternatively to the approach taken in FIGS. 20A and 20B, in other embodiments, a spiral spring (optionally having the shape shown in element 2030 of FIG. 20B) may be a bimorph spring coated with catalyst, so that it serves as a fuel-powered actuator. The heating effect caused by fuel-powered actuation may wind this bimorph spring (which is like the bimetallic springs of thermostats), so as to thereby store the mechanical energy of actuation. Methods well known in the mechanical design may allow such winding to store mechanical energy, as well as the release of this mechanical energy on command.

In some embodiments, a metal layer on one side of a cantilever-based device or the combination of a shape memory material with materials that do not provide a phase change in the operational temperature range may be used. If a non-reversible actuator response is desired, the chosen shape memory material may be one that operates only in one direction (heating or cooling), so the actuation is fully or partially irreversible. Various combinations of two or more material layers may be used for achieving desired actuator response by exploiting differences in thermally produced expansion or contraction that is either reversible with no hysteresis, reversible with hysteresis, or one way.

Electrically driven cantilever-based actuators are being widely used to provide actuation for Micro-Electro-Mechanical Systems (MEMS), and methods of fabrication are well known. Fuel-powered actuators and cantilever-based actuators of the present invention embodiments may be similarly fabricated to include the desired catalytic layer or layers that facilitate fuel/oxidant combination to produce heat. Fuel and oxidant delivery to these fuel-powered micromechanical actuators may also utilize well-known microfluidic delivery systems that are conventionally used for MEMS. The fuel-powered micromechanical actuators of the present embodiments may be used as mechanically actuating sensors that detect the presence of a fuel component in a microfluidic stream, and respond to either open or close a valve.

In some embodiments, it may be desirable to selectively actuate different regions of a fuel-powered shape memory or shape memory bimorph structure. This may be accomplished for both macroscopic and micromechanical applications by selective deposition of different amounts of catalyst on different regions of the actuator material, patterned delivery of fuel/oxidant amounts or relative concentrations to the actuator material, selective cooling of different regions of the actuator material, or a combination thereof.

Cooling Thermally Operated Fuel-Powered Muscles

A limitation on cycle time for thermally actuated SMA muscles is the cooling rate, though electrically powered micromechanical devices having bandwidths on the order of tens of cycles per second have been reported. Actuation rates up to 2 Hz have been reported for large deflection, electrically powered devices (S. A. Mascaro and H. H. Asada, Robotics and Automation, 2003, Proceedings, ICRA 03, IEEE International) by encasing an SMA actuator wire in a tube in which cooling water may be circulated between heating cycles. To minimize loss during heating, valves isolate the tube section containing the wire. Similar performance (J. Ayers and J. Witting, Philosophical Transactions of the Royal Society A 365, 273-295 (2007)) has been reported with underwater bio-mimetic walking machines based on SMA actuators. In this case an essentially unlimited volume of sea water was available for cooling. Ultimately the dynamic performance of both systems was limited by the dynamics of the cooling system, including time constants associated with the movement of water past the actuator and the motion of the valves. Such conventional cooling systems may be used for the fuel-powered actuators of present embodiments.

Other means of cooling may be advantageous for the fuel-powered, thermally operated artificial muscles and other fuel-powered actuator types. These additional means are the use of thermo-siphons (also called thermosiphons) and heat pipes. Both devices use evaporative heat transfer to transport thermal energy highly effectively over substantial distances. Their effectiveness in heat transfer makes them particularly attractive for this application. However, this effectiveness may sometimes be disadvantageous. M. A. Thrasher, A. R. Shahin, P. H. Meckl and J. D. Jones, Smart Materials and Structures 3, 226-234 (1994) identifies heat loss during heating as a major source of inefficiency for shape memory actuators. To circumvent this problem, any thermo-siphon or heat pipe may be rendered substantially inoperative during the heating part of the actuation process.

FIGS. 1A and 1B schematically illustrate an embodiment of a modified thermo-siphon for accelerating cooling after fuel-powered actuation. A thermo-siphon is a device, similar to a heat pipe, which is designed for continuous cooling. The device shown in FIGS. 1A and 1B has been modified by the addition of a positive displacement pump 130 (FIG. 1B) which pumps coolant, such as methanol, from reservoir 190 via an entry port 150 into a delivery pipe 133. Liquid coolant is ejected through nozzles located at 137 upward and downward along the length of the SMA actuator tube 120 (FIG. 1A). In some embodiments, SMA actuator tube 120 may be operated as a continuously shorted fuel-powered device (for instance, a device in which actuation results from reaction of a fuel and oxidant mixture on a catalytic surface). Tube 120 may be connected to a load by means of a fitting 125. Heating of the shape memory tube may be achieved by coating it with catalyst, as shown FIG. 8, and exposing it to a fuel/air mixture 110.

When cooling is desired, the flow of fuel to the external surface is cut-off or reduced. In a substantially simultaneous manner, the positive displacement pump injects a controlled amount of coolant into the interior (not catalyzed) surface of the tube 120. This coolant is flash evaporated on interior surfaces of the tube, thereby removing heat. Gas pressure and buoyancy may cause the gaseous coolant to rise in the tube through a passage 140 (FIG. 1B), and up a double wall insulated pipe 170. Condensation chamber, 160 (FIG. 1A), with a large heat exchange surface, may be coupled to pipe 170, for instance, at the top of the pipe. The interior surfaces 165 may promote the condensation of the gas back to the liquid state. Surface tension and gravity facilitate return of the condensed coolant to return to the reservoir. The condensed coolant may pass an optional baffle or series of baffles 180 en route to the reservoir, which may help control the return path and inhibit slosh of the coolant in the reservoir.

The pump may be sized so that a pulse width modulation scheme may be used to control the cooling rate. For instance, a few pulses may result in a small amount of cooling, and many pulses may result in a larger amount of cooling. Substantially simultaneous cooling and heating action may be used to provide servo dither in order to maintain a position. Alternatively, a latch device (see discussion for FIG. 22B) may be used to allow a position to be held without utilizing fuel. Note that since the thermo-siphon as depicted is a closed loop system, the coolant may be kept at a partial vacuum to reduce its boiling point. Operation as a closed loop system is not necessary. In this case, if the coolant is, for instance, methanol, heat may be recovered, and fuel demand may be reduced by re-using the warmed methanol liquid and/or vapor as fuel for the catalyzed heating reaction in the heating part of the fuel-driven actuation cycle.

Figure 2:
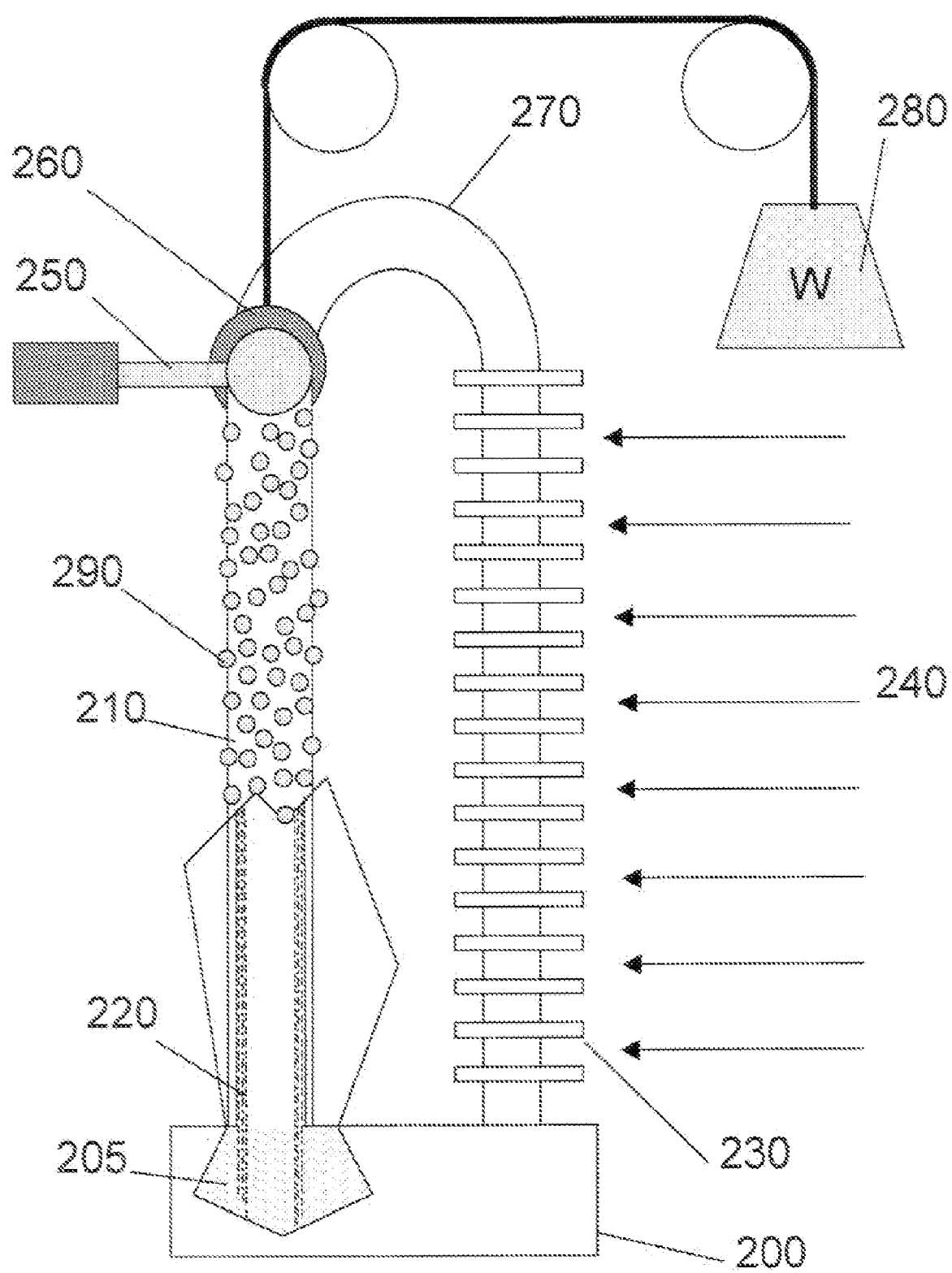
FIG. 2 schematically illustrates an embodiment of a fuel-powered, thermally driven artificial muscle cooled by a closed-cycle modified heat pipe which utilizes a wick to move coolant into the system and a valve for modulating cooling.

FIG. 2 shows another embodiment of a modified heat tube. In this case the coolant 205, which may also be the fuel, is transported from a reservoir 200 by a wick 220 into the SMA actuator tube 210. As for the device shown in FIG. 1, nanoscale catalyst particles 290 may be applied to the exterior to catalyze the heating reaction. In the absence of heating, coolant may be transported into the wick 220 until the wick becomes saturated. The application of heat causes vaporization of the coolant. Although this may increase the energy required to heat the pipe and cause actuation, the heat is not removed from the SMA tube 220 until the valve 250 is opened. Upon opening, gas pressure causes the vapors to enter the finned heat exchanger 230 via the flexible connecting tube or hose 270.

The SMA actuator may perform work by moving load 280, which is coupled to the SMA actuator tube 210 via the valve body 260. Like the prior device, heat recovery is achievable; in this case the heat exchanger also allows pre-heating of the reaction air 240. Again, the actuation of the valve may be controlled in a manner similar to the pump utilized by the embodiment shown in FIG. 1. Pulse width modulation or analog control may be utilized to control the removal of heat from the tube. The system may also be operated at a negative gage pressure to control the boiling point of the coolant. Alternately, when operated as an open loop system, the coolant 205 may be fuel. In this case, the cooling action may pre-heat the fuel, resulting in less fuel needed to heat the SMA.

Another high performance cooling device is a heat pipe. Due to the effectiveness of heat pipes, however, these devices are also preferably switched "on" for the cooling part of the actuator thermal cycle and switched "off" during the heating part of this cycle. A heat pipe operates by the evaporation of a working fluid on the "hot" section of the pipe from which it is transported to the "cold" section of the pipe by the pressure difference created by the liquid to gas phase transformation. At the cold end of the pipe, the gas condenses. A wick incorporated into the walls of the pipe transports the liquid back to the "hot" end for re-evaporation. One relatively simple method for switching involves the heating of the pipe at a strategic location along its length. This high local heat evaporates the returning liquid in the wick, causing it to return to the "cool" side. When this happens, working fluid is no longer available for evaporation at the "hot" end. At this point the heat transport capability of the pipe may be reduced by multiple orders of magnitude.

FIG. 23A shows an embodiment of a heat-pipe-cooled shape memory actuator, which is here shown acting against external load 2370. Here the shape memory actuator 2310 is a thin-walled tube. For this example, it is configured as a fuel-powered, thermally operated actuator, where the catalyst would be placed on the outside of the tube of shape memory actuator material. The heat pipe 2320 (FIG. 23B) is the internal tube which protrudes from the top side of the mount 2350. This tube may been connected using a conductive bond, for instance by welding or brazing to a heat sink 2340. The heat pipe is fixed to the tube at the load end cap 2360 (FIG. 23A), and may be free to slide inside the actuator. Thermal contact between the SMA 2310 and the heat pipe 2320 is made, for instance, by using a thermal grease or thixotropic heat transfer compound between the actuator tube and the heat pipe. Thus the radiator 2340 may move as the actuator actuates. This movement may allow passive operation as an oscillator since the radiator may be moved into and out of a cooling bath. Active operation may be possible since the radiator cooling rate may be controlled actively by regulating the coolant supplied to the radiator. This external coolant and/or cooling system may include, but is not limited to, a misting system (artificial sweat), controlled louvered air vents, or other active cooling system.

The concept of this embodiment is generically applicable, whether the thermal actuator is tensile, rotary, cantilever, or combined types. This inventive concept is to use displacement caused by thermal actuation to bring or help bring the hot actuator material in contact with an active or passive structure capable of providing cooling. This use of actuation generated displacements to provide thermal contact may use actuator generated dimensional changes in any direction, such as in the thickness direction for a shape memory wire, strip, or sheet, or in any combination of directions.

Also, the same dimensional changes that provide thermal contact may provide, or may help provide (optionally assisted by actuator displacements in other directions and/or due to other actuators) mechanical clamping action that helps maintain the dimensional changes of the heated state. In other embodiments, a process of using actuator displacement to bring the hot actuator material in contact with a cooling material may be used to facilitate the operation of a mechanical oscillator. These inventive concepts (including the use of heat pipes or thermo-siphon) may be applicable for any thermally driven or partially thermally driven shape memory materials—whether they are thermally driven or partially thermally driven by any combination of fuel-oxidizer heating, photo heating, microwave heating, electrical heating, or heating by contact with a source of heat.

However, as implied above in the discussion of thermosiphons, fuel-powered artificial muscles may provide features that are especially advantageous for exploitation using cooling means. For instance, water may be sprayed directly on the device to provide evaporative and other thermal cooling without the risks inherent in mixing water and electricity. A liquid spray may also block access of the fuel and/or oxidant to the catalyst, stopping the fuel-powered reaction that thermally drives the shape memory actuator.

This concept allows use of non-intuitive and unique coolants. The atomizer or spray device may saturate the single electrode with a liquid fuel. The fuel, such as methanol, may serve to both cut off oxygen from the electrode and act as an evaporative coolant. Since methanol evaporates below the transition temperature of many NiTi SMAs, it may be a more effective coolant than water. Careful control of oxidizer availability to the catalyst may inhibit the formation of an explosive atmosphere.

Control of Fuel-Powered Actuators

Unless a simple oscillating system is desired (like an engine or the dunking bird found in many novelty stores), an active control system may be required. This need for active control includes applications such as artificial muscles for exo-skeletons and artificial limbs.

SMA devices may be controlled in a manner that is similar to Bang-Bang control. Bang-Bang control systems have two states: on and off. Examples of this include thermal shut-offs for showers in which an SMA device is used to shut off or severely restrict the flow of water to inhibit scalding.

Other applications of SMAs take advantage of the analog response of SMAs over a temperature range to perform a design function. An example of this is the turbine engine stator clearance control method described by U.S. Patent Application Publication No. 20060165518 (Joseph et al., published Jul. 27, 2006). Here the compressor blade to stator clearance affects the efficiency of the engine as it heats and cools over normal flight operations. This system uses the blending of combustion, bleed, and ambient air to control the temperature of an SMA actuating member that is used to control the gap between compressor blade tips and the engine stator. The ability to control temperature in a reasonably precise manner allows a near analog response.

For the purposes of artificial muscles performing high value applications, servo control is needed. Servo control typically involves the use of sensor feedback, and sometimes feed-forward models to achieve precise position or velocity control of the actuated object. In many cases, it is possible to use the same control system to control force output and compliance characteristics assuming that force and/or compliance can either be directly sensed or accurately determined by surrogate measurements. If these properties can be sensed, the system is said to be observable. However, control cannot be achieved if the controlled inputs do not couple to the observable outputs. Thus, a system can be observable, but not controllable. A system with large amounts of hysteresis, such as an SMA, can be such a system.

Figure 18:
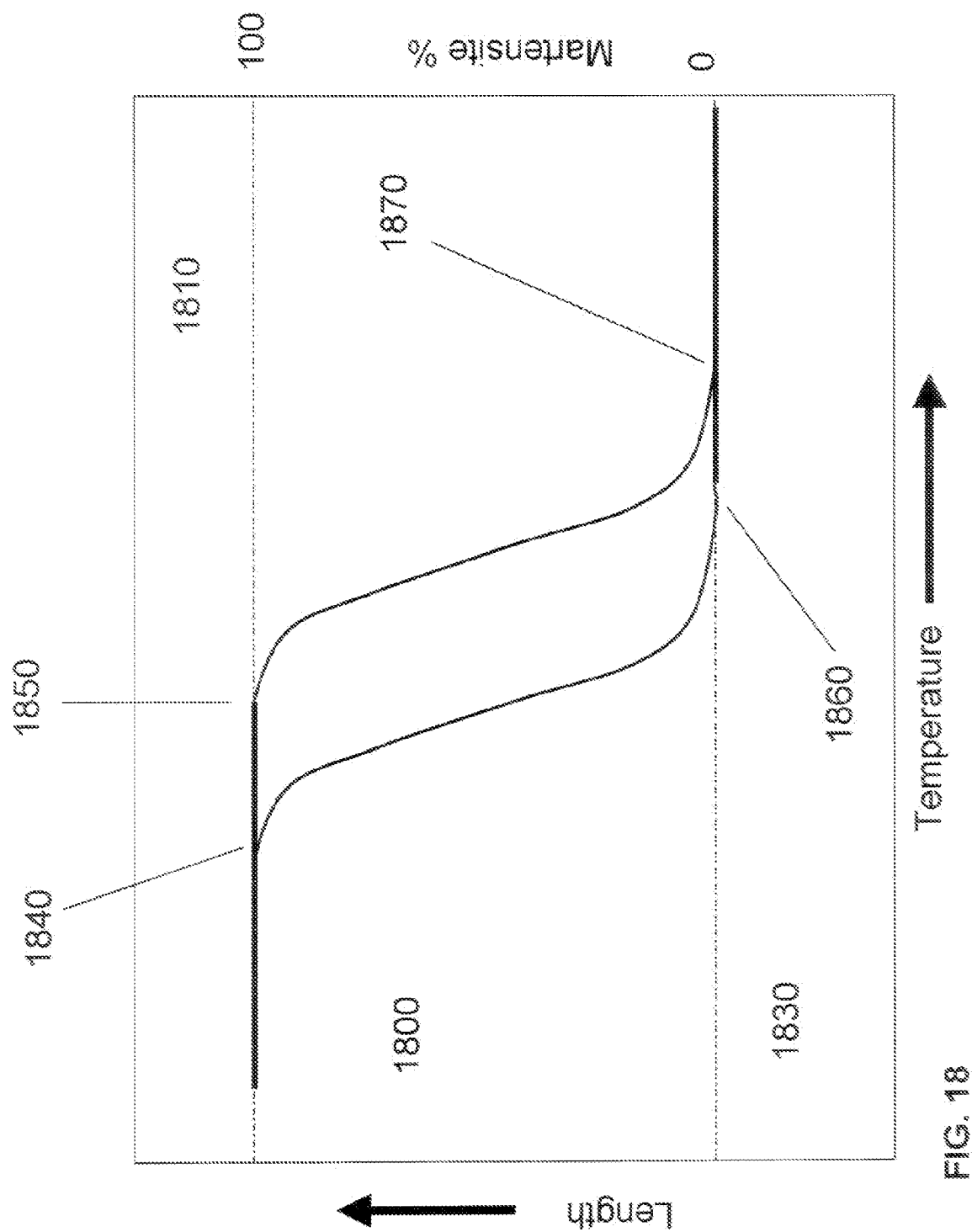
FIG. 18 depicts a hysteresis loop typical of shape memory metal.

FIG. 18 shows the hysteresis behavior of an SMA material as a function of displacement and temperature. The loop is contained within the mixed phase region 1800 between the martensite phase 1810 (low temperatures) and the austenite phase 1830 (high temperatures). Drawn NiTi SMA materials, such as wire, bars, and tubes, etc., contract when heated. This characteristic may distinguish ordinary thermal expansion actuator materials compared with usual SMA actuator materials.

Following the loop, starting at low temperature with a 100% martensitic material, upon heating to the austenite start temperature 1850, the material will begin to contract as some of the martensite is converted to austenite. Upon further heating to the austenite finish temperature 1870, substantially no martensite will remain. On cooling, however, no martensite will form until the martensite start temperature 1860. This temperature may be 40° C. less than 1870 for typical NiTi materials. Finally, when the martensite end temperature 1840 is reached, the loop is completed. Note that this diagram applies to SMA devices that undergo a complete hysteresis cycle. If the actuator is stopped mid-stroke and reversed, the path describing the relationship between the states may be different, although it may be contained within the main hysteresis loop (A. Bekker and L. C. Brinson, Acta Mater. 46, 3649-3665 (1998)). Thus, "hysteresis" may be used to generally refer to the characteristic that changes in state are path dependent.

Feedback signals that are useful for actuator control include temperature, resistance, and position (for instance, actuator elongation), as well as time-dependence of these variables. Use of electrical resistance to provide feedback control for shape memory alloy actuators may be desirable, since the electrical resistivity of the austenite phase is approximately half that of the martensite phase. Thus, the resistance of the actuation member may be a good approximation of the martensite fraction of the actuating member. It may still be subject to some hysteresis for typical NiTi alloys, since there is a high resistance intermediate R phase that is formed during cooling that is not typical of the heating process.

For control systems of selected embodiments, the control signal may include actuator displacement, electrical resistance, and temperature dependence of actuation rate and resistance change, or combinations thereof.

Measurements of resistance and temperature (and optionally the above temperature dependencies) may be used in some embodiments for fuel-powered shape memory actuators and other fuel-powered actuators that do not include a shape memory metal. Examples are inherently conducting shape memory polymers, shape memory polymers that include percolated conducting additives (for instance, polymer/carbon nanotube composites), and bilayer actuators in which at least one component has a resistance that depends upon actuator state or temperature. While two-probe measurements of resistance may be desirable, it may be useful to utilize four-probe measurements of resistance (especially for materials having high resistance). For cantilever based actuators using bi-layers, the resistance in the thickness direction may also be useful.

In some cases, the thermal resistance of a shape memory metal may increase by over a factor of two as the shape memory metal transforms from the austenite to the martensite phase upon temperature decrease. This feature complicates the placement and characterization of a temperature sensor. The prior art on electrically powered SMAs has shown that this, among other factors, makes the use of temperature feedback problematic for the purposes of servo control (N. Ma, G. Song, and H. J. Lee, Smart Materials and Structures 13, 777-783 (2004)). For fuel-powered SMA based muscles, these problems may be further complicated in that the heat is being generated on the surface of the metal (as opposed to internal, more uniform resistance heating) in closer proximity to where a sensor would be mounted. In addition, water vapor and possibly other combustion products may be present, which could have a deleterious effect on the sensor itself.

This problem of temperature sensor placement may be mitigated in some embodiments by using the resistance of an actuating system component (for instance, the resistance of a metal layer in a bilayer thermal-expansion-based actuator) or the junction potential between two actuating conducting system components (like metals in a bilayer cantilever) to provide a measure of actuator temperature.

With a sufficiently robust control system, and if over-temperature operation of the SMA were not an issue, only position feedback would be needed. The hysteresis would simply be interpreted by the controller as a disturbance or other error. Gains would be applied to the proportional, derivative and integral terms. The robust control additions would also be calculated and applied subject to stability considerations. From these, the final input signal would be applied and the position error would then be corrected. However, over-temperature can severely reduce the life of a shape memory actuator. Furthermore, energy dense fuels may be capable of generating conditions that would reduce the life of the actuator. Furthermore, since failing to meet the desired actuator response trajectory is a lesser failure than total actuator failure, hard limits may be needed to reduce the probability of over-temperature conditions.

Figure 19:
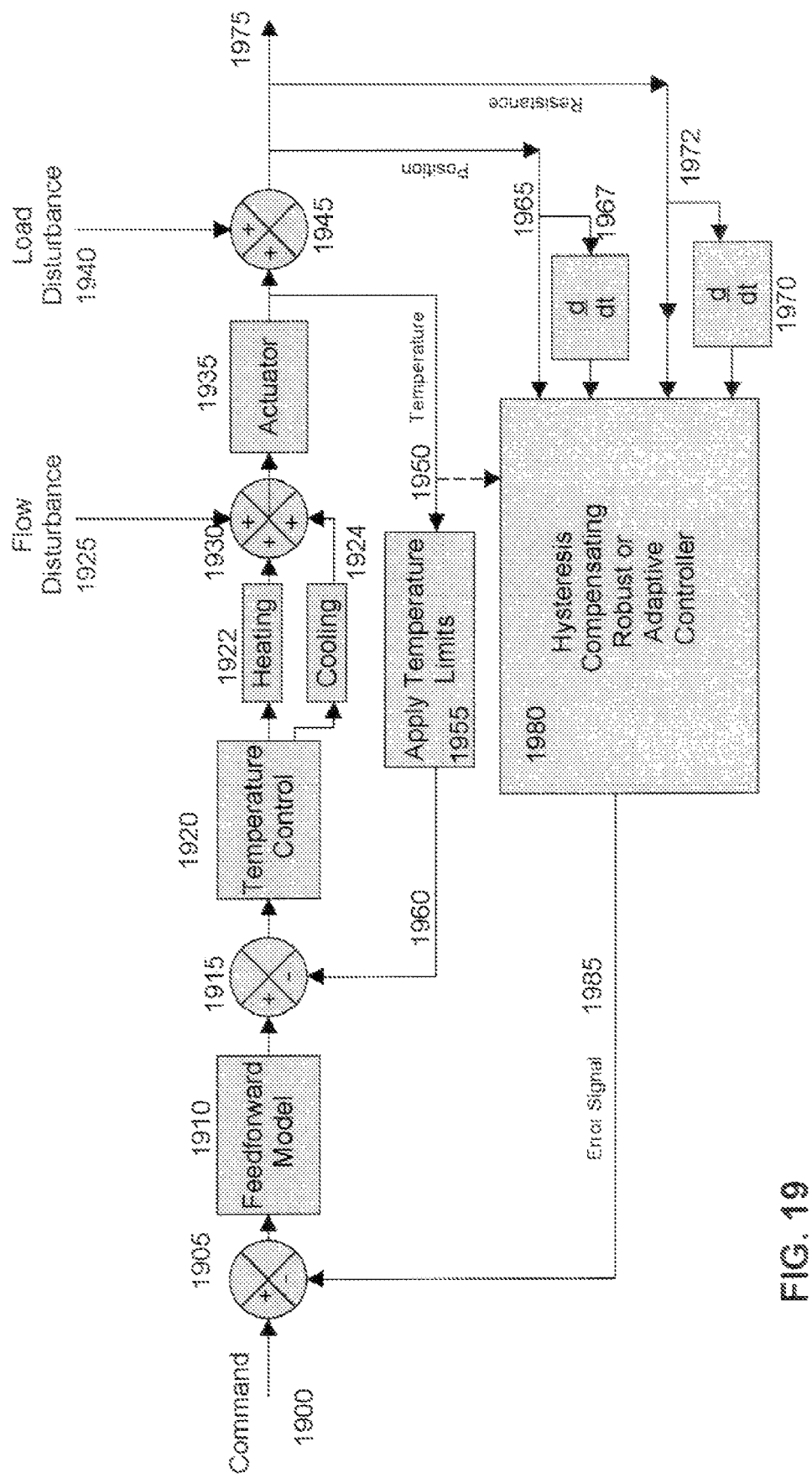
FIG. 19 is a generic control diagram for shape memory alloy based fuel cell actuators.

Such a scheme is depicted by FIG. 19. Here, a position-based command signal 1900 is combined 1905 with the negative feedback error signal 1985, as will be discussed later. This summed signal may be processed by a feed-forward model 1910. This signal may serve as the input to the temperature controller 1920. This method is useful in that control of the heating and cooling functions has been relegated to a separate control loop within the outer servo control loop. Thus the controlling and limiting of the temperature resulting from fuel cell reactions may be somewhat independent of the servo control solution.

The purpose of the feed-forward model is to convert a position/velocity domain input to a flow/temperature domain output. In other words, this model converts a desired change in position output to a desired change in temperature. This is a novel and unique feature. Temperature need not be an accurate indicator of the actual SMA state; however, it should have sufficient fidelity to sense the existence of damaging temperatures and be representative of the heater/cooler output. In the control system of FIG. 19, this temperature signal is then summed 1915 with a temperature limiting negative feedback signal 1960. This resulting signal provides the input needed for limiting the temperature of the SMA or other actuator material. The combined signal is then fed to the temperature control module 1920, which in turn sends either heating 1922, flows of fuel and oxidizer to the actuator 1935, or coolant flows 1924. As described above, fuel or oxidizer flow may be used as part of both the heating and cooling sub-systems. The temperature controller may be a P, PI, PD, or PID controller (depending upon the used combination of Proportional, Integral, and Derivative corrections terms used to provide controller output) with internal flow domain feedback as well as external temperature-based control 1955. If implemented in this manner it may be desirable for the flow controller to either operate in a fast analog manner or have a digital update rate that was at least a factor of 2 greater than the outer servo control loops.

Temperature feedback may be advantageous for protection of the shape memory material system. The temperature signal 1950 may be evaluated for its proximity to adverse temperature conditions. If found by the limiting control rule 1955 to be excessive, a signal will be generated that subtracts 1915 from the flow command given to the flow controller 1920. Otherwise, this feedback may function as simple temperature feedback to the temperature controllers. The discontinuous nature of this output and the importance of low overshoot indicates the utility of using a PID controller for temperature control functionality 1920.

There are two additional complications which must be considered. Flow disturbances 1925 and load disturbances 1940 must be considered and accounted for in any control scheme. Flow disturbances in air oxidizer system may include wind or other uncontrolled environmental characteristics. Load disturbances may include vibrations (possibly planned) or unplanned external physical loads. These disturbances may cause an elastic deformation of the overall actuator which is not necessarily fully related to the shape memory actuator phase transformation. The flow and load disturbances may be added to the flow and actuator output at 1930 and 1945 respectively. The unique requirements of fuel-powered artificial muscle actuation may be served by implementing a control scheme which is able to observe (for instance, sense) flow disturbances.

The error signal to the outer (position, velocity) domain loop may be generated from a hysteresis compensating (nonlinear) controller based on, for instance, adaptive control techniques. In particular, neural network based models (N. Ma, G. Song, and H. J. Lee, Smart Materials and Structures 13, 777-783 (2004)) have been successfully applied to resistively heated SMA actuators. The inputs to this feedback model include position and velocity (1965 and 1967) and resistance and its time derivative (1972 and 1970). The derivatives are important since their direction, and slope allows the controller 1980 to distinguish the various portions of each signal's hysteresis loops. In lieu of a neural network model, other control methods which can be adapted for nonlinear dynamic systems may be used. The use of these quantities as an observable input to a fuel-powered actuation control system is a unique and novel feature.

For systems having limited load disturbances that require precision operation, resistive feedback may be eliminated. Although some knowledge of the transformation state of the material is lost, the implementation may be simpler. Likewise, if economy was the primary driver and precise motion secondary, expensive position feedback devices may be eliminated and the SMA's variable resistance characteristic utilized as a proxy for position.

In an alternative embodiment, the temperature signal 1950 may be eliminated as feedback to the hysteresis compensation controller 1980. Alternatively, temperature data may still be supplied to the controller 1980 but only as an aid to resolving the hysteresis state. The use of temperature as a feedback signal for hysteresis state determination for fuel-powered actuators is another unique and novel feature. In this case, temperature feedback to the flow control 1920 to apply temperature limits 1955 would be useful and desirable.

Other control methods which are known to those skilled in the control of physical systems may be adapted for this application.

Fabricating Catalytic Electrodes

Described herein are suitable catalysts for the following actuator types of invention embodiments: (1) dual compartment, charge-storage fuel cell actuators, (2) single compartment charge-storage fuel cell actuators in which the redox active chemical in the compartment is alternately switched from predominately fuel to predominately oxidizing agent, (3) single compartment fuel-powered thermal actuators, and (4) single compartment charge-storage fuel-powered actuators into which both fuel and oxidizing agent are provided, and (5) hybrid devices. Various well-known catalysts typically used for increasing oxidation and reduction half-cell reactions for fuel cells may be used for all of the described fuel-powered muscles except the ones needed for the above actuators of type 4.

Despite its high cost, catalytic Pt may be useful for invention embodiments described herein. A disadvantage of Pt for some hydrocarbon fuels (especially where reaction temperatures are low because of the low transition temperature of some useful shape memory materials, like polymers and NiTi) is that it can be poisoned by CO. An alternative to Pt for use with methanol is a mixture of platinum and ruthenium. Cobalt nanoparticles may also be an alternative to Pt, especially since cobalt nanoparticles may also serve as both an oxidation and reduction catalyst. Tungsten carbide nanoparticle catalyst is also among desired compositions, because of low cost, higher dissociation activity of methanol than Pt/Ru, and a low desorption temperature for CO. Researchers at Los Alamos (R. Bashyam and P. Zelany, Unpublished work, Materials Science and Tech. Div., Los Alamos National Laboratory) have also produced a cobalt-polypyrrole-based catalyst for oxygen reduction in polymer electrolyte fuel cells, and this catalyst can also be used for embodiments described herein. Nanoparticle gold has been studied as a catalyst for selective oxidation of hydrocarbons (M. D. Hughes et al., Nature 437, 1132-1135, (2005)). Although expensive, gold costs less than platinum; also, the observed tunability of this catalyst may provide advantages for embodiments described herein.

In part because of Pt cost, catalyst supports and additives providing synergistic interactions are useful for some embodiments. These include, among many others, platinum on carbon black and on carbon nanotubes (C. H. Chen, X. Chi, H. B. Pan, S. Wang, Y. Lin, and C. M. Wai, Journal of Nanoscience and Nanotechnology 5, 1852-1857 (2005)). Another useful synergistic interaction occurs between cobalt nanoparticle catalyst and platinum.

A problem for the type 4 actuators (single compartment charge-storage fuel-powered actuators into which both fuel and oxidizing agent are provided) is in finding catalysts for reduction that are not also good catalysts for fuel oxidation. Iron-based oxygen reduction catalyst (S. Gupta, D Tryk, S. K. Zecevic, A. D. Guo and R. F. Savinell, Journal of Applied Electrochemistry 28, 673-682 (1998)) that are very tolerant for use with methanol have the advantage of both relatively low cost and high selectivity for oxygen. While no presently available catalyst is optimal for a low-temperature type 4 fuel-powered muscle, they are available for fuel-powered muscles that operate at high temperatures. More specifically, Hibino et al. (Science 288, 2031 (2000)) have demonstrated suitably selective catalysts that enable operation of a single chamber fuel cell containing a premixed fuel/oxidizer mixture that is supplied to both anode and cathode mounted in the same chamber. With a selective catalyst, the anode and cathode half-cell reactions function normally to produce useful electrical power in a single compartment fuel cell (where both fuel and oxidizing agent are provided). These same catalysts can be used for type 4 embodiments.

Various methods of the prior art can be used for applying catalyst to actuating and non-actuating elements of either charge-storage fuel cell muscles and fuel-powered thermal muscles. There is a very extensive literature teaching the fabrication of conventional fuel cell electrodes that can be employed as elements in some of the devices of some embodiments.

Conventional electrodes of ETEC (Electric Transportation Engineering Corporation) are made by applying a coating to a carbon textile which is composed of carbon black, polytetrafluoroethylene, and platinum catalyst particles. This coating, the gas diffusion layer, is typically 50 µm thick with a platinum catalyst content of 0.35 mg/cm$^2$. Unfortunately, the use of this method results in as much as 90% of the platinum being inactive.

Plasma sputtering of catalyst has been employed on porous electrodes (P. Brault, A. Caillard, A. L. Thomann, J. Mathias, C. Charles, R. W. Boswell, S. Escribano, J. Durand, and T Sauvage; Journal of Physics D: Applied Physics 37 (2004)) as a means of reducing the amount of inactive catalyst. Results have shown the ability to match ink based deposition up to power densities of 400 mW/cm$^2$ using only 0.8 mg per square cm. Other approaches described in the literature include the deposition of platinum nanoparticles by supercritical fluid on carbon nanotubes (C. H. Yen, X. Chi, H. B. Pan, S. Wang, Y. Lin, C. M. Wai; Journal of Nanoscience and Nanotechnology 5 (2005)). This method can be employed in some embodiments, and is especially useful for charge-storage fuel cell muscles in which the actuating element is an array of fibers or nanofibers, like carbon nanotubes.

Nanofiber sheets useful for some embodiments may be made by filtration processes similar to those used in the manufacture of ordinary paper, and catalyst nanoparticles may be incorporated into these sheets during the filtration-based sheet fabrication process. Methods of accomplishing either uniform or non-uniform catalyst depositions are demonstrated in Example 1. These embodiments use catalyst nanoparticles dispersed in either the same or different fluids (which can be either as an ordinary liquid, a super critical fluid, or combinations thereof). The dispersed catalyst particles may be either unsupported or unsupported, like for the most commonly used Pt on carbon particle support.

For example, nanofiber sheets containing uniformly distributed catalyst may be obtained by forming nanotube sheets from a fluid containing both the nanofibers and the catalyst. On the other hand, non-uniform catalyst distribution across the sheet thickness can be obtained by sequential filtration of dispersions comprising differing relative concentrations of nanofibers and catalyst. As shown in Example 2, use of such non-uniform distribution of catalyst, or other materials that may also be incorporated in the filtered solutions, provides a useful means for fabricating fuel-powered cantilever actuators.

If long cycle life is not required, catalyst particles may be deposited on the surface of shape memory materials from a fluid slurry, like the hexane slurry in Example 7. Alternatively, with some sacrifice of catalyst activity, the catalyst may be applied in a silicone grease to shape memory actuator materials like Nitinol (see Example 10).

Methods for coupling catalyst to shape memory actuators has not been described in the literature (other than those in the provisional filing for this application, which was published by present inventors in *Science* 311, 1580-1583 (2006)) and this is key for enabling long cycle life. To insure long cycle life for actuating wires or fibers, especially for high stroke actuator materials, it is particularly useful to incorporate the catalyst nanoparticles (either supported or non-supported) either on, inside, or within sleeves that cover the actuating wires or fibers. If a fuel/oxidant mixture for a fuel-powered thermally driven muscle is supplied internal to the sleeve, the sleeve may be largely nonporous, and the catalyst may largely be located between the sleeve and the actuating wire of fiber. Otherwise, if the fuel/oxidant mixture is delivered external to the sleeve, then the sleeve should be porous. In order to maximize actuator response rate, the thermal mass of the sleeve should be minimized.

Incorporation of the catalyst in a polymer layer that is coated on the actuating element (and optionally interior to it) is also a useful means for insuring long cycle life for fuel-powered actuator elements. For example, Pt nanoparticles may be incorporated in polypyrrole layers that overcoat the nanotubes in actuating nanotube sheets or yarns. Vork (F. T. A. Vork, L. J. J. Janssen and E. Barendrecht, Electrochimica Acta 31 (1986)) has described the fabrication of platinum-polypyrrole electrodes. Likewise, polypyrrole or a higher thermal stability, more elastic polymer may be used for high stroke fuel-powered shape memory muscles.

In some embodiments, an actuating material for a fuel-powered muscle also provides the needed catalytic activity. For example, catalytic platinum black may be compressed and annealed at low temperatures to provide a porous electrode material that has sufficiently high surface area to be used for an electrically powered artificial muscle that operates because of electrochemical double layer charge injection (see J. Weissmüller et al. Science 300, 312 (2003)) Because of the catalytic activity resulting for nanoparticle electrodes of this type, for example made from a less expensive material than Pt, they can be employed as inherently catalytic actuating electrodes for charge-storage fuel cell muscles.

Another route can be used to provide actuating structures that are both strong and catalytic for fuel-powered muscles. This route involves forming an alloy involving two or more metals, at least one of which has the desired catalytic activity, and then chemically removing the undesired metal component from the actuator surface or volume by chemical or electrochemical etching. This process has been applied volumetrically to gold alloys to provide nanoporous gold that actuates when electrical power is used to produce double layer charge injection (Y. Ding, Y. J. Kim, and J. Erlebacher; Advanced Materials 16, 21, 1897-1900, (2004)). It has been recently discovered that nanoparticle gold is a very useful catalyst for selective oxidation of hydrocarbons (M. D. Hughes et al., Nature 437, 1132-1135, (2005)). Hence, some embodiments may be extended to the use of alloy extraction to provide an electrode for fuel-powered muscles. Like the case of the above-described nanoporous Pt electrode, the gold electrodes are of greatest interest for very small actuators, like in a micromechanical device.

Some embodiments also extend to the application of surface etching processes to provide catalytic surfaces on fuel-powered shape memory alloy actuators. For example, Pt forms many alloys with more reactive metals (like Fe—Pt containing approximately 25 atomic % Pt), and these metals may be removed from the surface of shape metal alloys to provide suitable structures for use in fuel-powered shape memory actuators.

Merged Muscle Concepts

Merging aspects of the capacitive double layer and thermally actuated fuel-powered muscles expands device opportunities. For example, the shape memory metal alloys could be made into catalyst-containing, high-surface-area metal nanofiber yarns that function in an electrolyte as electrodes of a fuel-charged capacitor. Charge injection will cause small-stroke actuation of the capacitor electrodes, and the energy of capacitor discharge may be used to either power large-stroke shape memory actuation, other energy-requiring systems, or both. The major advantage of this merged concept muscle over the continuously shorted fuel cell is that actuator switching may be accomplished by opening or closing a circuit without the need to interrupt or switch fuel feed. Tunable muscle compliance is needed for ordinary robotic tasks, and a fuel-driven transition between the high modulus martensitic phase and the much lower modulus austenitic phase of a shape memory alloy could provide this.

Figure 14:
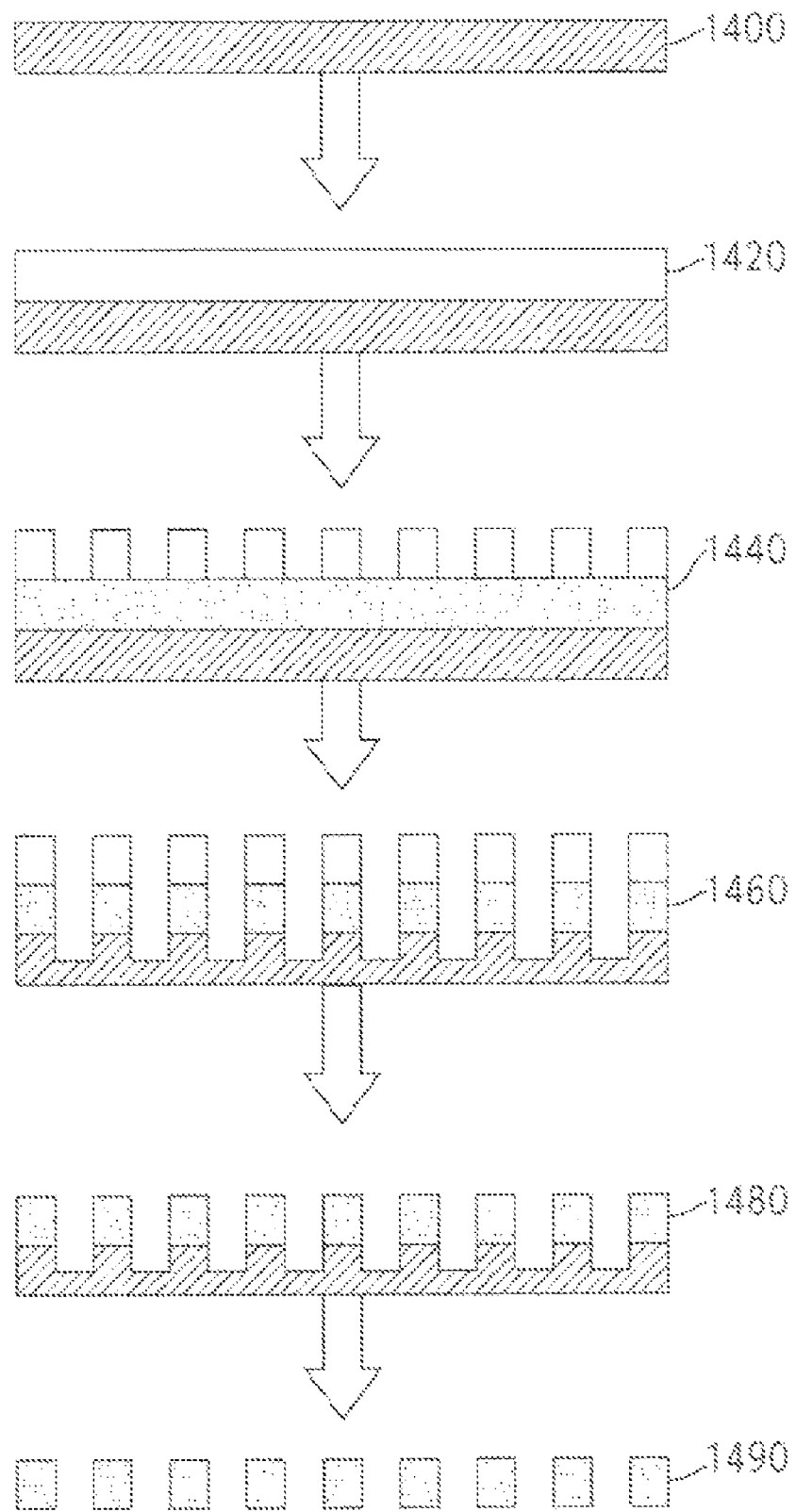
FIG. 14 illustrates an embodiment of fabrication of shape memory nanowires by a fabrication sequence consisting of thin film metallization, annealing, selective etching and mask removal followed by substrate removal.

While this method is only suitable for very small devices, SMA nanofibers can be produced as follows (see FIG. 14): A thin film of SMA, such as NiTiCu, 1420, may be grown (R. Hassdorf, J. Feydt, R. Pascal, S. Thienhaus, M. Boese, T. Sterzl, B. Winzek, and M. Moske, Materials Research Society Symposium Proceedings 695, L12.3.1 (2002)) by a thin film deposition technique, such as Molecular Beam Epitaxy (MBE) or, as an alternate method, sputtering on a suitable substrate 1400, for example, silicon. This layer may be covered, with a dielectric material, for example upon which a second layer of SMA could, if desired, be deposited. This process may be repeated with suitable lapping steps (optional) as needed until a desired number of SMA layers had been formed (not shown). Fibers would then be formed applying a photo-mask 1440, selective etching, 1460, or ion beam milling parallel groves through the complete layer stack. The mask would then be removed 1480. This would be followed by the removal of dielectric layers, if applicable, and substrate separation 1490 by suitable chemical processing. This removal may be total or partial (utilizing appropriate masking techniques) as desired or dictated by the end application. During processing, since MBE would form an amorphous layer, a crystallization anneal would be necessary to impart the desired crystalline structure to the SMA. For a certain desired class of alloys this temperature is approximately 450° C. Chemical etching of the nanofibers to reduce their diameter could be performed as a post process if desired.

NiTiCu may be used for this application since it is much less sensitive than NiTi variation in as deposited composition. In NiTi, as little as a one percent difference in composition can effect a 100° C. change in transition temperature, variations in Cu concentration of several percent may be accommodated with little change in transition temperature.

Figure 15:
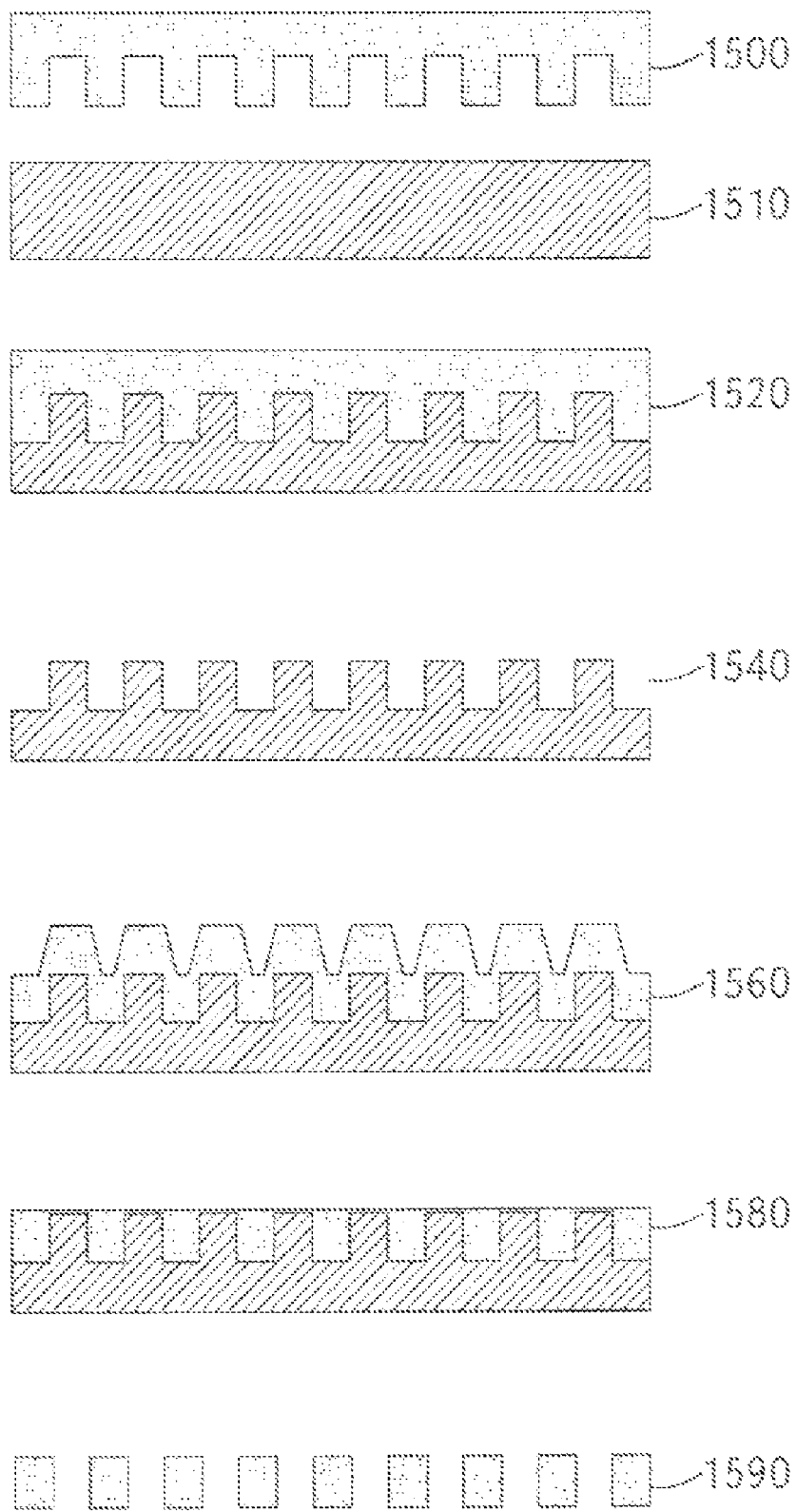
FIG. 15 illustrates an embodiment of fabrication of shape memory nanowires by a fabrication sequence involving nano-imprinting, thin film metallization, annealing, and planarization followed by substrate removal.

A substrate with nano-imprinted channels, as shown in FIG. 15 may also be utilized as a template for nanofiber SMA. The nano-imprinting process involves the application of a die 1510 to a substrate 1520 under pressure. The substrate could be formed 1520 and 1540 and then plated with SMA utilizing MBE or other deposition technique 1560. Following crystallization heat treatment, planarization 1580 could then be utilized to remove SMA deposited outside the channels. Again, the substrate could then be removed chemically or by mechanically depending on the deposit's bond strength to the substrate 1590.

Additional methods available for fabricating shape memory alloys as high gravimetric surface area materials include laser ablation of commercially available alloys to make very thin films, crystallization of the alloys as compactable nanoparticles after dissolution of the metals in molten NaCl/KCl salt, or by gas phase condensation, and templating the parallel pores of anodic alumina oxide with the alloy (followed by the dissolution of the alumina oxide. Nanoscale fibers have also been formed by sequential co-deformation of larger scale fibers incorporated into a preferentially extractable metal matrix. It is already known that shape memory and superelastic behavior is maintained for nanostructured alloys, and there are reports that the behavior of these materials is improved with the introduction of nano-size particles or grains.

Non-Mechanical Fuel-Powered Actuators

Since the above-described fuel-powered mechanical actuation processes result in changes in charge injection and/or temperature, they can be used to replace the usual electrically powered means for achieving changes in the magnetic, electric, and optical properties of materials (via changes in either the degree of change injection or the temperature). The above-provided embodiments for fuel-powered application are applicable for these non-mechanical actuation processes, except for simple modifications that will be understood by those skilled in the art.

Extension of the various fuel-powered embodiments for fuel-powered actuators to non-mechanical actuators is fundamentally direct. This is true for the following previous described embodiments of this invention for achieving fuel-powered charge injection or heating: (1) dual compartment, charge-storage fuel cell actuators, (2) single compartment charge-storage fuel cell actuators in which the redox active chemical in the compartment is alternately switched from predominately fuel to predominately oxidizing agent, (3) single compartment fuel-powered thermal actuators, and (4) single compartment charge-storage fuel-powered actuators into which both fuel and oxidizing agent are provided, and (5) hybrid devices.

For example, switchability in electromagnetic properties from the ultraviolet to microwave regions is needed for both civilian and military applications, and can be obtained for well-known materials using either electrical charge injection or electrical heating. However, fuel-powered actuation is able to sustain operation for a longer time on a much smaller volume or weight mobile power source (for instance, a high energy density fuel, which can have over 30 times higher energy storage density than the most advanced rechargeable battery).

Take a simple example of fuel-powered optical switching in an optical cell that comprises only one active element. This can operate just like the single active element mechanical actuator discussed above from the "Charge-Storage Fuel Cell Muscle," where switching the feed gas from fuel (like $H_2$) to oxidizing agent (like air) causes mechanical actuation (as well as released heat). A reflecting optical film element based on a material, like a conducting polymer, will switch from having the optical properties of the $H_2$ exposed state (a reduced state) to those of the oxygen-exposed state (an oxidized state), and this change could be used for applications from large area displays to camouflage. If high switching rates are needed, which can only be obtained using catalytic nanoparticles, there is then a potential problem in concealing optical effects due to the catalyst. This problem is not significant if the optically actuating optical effect of interest is reflection, since the thickness of the actuating electrode can be adjusted to provide little optical effect of underlying catalyst.

Two-electrode, fuel-powered non-mechanical actuation (optionally using $H_2$ and $O_2$ as alternating reactants to eventually produce water) can operate like a two-electrode fuel-powered muscle of embodiments. On the $H_2$ electrode side the potential will go to close to 0 volts (and lower if $H_2$ replaces the hydrazine) and on the $O_2$ electrode side the potential will go to approximately a volt (and higher if the $O_2$ is replaced by hydrogen peroxide). The corresponding change in charge injection for an actuator electrode that is either double layer charge injected or intercalation charge injected can be major. Hence, important switchable changes in electrical, optical, or magnetic properties can result.

Physical properties, such as electrical conductivity, optical absorption and optical reflectivity, magnetization, magnetoresistance, and electromagnetic shielding properties very strongly depend on the number of charge carriers at the Fermi level. Optional and useful materials of embodiments include those that maximize the tunability of these properties that can be achieved by either faradaic or non-faradaic injection. Such materials include those providing (1) a low concentration of charge carriers (electrons or holes) at the Fermi level for the uncharged state, and (2) a strong dependence of Fermi energy on the amount of charge injection. This strong dependence of Fermi energy on charge injection is typically characteristic of the singularities in density of states found for low dimensional conductors. Hence, 1-D materials (like nanofibers and conjugated polymers like polythiophene derivatives) and 2-D layered materials (like cuprates of chalcogenides) are materials that may be used.

Materials used for electric conductivity tuning by non-faradaic electrochemical charge injection can be semiconductors when the goal is to provide the maximum dynamic range of tunability. Materials having singularities in density of states near the Fermi level can be used as materials having tunable electric conductivity. These include various well-known nanofibers, like single-wall and multi-wall carbon nanotube fibers.

Induced increase in electrical conductivity in the absence of a needed electrolyte (by fuel and oxidant-induced switching steps in a single compartment) can be usefully employed for making materials that combine high electrical conductivity with high optical transparency. These transparent conducting electrodes are of major importance for such applications as liquid crystal displays, light emitting displays (both organic and inorganic), solar cells, switchable transparency windows, solar cells, micro lasers, optical modulators, and optical polarizers.

The prior art has shown that the subtle balance between the anti-ferromagnetic insulating state and the ferromagnetic metallic state can be shifted by application of external perturbations, like magnetic field (A. J. Millis, Nature 392, 147 (1998) and Y. Tomioka et. al., Phys. Rev. B 53, R1689 (1996)); electric field (A. Asamitsu et al., Nature 388, 50 (1997)); high pressure (Y. Morimoto et. al., Phys. Rev. B 55, 7549 (1997)); exposure to X-rays (V. Kiryukhin, et. al., Nature 386, 813 (1997)); or exposure to visible light (K. Miyano, et al., Phys. Rev. Lett. 78 (1997) 4257 and M. Fiebig, et al., Science 280 1925 (1998)).

In contrast with these prior art approaches, applicants either induce or sensitize transitions between the insulating antiferromagnetic state and the conducting ferromagnetic state by using fuel-powered charge injection. The colossal magnetoresistance of the perovskite manganites can be tuned by using fuel and oxygen based charge injection (and charge injection switching) of invention embodiments. This tuning could be used, for example, for switching perovskite manganites from insulating and anti-ferromagnetic to metallic and ferromagnetic. Additionally, this fuel and oxidant based switching may also be used for the control of electromagnetic wave propagation for ultraviolet, visible, infrared, radio frequency, and microwave frequency regions, since modulation of electrical conductivity also changes the refractive index, dielectric constant, absorption, and optical reflectivity.

The following examples are presented to more particularly illustrate the invention, and should not be construed as limiting the scope of the invention.

Example 1

Cantilever-based nanotube actuators were made by sequential vacuum filtration of (1) 100 ml of an aqueous solution including an ultrasonically dispersed mixture of 10 mg of SWNTs (HiPco nanotubes from Carbon Nanotechnologies Inc.) and 0.2 g of Triton X-100 surfactant (Aldrich) to make the first layer of the cantilever and (2) 6 ml of an aqueous solution containing an ultrasonically dispersed mixture of 60 mg Triton X-100 and 6 to 10 mg carbon-supported Pt catalyst, (80 wt. % of 1:1 by weight Pt on carbon from E-Tek mixed with 20 wt. % NAFION®-1100) to form the opposing layer of the cantilever. After air drying and peeling from the 45 mm diameter, 5.0 μm poly(tetrafluoroethane) filter, the bilayer sheet was cut with a razor blade to form 3.0 mm×30.0 mm×50 μm cantilever strips.

Example 2

This example demonstrates the operation of a charge-storage fuel-powered actuator in which a cantilever electrode operates wholly as a result of dimensional changes occurring in a single compartment of a two-compartment fuel-powered electrochemical cell. In contrast to other cantilever design possibilities, this cantilever actuator comprises only one electrode. As shown in FIG. 3, the actuating element is a cantilever 320 (made as described in Example 1), which includes a nanotube sheet strip laminated with a mixture of Pt-coated carbon and NAFION® ionomer. This cantilever was immersed in 1 M $H_2SO_4$ electrolyte 360 and the counter electrode was a conventional fuel cell electrode 310 comprising a Pt—C-NAFION® ionomer layer deposited on a NAFION® 117 membrane, which separated the fuel (hydrogen, at the counter electrode, whose entrance site is 330) from the oxidant (oxygen, at the nanotube actuator electrode, which enters at 340 and where produced water and residual oxygen exits at 370) and enabled hydrogen ion diffusion between electrodes when the electrodes were shorted. Unlike traditional fuel cells, where the anode and cathode are deposited on each side of a proton-conducting membrane (such as NAFION®), the anode and the cantilever-type cathode in the inventors design are mechanically uncoupled but ionically connected to each other by a liquid electrolyte, enabling actuation during charge/discharge operation of the cell.

This fuel-cell muscle type is in part electrochemical (only during the discharge part of the actuation cycle) and uses the catalyst-containing carbon nanotube sheet electrode as an artificial muscle. Although both the working and counter electrodes can potentially actuate, only one electrode was used for actuation in this initial demonstration. Reversible actuator strokes result from electronic charge injection into an electrolyte filled carbon nanotube sheet in the cantilever 320. The simultaneous movement of ions of the electrolyte into close proximity to the injected electronic charge forms the so-called electrochemical double layer, which enables high charge injection by maintaining overall charge neutrality. This close proximity of electronic charge on the carbon nanotubes and counter-ions in the electrolyte is enabled by the nanoscale porosity of the carbon single-walled nanotube (SWNT) sheets and the corresponding high surface area, about 300 $m^2/g$.

Instead of actuating in response to an externally applied inter-electrode voltage, the chemically powered actuator electrode generates a potential by acting as a fuel cell electrode. The fuel cell muscle generates and capacitively stores electrical energy as a change in injected charge, which causes forward directed actuation (actuator bending) when the inter-electrode circuit is open. Oxygen gas at the cantilevered nanotube electrode is reduced in the presence of Pt. Four protons in the $H_2SO_4$ combine with an $O_2$ and four electrons extracted from the carbon nanotube electrode to produce two water molecules. The resulting positive charge (holes) injection into the nanotube sheet causes actuation, with the $SO_4^{2-}$ ions serving as counter charges. Reaction continues until the nanotube electrode is fully charged, generating a half-cell potential of ~0.9 V vs. normal hydrogen electrode, NHE. This differs from the continuous power production process of an ordinary hydrogen fuel cell, where the protons and electrons needed to produce water come from the hydrogen electrode. Also, unlike the case of electrically powered actuation using double-layer charge injection, the amount of charge injected into the two electrodes depends only on their individual charge-storage capability.

At the opposite electrode, again under open circuit conditions, hydrogen is oxidized to produce protons and electrons that form an electrochemical double layer, generating a half-cell potential of 0.0 V versus NHE. The discharge of the fuel cell muscle, where actuation is reversed, corresponds to recombination of electrons on the hydrogen electrode with the holes on the oxygen electrode (the actuating nanotube sheet) when the inter-electrode circuit is closed. Simultaneously, the $H_2$-derived protons diffuse to the carbon nanotube cathode to replace $H^+$ ions in the liquid electrolyte that were used to make water during the hole-injection part of the actuator cycle.

The observed actuator during chemically driven charge injection was a 2 mm deflection of a 3 cm long nanotube cantilever in ~5 seconds, as the nanotube electrode potential increased to ~0.8 V (versus NHE). The opposite actuator deflection, obtained when the hydrogen and oxygen electrodes were shorted, occurred in a second. Breaking the connection between electrodes caused recharging of the nanotube muscle and return to the deflection of the initially charged state.

Example 3

Although the above fuel-cell muscle uses only one electrode for actuation in a two-compartment actuator cell (having both working and counter electrodes), both of these electrodes can simultaneously serve as muscles. To demonstrate this the oxygen and hydrogen delivery compartments in FIG. 3 were switched so that the actuator electrode became the hydrogen electrode. This caused a decrease in the time required for the charge-injection stroke to 1 to 2 s and a 180° phase shift in actuator response direction. This phase shift and unchanged actuation amplitude resulted from the low charge-storage capacity of the nanotube sheet as compared to that of the much larger counter electrode. As a result the nanotube electrode potential cycles between about 0 and about 0.9 V (versus NHE) during charge and discharge, and only the direction of this shift depends on the gas at the actuating electrode.

Example 4

SWNT sheet strips used for tensile actuator measurements were made analogously to those in Example 1, except that the dispersions of Example 1 were mixed and vacuum filtrated as a one-step process.

Example 5

Tensile strain measurements as a function of various constant mechanical loads were made for all tensile actuators using the Perkin Elmer Dynamic Mechanical Analyzer (DMA 7e). Electrode potentials during actuation were measured using either saturated calomel or Ag/AgCl reference electrodes, from which NHE potential were derived for electrochemically based actuators (for instance, those based on fuel and oxidizer generated charge injection at opposite electrodes). Electrical connection to one end of the actuating nanotube electrodes was made using Ag-filled epoxy (covered with an insulating epoxy) that connected to platinum wire leads. This end, and the opposite end of the actuator strip, was clamped in the grips of the DMA. The counter electrode was a high-surface-area carbon felt contacted by Pt wire. The nanotube electrode in both the fuel- . . . -powered charge-storage muscle and the electrically powered muscle were initially cycled in the electrolyte to maximize electrode wetting. This was by cycling the fuel and oxidant (separated by a $N_2$ sweep of the cell) and by sweeping potential in the 0 to 1 V range (vs. NHE), respectively.

Example 6

Figure 6:
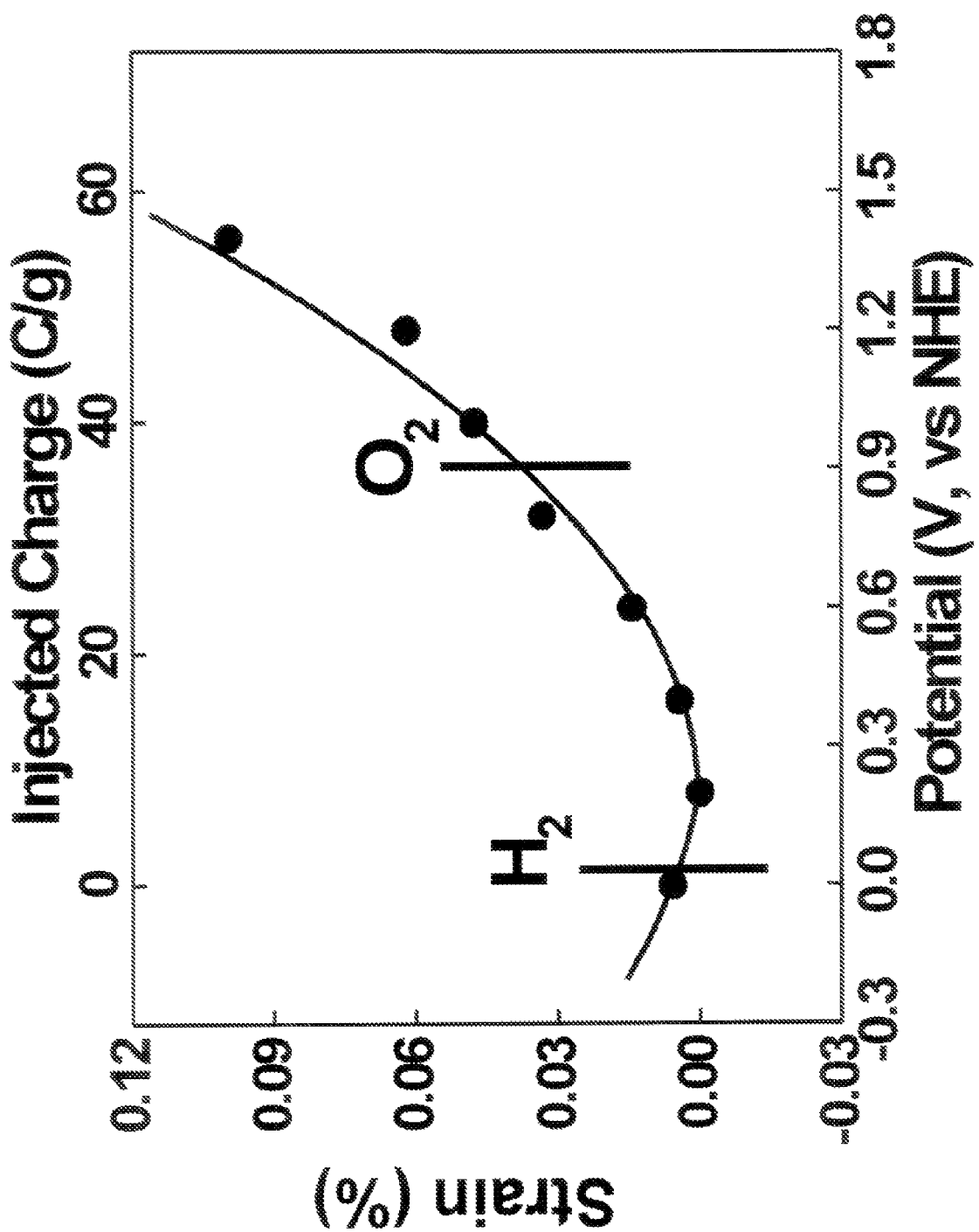
FIG. 6 shows for the embodiment of FIG. 4 and the data of FIG. 5 that the actuator strain measured for fuel-powered actuation, in the absence of a counter electrode, agrees with that obtained from the potential dependence of electrically powered actuation for an actuator cell containing both a working electrode and a counter electrode.

This example demonstrates fuel-powered tensile actuation based on charge-storage in a single compartment cell. Again using hydrogen as the fuel, oxygen as the oxidant, and 1 M $HS_2O_4$ as the electrolyte, forward and reverse actuation was driven for a Pt-containing nanotube sheet in this one compartment cell (FIG. 4), whose components have been described above. The fuel and oxidant were introduced one at a time with an $N_2$ purge in between. Instead of using a cantilever actuator as the electrode, a nanotube sheet of Example 4 was used that was uniformly filed with catalyst, and actuation in tension was characterized using the apparatus described in Example 5. The actuation observed in this setup is driven by the same half-cell reactions as described in the previous two-compartment cell (FIG. 3 and Examples 2 and 3), where the fuel ($H_2$) and oxidant ($O_2$) are continuously present in separate compartments. Because the fuel generated driving potential and electrolyte are unchanged, the basic mechanisms (quantum mechanical and coulombic) for causing changes in nanotube dimensions should be identical. In the forward actuation step, the nanotube sheet was double-layer charged to 0 V (versus NHE) by filling the cell with hydrogen. After purging the cell with $N_2$ to avoid direct contact of a $H_2$ and $O_2$ mixture with the catalyst, the cell was filled with $O_2$, which reversed the charging and actuation direction as the nanotube electrode went to a potential of about 0.9 V (versus NHE). Although very long actuation times result in this configuration from the need to periodically dissolve gases in relatively massive amounts of electrolyte, this experiment enabled a reliable comparison between chemically driven and electrically driven actuation in one electrolyte for the same type of Pt-infiltrated nanotube sheet. The obtained results (FIG. 5, whose components have been described above show that the potential changed from about 0.0 to about 0.9 V (versus NHE) as the hydrogen gas in the cell was switched to oxygen, and that the length increase of the nanotube sheet was about 0.035%. Essentially the same length change resulted for electrically driven actuation between these potentials in the utilized electrolyte (FIG. 6). This actuator generated strain is within a factor of 3 of the typically 0.1% maximum strain for commercial high modulus ferroelectrics, which usually require about 100 V of externally applied potential for operation.

Example 7

The NiTi shape memory alloy used for the fuel-powered shape memory muscles was obtained from Dynalloy, Inc. as a 152 μm diameter FLEXINOL® wire having a 70° C. austenitic phase transition. These wires were used as received, without further thermomechanical treatment. The Pt black catalyst (HiSPEC 1000 with a nominal surface area of 27 $m^2/g$ from Alpha Aesar) was coupled to the shape memory wire by immersing the wire in a Pt-hexane slurry, evaporating the hexane, and using compressed air to remove unbound catalyst. The resulting weight gain of the shape memory wire was 1.3-1.5%.

Example 8

This example demonstrates high performance for a fuel-powered shape memory muscle which uses a NiTi shape memory wire coated with Pt catalyst particles (described in Example 6) as the fuel-powered muscle, and either hydrogen, methanol, or formic acid as fuel. The measurement apparatus is shown in FIG. 8, whose components have been described above. Contact of the fuel and an oxidant (oxygen or air) causes the mechanically loaded wire to heat to above the austenitic phase transition temperature and do mechanical work during the resulting contraction. Upon interruption of the fuel, the wire cools to below its martensitic phase transition temperature and returns to its original length (FIG. 9). This fuel-powered muscle supported ~150 MPa or higher stress while undergoing ~5% contraction when powered by a mixture of oxygen (or air) and either methanol vapor, formic acid vapor, or a non-combustible mixture of hydrogen in inert gas. This stress generation capability is ~500 times that typical for human skeletal muscle (0.3 MPa), while the percent stroke is ~25% that of this natural muscle. Hence, the work capability of the continuously shorted fuel cell muscle on lifting a weight (5300 kJ $m^{-3}$ for methanol and 6800 kJ $m^{-3}$ for hydrogen or formic acid) is over a hundred times that of skeletal muscle (~40 kJ $m^{-3}$). The percent contraction (5%, 7%, and 8% observed for 150, 122, and 98 MPa loads, respectively, using 2.5 volume percent hydrogen in inert gas as fuel) can be increased to far above the ~20% typical of skeletal muscle by simply coiling the shape memory wire—albeit with a proportional decrease in stress generation. The presently achieved power density (68 W $kg^{-1}$ during the work part of the cycle for hydrogen fuel) is similar to natural skeletal muscle (typically about 50 W $kg^{-1}$). By increasing the fuel delivery rate and optimizing fuel composition and catalyst loading, it is possible to dramatically increase power density.

Example 9

Figure 30:
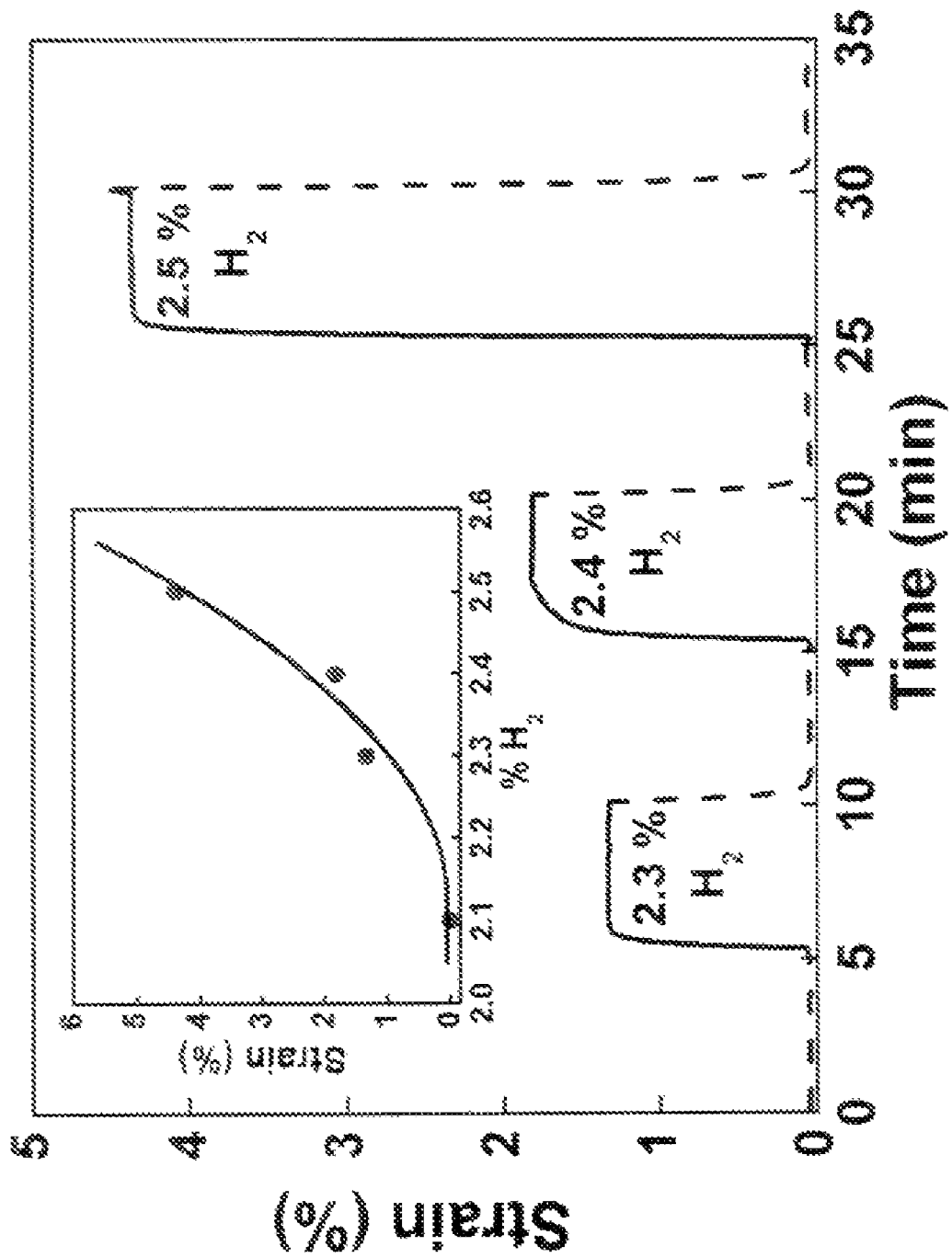
FIG. 30 demonstrates an embodiment in which actuator strain of a shape memory wire is controlled by varying the amount of H2 in a non-combustible H2/O2/N2 mixture.

This example demonstrates the ability to control actuator stain of a fuel-powered shape memory wire by varying the amount of $H_2$ in a non-combustible $H_2/O_2/N_2$ mixture. The measurement apparatus, actuator material, and methods are the same as for Example 10, except for variation of hydrogen concentration supplied in the $H_2/O_2/N_2$ (which comprises 50 volume percent oxygen and the volume percents of $H_2$ shown in FIG. 30. The data in the main figure shows the dependence of actuator generated stroke in percent on switching fuel delivery on (solid lines) and off (dotted lines). The figure insert shows the dependence of actuator stroke on the volume percent $H_2$ in the $H_2/O_2/N_2$ input gas mixture.

Example 10

This example describes another method for attaching catalyst to shape memory alloy used for selected invention embodiments. Nitinol wire (FLEXINOL®) ranging in diameters of 76-152 mm was lightly coated with silicone-based grease (Dow Corning). The greased wire was then dusted with to dry platinum nanoparticle catalyst.

Example 11

Figures 26A, 26B:
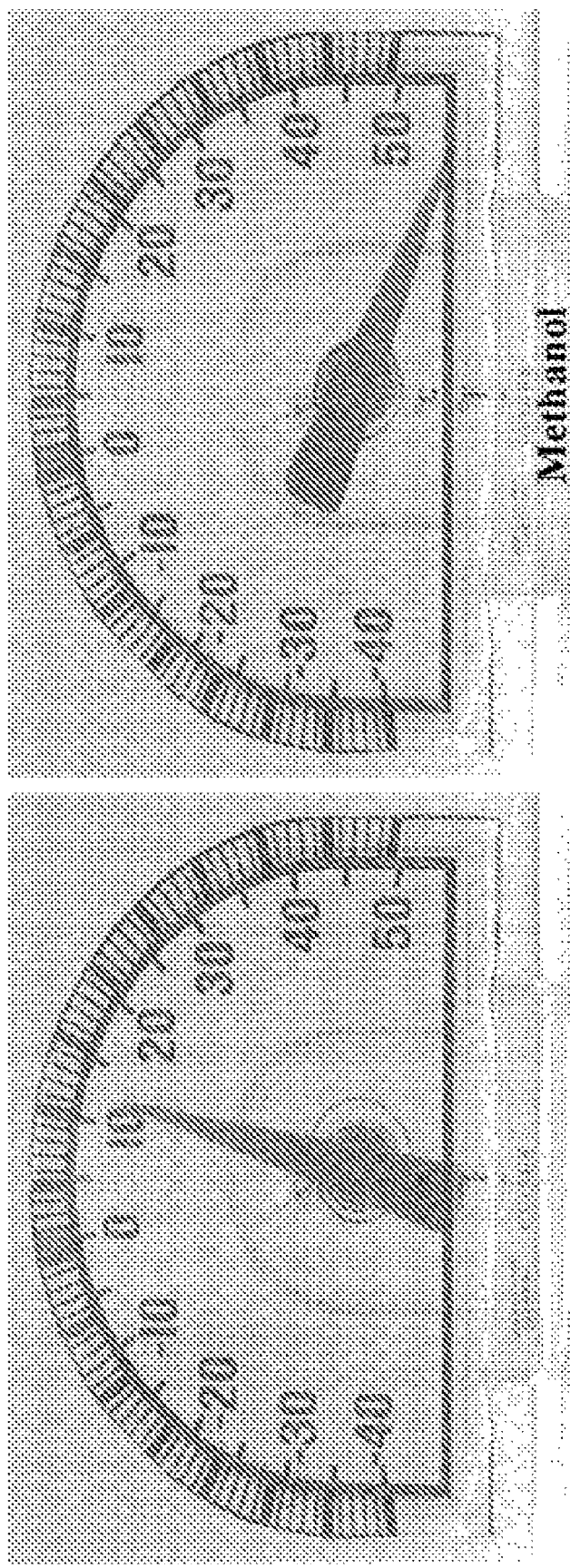
FIGS. 26A and 26B show an embodiment of a bimetallic spring thermometer that was converted into a fuel-powered artificial muscle. This device can act as a sensor to detect fuel/oxidizer composition and provide actuation to open or close valves.

This example demonstrates conversion of a conventional bimetallic spring thermometer (Springfield Co.) to a methanol/air powered rotational artificial muscle, which could be used as an actuating sensor. The bimetal spring of this commercially available thermometer was hand coated with thin layer of the silicon vacuum grease of Example 10 and then uniformly covered with platinum black powder (HiSPEC 1000, Alfa Aesar). The device (with the bottom part of the housing removed) was then placed on top of a Petri dish, as shown in FIG. 26A. A short time after filling the dish with a small amount of methanol, the arrow attached to the bimetal spring started to move, reaching its right-most position in about 13 seconds (FIG. 26B). The movement of the arrow was due to change in dimensions of the bimetal spring caused by catalyst-assisted heat released due to oxidation of methanol vapor by oxygen in the air.

Example 12

Figures 27A, 27B:
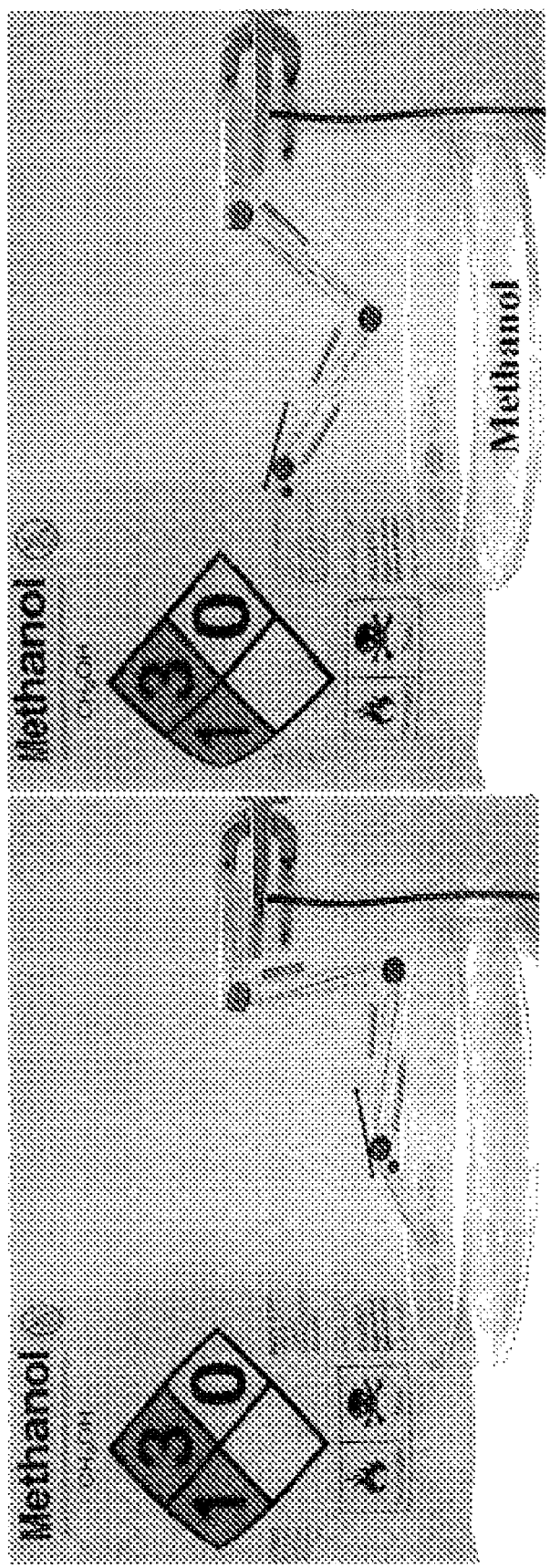
FIGS. 27A and 27B depict an embodiment of a methanol-powered robotic arm that uses fuel-driven shape memory alloy wire actuators. The arm position is shown before (FIG. 27A) and during (FIG. 27B) exposure of the arm to a methanol/air mixture.

This example shows a miniature robot arm "surfing" on the methanol/air mixture above a dish of methanol (FIGS. 27A and 27B). Conversion of this normally electrically powered hobby robot (Toki Corp, Japan) to one that is fuel-powered involves coating the shape memory wire with the nanoparticle Pt catalyst (HiSPEC 1000, Alfa Aesar). The arm rises (FIG. 27B) when the Pt-coated nickel-titanium shape memory wire is heated by Pt-catalyzed reaction of methanol and air to above the shape memory transition temperature. This upwards motion brings the fuel-powered wire to a position where there is less fuel, and the resulting cooling (and subsequent expansion) of the wire lowers the arm.

Example 12

Figures 28A, 28B:
FIGS. 28A and 28B depict an embodiment of fuel-powered actuation to lift a 500 g weight, using a shape memory alloy metal coil coated with Pt catalyst. Before and after exposure of the spring to a methanol/air mixture are shown by FIGS. 28A and 28B, respectively. The meter indicates spring temperature before and during fuel-powered actuation.

This example shows (FIG. 28A and FIG. 28B) methanol-powered shape memory actuation of a platinum-coated NiTi spring (Images Scientific Instruments, Inc.) to lift a 500 gram weight. The contraction shown on FIG. 28B results from the platinum nanoparticle catalyzed heating of the shape memory wire to above the 70° C. shape memory phase transition as a result of exposing the fuel-powered muscle to a methanol/air mixture. The meter shows the temperature in ° C. that is measured at the top of the spring.

Example 13

Figures 29A, 29B:
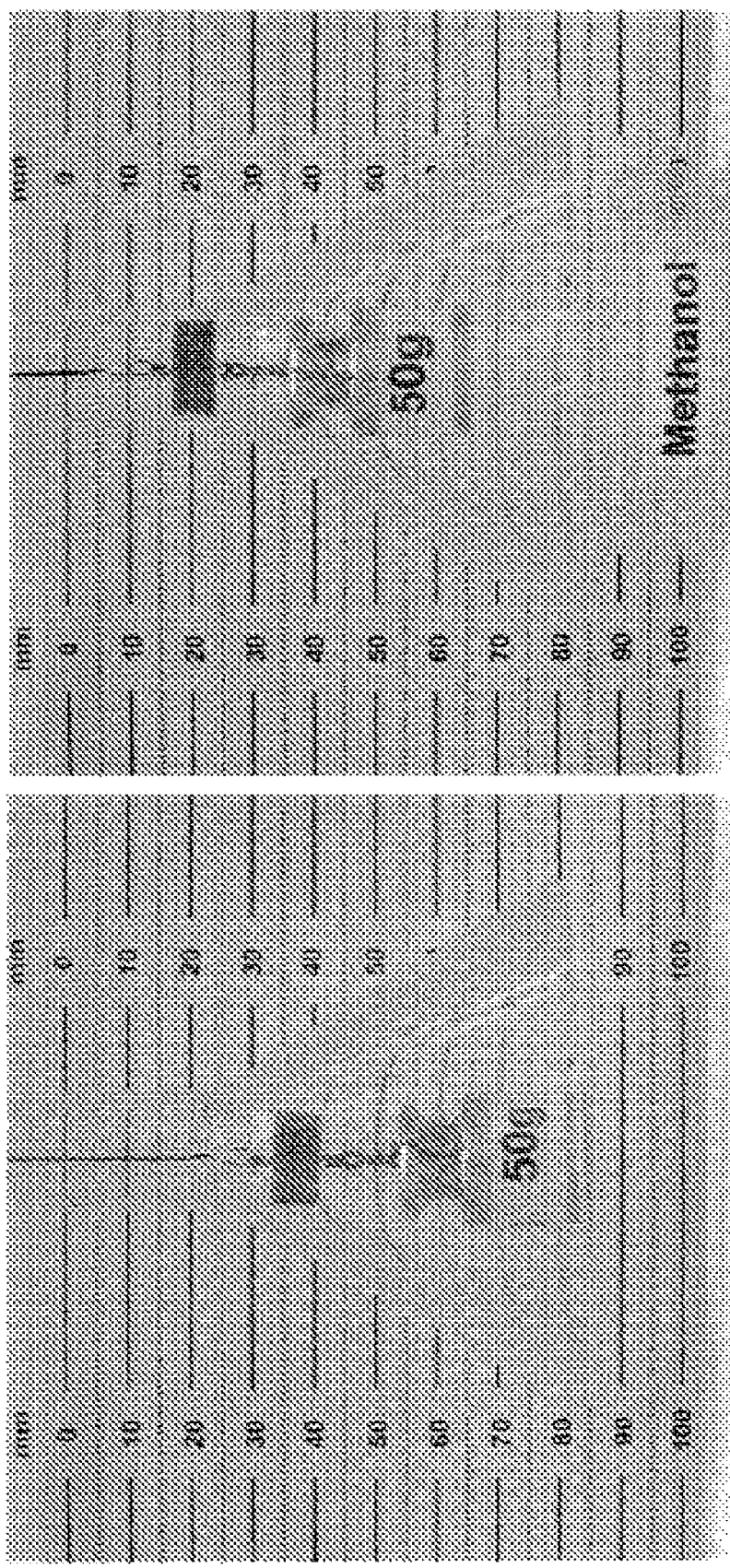
FIGS. 29A and 29B illustrate an embodiment of the use of fuel-powered mechanical actuation to cut off fuel exposure at the end of the heating part of the mechanical actuation cycle, thereby creating a fuel-driven shape-memory-spring oscillator. The stopper near the end of the shape memory alloy spring is raised by actuator contraction (FIG. 29B), so as to end methanol vapor delivery to the spring. Subsequent cooling lowers the stopper, so that fuel delivery restarts. The initial actuator position and the position at the end of the contraction step are depicted in FIG. 29A and FIG. 29B, respectively.

In this example, a BioMetal spring made of a nickel-titanium alloy (Images Scientific Instruments, Inc., Toki Corp.) coated with platinum (HiSPEC 1000, Alfa Aesar) is suspended inside the neck of this cone-shaped glass funnel (FIG. 29A). Methanol vapor from the dish below combines with oxygen from room air on the Pt-coated surface of the wire. The platinum catalyzes oxidation of the methanol, causing the wire to heat and contract. As the wire contracts, the 50 gram weight is raised. In this set up, when the weight rises (FIG. 29B), a plug is raised that inhibits methanol vapor from reaching the wire, ending the fuel oxidation and allowing the wire to cool. The weight is lowered to where the plug no longer stops substantial methanol access to the shape memory wire and the cycle repeats.

Example 14

Figure 17:
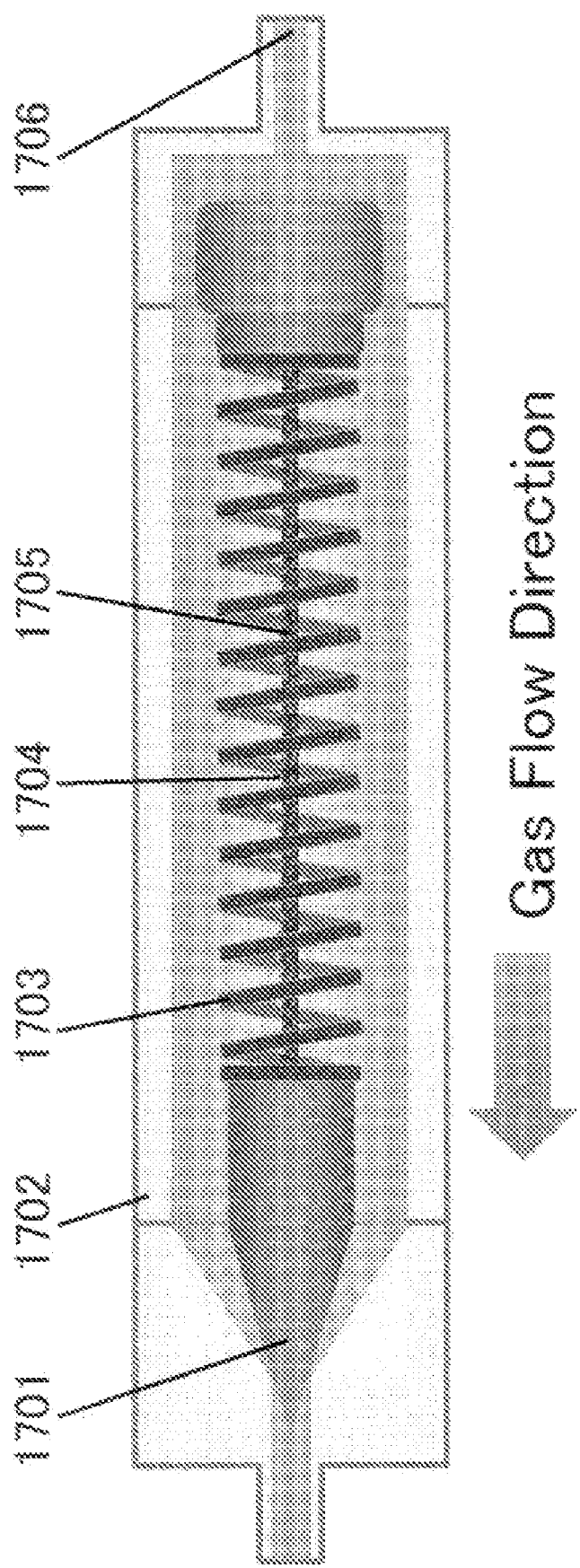
FIG. 17 illustrates an embodiment of the use of a Pt-coated shape memory spring to sense a fuel/oxidant mixture by providing an actuator response.

This example shows how an electronic nitinol wire-based gas valve can be converted into an actuating carbon monoxide sensor, FIG. 17. A commercial nitinol air valve was disassembled—the valve core 1701 with coil spring 1703 and the nitinol wire 1704 was extracted from the housing 1702. The actuator wire 1704 was coated with a thin layer of vacuum grease (Dow Corning) and then uniformly covered with Pt black (HiSPEC 1000, Alfa Aesar), 1705. After this the valve was assembled. The assembled valve blocks gas flow so that air pressure can build up on its inlet 1706. Upon introduction of a mixture of carbon monoxide and air, catalyzed oxidation of carbon monoxide to carbon dioxide on Pt nanoparticles 1705 heats up the nitinol wire 1704 causing its contraction and opening the valve. If the amount of carbon monoxide in the air drops below certain value, the valve automatically closes.

What is claimed is:

1. A method for actuating an actuator material comprising the steps of:
    (a) exposing the actuator material in a first chamber to a fuel capable of being oxidized, wherein the exposure of the fuel to the actuator material causes reduction of the actuator material thereby causing actuation of the actuator material;
    (b) exposing the actuator material in said first chamber to an oxidizing agent thereby to at least partially reverse said actuation of the actuator material, wherein substantially all products formed by the exposing steps of (a) and (b) on the actuator material have a boiling-point below 150° C.

2. A method for actuating an actuator material comprising the steps of:
    (a) exposing the actuator material in said first chamber to an oxidizing agent, wherein the exposure of the oxidizing agent to the actuator material causes oxidation of the actuator material thereby causing actuation of the actuator material;
    (b) exposing the actuator material in a first chamber to a fuel capable of being oxidized thereby to at least partially reverse said actuation of the actuator material, wherein substantially all products formed by the exposing steps of (a) and (b) on the actuator material have a boiling point below 150° C.

3. A fuel-powered actuator comprising:
    (a) a first chamber;
    (b) an actuator material in the first chamber;
    (c) a supply of fuel operatively connected to said first chamber for introducing the fuel into the chamber, wherein the fuel is capable of being oxidized, and wherein exposing the fuel to the actuator material can cause reduction of the actuator material thereby causing actuation of the actuator material; and
    (d) a supply of oxidizing agent operatively connect to said chamber for introducing the oxidizing agent into, the first chamber, wherein the oxidizing agent is capable of at least partially reversing said actuation of the actuator material, and wherein the fuel and the oxidizing agent are reactable such that substantially all products formed have a boiling point below 150° C.

4. A fuel-powered actuator comprising:
    (a) a first chamber;
    (b) an actuator material in the first chamber;
    (c) a supply of oxidizing agent operatively connect to said chamber for introducing the oxidizing agent into the first chamber, wherein exposing the oxidizing agent to the actuator material can cause oxidation of the actuator material thereby causing actuation of the actuator material; and
    (d) a supply of fuel operatively connected to said first chamber for introducing the fuel into the chamber, wherein the fuel is capable of being oxidized thereby at least partially reversing said actuation of the actuator material, and wherein the fuel and the oxidizing agent are reactable such that substantially all products formed have a boiling point below 150° C.

5. The method of claim 1, wherein only the first chamber is required for the actuating function to occur.

6. The method of claim 1, wherein the actuator material is selected from a group consisting of:
  (i) high surface area materials,
  (ii) materials that can be intercalated during oxidation processes,
  (iii) materials that can be intercalated during reduction processes, and
  (iv) combinations thereof.

7. The method of claim 6 or the fuel-powered actuator of claim 6, wherein the actuator material comprises a high surface area fibrous material, a conducting organic polymer, or both.

8. The method of claim 1, in which the actuator material is electronically insulating for at least some part of the method.

9. The method of claim 1, wherein the actuator material is catalytic with respect to oxidation of the fuel and reduction of the oxidizing agent.

10. The method of claim 1, wherein a catalyst is present with the actuator material, wherein the catalyst is catalytic with respect to oxidation of the fuel and reduction of the oxidizing agent.

11. The method of claim 1, wherein the actuation is (1) capable of providing a mechanical displacement or (2) a change in mechanical, optical, electronic, or magnetic properties.

12. The method of claim 11, wherein the actuation is capable of providing the mechanical displacement.

13. The method of claim 1, wherein the actuation results from an event selected from the group consisting of:
  (i) non-faradaic charge injections,
  (ii) dopant intercalations,
  (iii) dopant de-intercalations,
  (iv) changes in the temperature of the actuating material, and
  (v) combinations of these events.

14. The method of claim 1, comprising a plurality of actuator materials.

15. The method of claim 14, wherein at least one of the plurality of the actuator materials actuates due to a temperature change and at least one of the plurality of the actuator materials actuates not due to a temperature change.

16. The method of claim 14, wherein at least of the plurality of the actuator materials stiffens as the operating temperature increases.

17. The method of claim 1, wherein a mechanical catch is used to maintain actuation stroke states whose maintenance would otherwise require the expenditure of energy.

18. The method of claim 1, wherein there is substantially no electrolyte in the first chamber.

19. The method of claim 1, wherein there are electrolytes in the first chamber.

20. The method of claim 1, wherein the actuator material comprises a conducting polymer.

21. The method of claim 1, wherein the actuator material comprises an organic conducting polymer.

22. The method of claim 21, wherein the organic conducting polymer is capable of (i) oxidation by the oxidizing agent, (ii) reduction by the fuel, or (iii) both.

23. The method of claim 21, wherein the organic conducting polymer is self-dopable.

24. The method of claim 23, wherein the self dopable organic conducting polymer possesses substituents including at least one of the following functional groups —COOH, —PO$_3$H$_2$, phosphonic acid half esters, —SO$_3$H, —B(OH)$_2$, boranic half esters, —NH$_3^+$, and protonated secondary and tertiary amines.

25. The fuel-powered actuator of claim 3, comprising a second chamber; and a second actuator material in the second chamber.

26. A fuel-powered actuator comprising:
  (a) a chamber containing a mixture of a fuel and an oxidizing agent;
  (b) a working electrode within the chamber;
  (c) a counter electrode within the chamber;
  (d) a first actuating electrode within the chamber, wherein the first actuating electrode is selected from the group consisting of (i) the working electrode, (ii) the counter electrode, (iii) an additional electrode ionically connected to the working electrode and the counter electrode, and (iv) combinations thereof;
  (e) an electrolyte or plurality of electrolytes ionically connecting the working electrode and the counter electrode;
  (f) a first catalyst for the working electrode;
  (g) a second catalyst for the counter electrode, wherein one of the first catalyst and the second catalyst preferentially catalyzes oxidation of the fuel and the other catalyst of the first catalyst and the second catalyst preferentially catalyzes reduction of the oxidizing agent and wherein the actuator is configured to provide mechanical displacement.

27. The fuel-powered actuator of claim 26, wherein the first actuating electrode comprises either a high surface area material, a material that can be intercalated during oxidation or reduction processes, or a combination thereof.

28. The fuel-powered actuator of claim 26, wherein the actuator electrode comprises a high surface area electronically conducting material, an electronically conducting organic polymer, or both.

29. The fuel-powered actuator of claim 26, wherein actuation results from an event selected from a group consisting of:
  (i) a non-faradaic charge injection;
  (ii) a dopant intercalation;
  (iii) a dopant de-intercalation; and
  (iv) a combination thereof.

30. The fuel-powered actuator of claim 26, wherein a mechanical catch is used to maintain actuation stroke states whose maintenance would otherwise require the expenditure of energy.

31. The fuel-powered actuator of claim 26, further comprising a second actuating electrode.

32. The fuel-powered actuator of claim 31, wherein the first actuating electrode is the working electrode and the second actuating electrode is the counter electrode.

33. The fuel-powered actuator of claim 26, wherein first actuating electrode comprises a phase change material.

34. The fuel-powered actuator of claim 26, wherein the first actuating electrode comprises a conducting shape memory material.

35. A fuel-powered actuator comprising:
  (a) a non-metal phase change material;
  (b) a catalyst, wherein the catalyst is thermally coupled to the non-metal phase change material; and
  (c) a fuel and oxidizing agent mixture contacting the catalyst.

36. The fuel-powered actuator of claim 35, wherein the non-metal phase change material comprises a polymer.

37. The fuel-powered actuator of claim 35, wherein the non-metal phase change material comprises a polymer composite.

38. The fuel-powered actuator of claim 37, wherein the polymer composite comprises conducting particles or fibers.

39. The fuel-powered actuator of claim 38, wherein the particles or fibers are nanoparticles or nanofibers.

40. The fuel-powered actuator of claim 38 wherein said polymer composite comprises carbon nanotubes or carbon nanoparticles.

41. The fuel-powered actuator of claim 35, wherein the non-metal phase change material comprises an organic material.

42. The fuel-powered actuator of claim 35, wherein the non-metal phase change material undergoes a substantial volume change when heated above a phase change temperature for the non-metal phase material.

43. The fuel-powered actuator of claim 35, wherein the non-metal phase change material comprises paraffin.

44. The fuel-powered actuator of claim 35, wherein the non-metal phase, change material comprises a shape memory material.

45. A fuel-powered actuator comprising:
(a) a phase change material;
(b) a catalyst, wherein the catalyst is thermally coupled the phase change material;
(c) a fuel oxidizer mixture contacting the catalyst; and
(d) a physical structure operatively coupled to the actuator, the physical structure selected from the group consisting of
  (i) a servo controller that controls movement of the actuator,
  (ii) a controller that controls the compliance characteristics of the actuator at least partially independently of actuator position;
  (iii) a controller that controls the force generation of the actuator acting on a load in a substantially analog fashion that is substantially independent of the path used to contact the load,
  (iv) a controlling structure or device which enables passive operation as an oscillator, a tracker, or a constant force generator,
  (v) a patterned catalyst,
  (vi) a region selected fuel delivery-system,
  (vii) a thermo-siphon,
  (viii) a heat pipe,
  (ix) an actuator resistance sensing circuit,
  (x) a displacement sensitive; sensor,
  (xi) a reverse bias spring, and
  (xii) combinations thereof.

46. The fuel-powered actuator of claim 45, wherein the physical structure is selected from a group consisting of:
(A) a servo controller that controls movement of the actuator,
(B) a controller that controls the compliance characteristics of the actuator at least partially independently of actuator position,
(C) a controller that controls the force generation of the actuator acting on a load in a substantially analog fashion that is substantially independent of the path used to contact the load, and
(D) a controlling structure or device which enables passive operation as an oscillator, a tracker, or a constant force generator.

47. The fuel-powered actuator of claim 45, wherein the physical structure comprises a patterned catalyst.

48. The fuel-powered actuator of claim 45, wherein the physical structure comprises a region selected fuel delivery system.

49. The fuel-powered actuator of claim 45, wherein the physical structure comprises a thermo-siphon.

50. The fuel-powered actuator of claim 45, wherein the physical structure comprises a heat pipe.

51. The fuel-powered actuator of claim 45, wherein the physical structure comprises an actuator resistance sensing circuit.

52. The fuel-powered actuator of claim 45, wherein the physical structure comprises a displacement sensitive sensor.

53. The fuel-powered actuator of claim 45, wherein the physical structure comprises a reverse bias spring.

54. The fuel-powered actuator of claim 46, wherein the physical structure comprises the servo controller that includes a thermal control loop within an inner servo control loop and an outer servo control loop.

55. The fuel-powered actuator of claim 54, wherein the response time constant or discrete update rate of an inner thermal control loop is at least a factor of two greater than the update rate or response time constant of the outer servo control loop.

56. The fuel-powered actuator of claim 54, comprising a temperature sensor that can be utilized to prevent damage to the actuator.

57. The fuel-powered actuator of claim 45, configured to utilize a feed forward model.

58. The fuel-powered actuator of claim 57, wherein an electrical resistance of the phase change material can be utilized as a feedback signal.

59. The fuel-powered actuator of claim 58 wherein an additional feedback signal can be utilized and wherein the additional feedback signal is selected from a group consisting of:
(A) position,
(B) velocity,
(C) temperature,
(D) resistance change rate, and
(E) a combination thereof.

60. The fuel-powered actuator of claim 58, wherein the physical structure comprises a servo controller that is configured to determine a hysteresis state utilizing at least one of the following: velocity direction, velocity magnitude, resistance change direction, and resistance change magnitude.

61. The fuel-powered actuator of claim 58, wherein an actuating element electrical resistance is used as a proxy for position.

62. The fuel-powered actuator of claim 45, wherein the physical structure comprises a non-linear controller.

63. The fuel-powered actuator of claim 62, wherein the non-linear controller is operable to utilize at least one of the following (A) an adaptive control technique, (B) Kalman filtering, or (C) a neural network.

64. The fuel-powered actuator of claim 45, wherein temperature can be utilized as in input to a position feedback system.

65. The fuel-powered actuator of claim 64, wherein the temperature can be used to resolve a hysteresis state of a non-linear actuator system.

66. A fuel-powered thermally operated actuator comprising:
(a) an actuator material, wherein the actuator material comprises a non-phase change material;
(b) a catalyst, wherein the catalyst is thermally coupled to the non-phase change material; and
(c) a fuel oxidizer mixture contacting the catalyst.

67. The fuel powered thermally operated actuator of claim 66, wherein the actuator comprises a cantilever.

68. A fuel-powered actuator comprising:
(a) a working electrode;
(b) a counter electrode that is mechanically un-coupled with respect to the working electrode;
(c) an electrolyte or electrolytes that provide an ion path between the working electrode and the counter electrode; and
(d) an actuator material operable for responding to charge injection processes resulting from the operation of the working electrode and the counter electrode, wherein one electrode of the working electrode and the counter electrode is in contact with a fuel and the other electrode of the working electrode and the counter electrode is in contact with an oxidizing agent, and wherein the actuator is configured to provide mechanical displacement.

69. A fuel-powered actuator comprising:
(a) a working electrode;
(b) a counter electrode;
(c) an electrolyte or electrolytes that provide an ion path between the working electrode and the counter electrode; and
(d) an actuator material operable for responding to thermal energy produced by joint operation of the working electrode and the counter electrode, wherein the working electrode or the counter electrode comprises the actuator material, and wherein the actuator is configured to provide mechanical displacement.

70. An inch worn type motor comprising:
(a) a first end clamp assembly;
(b) a second end clamp assembly; and
(c) a catalyst-coated shape memory metal extension spring mounted between two end clamp assemblies.

71. The inch work type motor of claim 70, wherein the end clamp configuration can enable selection of linear or rotary operation.

* * * * *